United States Patent
Jovanovich et al.

(10) Patent No.: US 8,672,532 B2
(45) Date of Patent: Mar. 18, 2014

(54) MICROFLUIDIC METHODS

(75) Inventors: Stevan B. Jovanovich, Livermore, CA (US); William D. Nielsen, San Jose, CA (US); Michael Van Nguyen, San Diego, CA (US)

(73) Assignee: IntegenX Inc., Pleasanton, CA (US)

( * ) Notice: Subject to any disclaimer, the term of this patent is extended or adjusted under 35 U.S.C. 154(b) by 983 days.

(21) Appl. No.: 12/642,665

(22) Filed: Dec. 18, 2009

(65) Prior Publication Data

US 2010/0165784 A1 Jul. 1, 2010

Related U.S. Application Data

(60) Provisional application No. 61/204,179, filed on Dec. 31, 2008, provisional application No. 61/205,534, filed on Jan. 20, 2009, provisional application No. 61/162,080, filed on Mar. 20, 2009, provisional application No. 61/227,382, filed on Jul. 21, 2009.

(51) Int. Cl.
*B01F 5/06* (2006.01)

(52) U.S. Cl.
USPC ............... 366/181.5; 366/181.8; 366/341

(58) Field of Classification Search
USPC ............... 366/181.5, 181.8, 341, DIG. 2
See application file for complete search history.

(56) References Cited

U.S. PATENT DOCUMENTS

| | | | |
|---|---|---|---|
| 3,190,310 A | 6/1965 | Honsinger | |
| 3,352,643 A | 11/1967 | Ando et al. | |
| 3,433,257 A | 3/1969 | Jensen | |
| 3,568,692 A | 3/1971 | Metzger et al. | |
| 3,610,274 A | 10/1971 | Levesque et al. | |
| 4,113,665 A | 9/1978 | Law et al. | |
| 4,558,845 A | 12/1985 | Hunkapiller | |

(Continued)

FOREIGN PATENT DOCUMENTS

| CA | 2433145 A1 | 5/2002 |
|---|---|---|
| EP | 0459241 B1 | 12/1991 |

(Continued)

OTHER PUBLICATIONS

U.S. Appl. No. 13/349,832, filed Jan. 13, 2012, Eberhart et al.

(Continued)

*Primary Examiner* — David Sorkin

(57) ABSTRACT

This invention provides microfluidic devices that comprise a fluidics layer having microfluidic channels and one or more regulating layers that regulate the movement of fluid in the channels. The microfluidic devices can be used to mix one or more fluids. At least a portion of the fluidics layer can be isolated from the regulating layer, for example in the form of a shelf. Such isolated portions can be used as areas in which the temperature of liquids is controlled. Also provided are instruments including thermal control devices into which the microfluidic device is engaged so that the thermal control device controls temperature in the isolated portion, and a movable magnetic assembly including magnets with shields so that a focused magnetic field can be applied to or withdrawn from the isolated portion or any other portion of the microfluidic device. Also provided are methods of mixing fluids. The methods include stacking a plurality of alternating boluses of different liquids in a microfluidic channel, and moving the stacked boluses through the channel. In another method, the boluses are moved into a diaphragm valve having a volume able to accommodate several boluses, and then pumping the liquids out of the valve.

20 Claims, 24 Drawing Sheets

(56) References Cited

U.S. PATENT DOCUMENTS

| | | |
|---|---|---|
| 4,703,913 A | 11/1987 | Hunkapiller |
| 4,847,120 A | 7/1989 | Gent |
| 4,963,498 A | 10/1990 | Hillman et al. |
| 5,085,757 A | 2/1992 | Karger et al. |
| 5,275,645 A | 1/1994 | Ternoir et al. |
| 5,364,759 A | 11/1994 | Caskey et al. |
| 5,376,252 A | 12/1994 | Ekström et al. |
| 5,387,505 A | 2/1995 | Wu |
| 5,453,163 A | 9/1995 | Yan |
| 5,482,836 A | 1/1996 | Cantor et al. |
| 5,523,231 A | 6/1996 | Reeve |
| 5,571,410 A | 11/1996 | Swedberg et al. |
| 5,587,128 A | 12/1996 | Wilding et al. |
| 5,635,358 A | 6/1997 | Wilding et al. |
| 5,639,428 A | 6/1997 | Cottingham |
| 5,681,946 A | 10/1997 | Reeve |
| 5,705,628 A | 1/1998 | Hawkins |
| 5,705,813 A | 1/1998 | Apffel et al. |
| 5,726,026 A | 3/1998 | Wilding et al. |
| 5,741,462 A | 4/1998 | Nova et al. |
| 5,750,015 A | 5/1998 | Soane et al. |
| 5,770,029 A | 6/1998 | Nelson et al. |
| 5,775,371 A | 7/1998 | Pan et al. |
| 5,776,748 A | 7/1998 | Singhvi et al. |
| 5,830,662 A | 11/1998 | Soares et al. |
| 5,842,787 A | 12/1998 | Kopf-Sill et al. |
| 5,856,174 A | 1/1999 | Lipshutz et al. |
| 5,863,502 A | 1/1999 | Southgate et al. |
| 5,872,010 A | 2/1999 | Karger et al. |
| 5,885,470 A | 3/1999 | Parce et al. |
| 5,898,071 A | 4/1999 | Hawkins |
| 5,900,130 A | 5/1999 | Benvegnu |
| 5,908,552 A | 6/1999 | Zimmerman et al. |
| 5,922,591 A | 7/1999 | Anderson et al. |
| 5,942,443 A | 8/1999 | Parce et al. |
| 5,948,684 A | 9/1999 | Weigl et al. |
| 5,971,158 A | 10/1999 | Yager et al. |
| 5,994,064 A | 11/1999 | Staub et al. |
| 6,001,229 A | 12/1999 | Ramsey |
| 6,007,690 A | 12/1999 | Nelson et al. |
| 6,007,775 A | 12/1999 | Yager |
| 6,010,607 A | 1/2000 | Ramsey |
| 6,048,100 A | 4/2000 | Thrall et al. |
| 6,056,860 A | 5/2000 | Amigo et al. |
| 6,073,482 A | 6/2000 | Moles |
| 6,074,827 A | 6/2000 | Nelson et al. |
| 6,103,199 A | 8/2000 | Bjornson et al. |
| 6,110,343 A | 8/2000 | Ramsey et al. |
| 6,120,184 A | 9/2000 | Laurence et al. |
| 6,136,212 A | 10/2000 | Mastrangelo et al. |
| 6,168,948 B1 | 1/2001 | Anderson et al. |
| 6,176,962 B1 | 1/2001 | Soane et al. |
| 6,190,616 B1 | 2/2001 | Jovanovich et al. |
| 6,197,595 B1 | 3/2001 | Anderson et al. |
| 6,207,031 B1 | 3/2001 | Adourian et al. |
| 6,235,471 B1 | 5/2001 | Knapp et al. |
| 6,238,538 B1 | 5/2001 | Parce et al. |
| 6,251,343 B1 | 6/2001 | Dubrow et al. |
| 6,280,589 B1 | 8/2001 | Manz et al. |
| 6,319,476 B1 | 11/2001 | Victor, Jr. et al. |
| 6,321,791 B1 | 11/2001 | Chow |
| 6,322,683 B1 | 11/2001 | Wolk et al. |
| 6,342,142 B1 | 1/2002 | Ramsey |
| 6,348,318 B1 | 2/2002 | Valkirs |
| 6,379,929 B1 | 4/2002 | Burns et al. |
| 6,387,234 B1 | 5/2002 | Yeung et al. |
| 6,387,707 B1 | 5/2002 | Seul et al. |
| 6,403,338 B1 | 6/2002 | Knapp et al. |
| 6,408,878 B2 | 6/2002 | Unger et al. |
| 6,423,536 B1 | 7/2002 | Jovanovich et al. |
| 6,429,025 B1 | 8/2002 | Parce et al. |
| 6,432,191 B2 | 8/2002 | Schutt |
| 6,432,290 B1 | 8/2002 | Harrison et al. |
| 6,454,924 B2 | 9/2002 | Jedrzejewski et al. |
| 6,489,112 B1 | 12/2002 | Hadd et al. |
| 6,521,188 B1 | 2/2003 | Webster |
| 6,524,456 B1 | 2/2003 | Ramsey et al. |
| 6,527,003 B1 | 3/2003 | Webster |
| 6,531,041 B1 | 3/2003 | Cong et al. |
| 6,531,282 B1 | 3/2003 | Dau et al. |
| 6,532,997 B1 | 3/2003 | Bedingham et al. |
| 6,533,914 B1 | 3/2003 | Liu |
| 6,534,262 B1 | 3/2003 | Mckernan et al. |
| 6,537,757 B1 | 3/2003 | Langmore et al. |
| 6,544,734 B1 | 4/2003 | Briscoe et al. |
| 6,551,839 B2 | 4/2003 | Jovanovich et al. |
| 6,581,441 B1 | 6/2003 | Paul |
| 6,581,899 B2 | 6/2003 | Williams |
| 6,605,454 B2 | 8/2003 | Barenburg et al. |
| 6,613,525 B2 | 9/2003 | Nelson et al. |
| 6,614,228 B2 | 9/2003 | Hofmann et al. |
| 6,618,679 B2 | 9/2003 | Loehrlein |
| 6,623,613 B1 | 9/2003 | Mathies et al. |
| 6,627,446 B1 | 9/2003 | Roach et al. |
| 6,629,820 B2 | 10/2003 | Kornelsen |
| 6,632,619 B1 | 10/2003 | Harrison et al. |
| 6,632,655 B1 | 10/2003 | Mehta et al. |
| 6,663,833 B1 | 12/2003 | Stave et al. |
| 6,685,442 B2 | 2/2004 | Chinn et al. |
| 6,685,809 B1 | 2/2004 | Jacobson et al. |
| 6,705,345 B1 | 3/2004 | Bifano |
| 6,752,922 B2 | 6/2004 | Huang et al. |
| 6,764,648 B1 | 7/2004 | Roach et al. |
| 6,782,746 B1 | 8/2004 | Hasselbrink et al. |
| 6,786,708 B2 | 9/2004 | Brown et al. |
| 6,787,111 B2 | 9/2004 | Roach et al. |
| 6,793,753 B2 | 9/2004 | Unger et al. |
| 6,802,342 B2 | 10/2004 | Fernandes et al. |
| 6,803,019 B1 | 10/2004 | Bjornson et al. |
| 6,807,490 B1 | 10/2004 | Perlin |
| 6,824,663 B1 | 11/2004 | Boone |
| 6,829,753 B2 | 12/2004 | Lee et al. |
| 6,833,246 B2 | 12/2004 | Balasubramanian |
| 6,852,287 B2 | 2/2005 | Ganesan |
| 6,870,185 B2 | 3/2005 | Roach et al. |
| 6,885,982 B2 | 4/2005 | Harris et al. |
| 6,899,137 B2 | 5/2005 | Unger et al. |
| 6,923,907 B2 | 8/2005 | Hobbs et al. |
| 6,929,030 B2 | 8/2005 | Unger et al. |
| 6,951,632 B2 | 10/2005 | Unger et al. |
| 6,953,058 B2 | 10/2005 | Fernandes et al. |
| 6,960,437 B2 | 11/2005 | Enzelberger et al. |
| 6,994,986 B2 | 2/2006 | Swartz et al. |
| 7,005,292 B2 | 2/2006 | Wilding et al. |
| 7,005,493 B2 | 2/2006 | Huang et al. |
| 7,015,030 B1 | 3/2006 | Fouillet et al. |
| 7,046,357 B2 | 5/2006 | Weinberger et al. |
| 7,049,558 B2 | 5/2006 | Baer et al. |
| 7,063,304 B2 | 6/2006 | Leys |
| 7,087,380 B2 | 8/2006 | Griffiths et al. |
| 7,097,809 B2 | 8/2006 | Van Dam et al. |
| 7,118,910 B2 | 10/2006 | Unger et al. |
| 7,157,228 B2 | 1/2007 | Hashmi et al. |
| 7,169,557 B2 | 1/2007 | Rosenblum et al. |
| 7,198,759 B2 | 4/2007 | Bryning et al. |
| 7,211,388 B2 | 5/2007 | Cash et al |
| 7,232,656 B2 | 6/2007 | Balasubramanian et al. |
| 7,244,961 B2 | 7/2007 | Jovanovich et al. |
| 7,258,774 B2 | 8/2007 | Chou et al. |
| 7,279,146 B2 | 10/2007 | Nassef et al. |
| 7,282,361 B2 | 10/2007 | Hodge |
| 7,312,085 B2 | 12/2007 | Chou et al. |
| 7,312,611 B1 | 12/2007 | Harrison et al. |
| 7,323,305 B2 | 1/2008 | Leamon et al. |
| 7,361,471 B2 | 4/2008 | Gerdes et al. |
| 7,377,483 B2 | 5/2008 | Iwabuchi et al. |
| 7,416,165 B2 | 8/2008 | Ohmi et al. |
| 7,438,856 B2 | 10/2008 | Jedrzejewski et al. |
| 7,445,926 B2 | 11/2008 | Mathies et al. |
| 7,488,603 B2 | 2/2009 | Gjerde et al. |
| 7,501,237 B2 | 3/2009 | Solus et al. |
| 7,526,741 B2 | 4/2009 | Lee et al. |
| 7,537,886 B1 | 5/2009 | Nazarenko et al. |
| 7,575,865 B2 | 8/2009 | Leamon et al. |

(56) References Cited

U.S. PATENT DOCUMENTS

| | | |
|---|---|---|
| 7,645,580 B2 | 1/2010 | Barber et al. |
| 7,691,614 B2 | 4/2010 | Senapathy |
| 7,745,207 B2 | 6/2010 | Jovanovich et al. |
| 7,763,453 B2 | 7/2010 | Clemmens et al. |
| 7,766,033 B2 | 8/2010 | Mathies et al. |
| 7,799,553 B2 | 9/2010 | Mathies et al. |
| 7,803,281 B2 | 9/2010 | Davies |
| 7,817,273 B2 | 10/2010 | Bahatt et al. |
| 7,832,429 B2 | 11/2010 | Young et al. |
| 7,863,357 B2 | 1/2011 | Madabhushi et al. |
| 7,867,713 B2 | 1/2011 | Nasarabadi |
| 7,885,770 B2 | 2/2011 | Gill et al. |
| 7,892,856 B2 | 2/2011 | Grate et al. |
| 7,942,160 B2 | 5/2011 | Jeon et al. |
| 7,943,305 B2 | 5/2011 | Korlach et al. |
| 7,959,875 B2 | 6/2011 | Zhou et al. |
| 7,972,561 B2 | 7/2011 | Viovy et al. |
| 7,976,789 B2 | 7/2011 | Kenis et al. |
| 7,976,795 B2 | 7/2011 | Zhou et al. |
| 8,007,746 B2 | 8/2011 | Unger et al. |
| 8,018,593 B2 | 9/2011 | Tan et al. |
| 8,037,903 B2 | 10/2011 | Wang et al. |
| 8,053,192 B2 | 11/2011 | Bignell et al. |
| 2001/0041357 A1 | 11/2001 | Fouillet et al. |
| 2002/0022587 A1 | 2/2002 | Ferguson et al. |
| 2002/0025529 A1 | 2/2002 | Quake et al. |
| 2002/0025576 A1 | 2/2002 | Northrup et al. |
| 2002/0047003 A1 | 4/2002 | Bedingham et al. |
| 2002/0048536 A1 | 4/2002 | Bergh et al. |
| 2002/0051992 A1 | 5/2002 | Bridgham et al. |
| 2002/0058332 A1 | 5/2002 | Quake et al. |
| 2002/0068357 A1 | 6/2002 | Mathies et al. |
| 2002/0098097 A1 | 7/2002 | Singh |
| 2002/0110900 A1 | 8/2002 | Jovanovich et al. |
| 2002/0119480 A1 | 8/2002 | Weir et al. |
| 2002/0119482 A1 | 8/2002 | Nelson et al. |
| 2002/0127736 A1 | 9/2002 | Chou et al. |
| 2002/0139084 A1 | 10/2002 | Tobolka |
| 2002/0144738 A1 | 10/2002 | Unger et al. |
| 2002/0148992 A1 | 10/2002 | Hayenga et al. |
| 2002/0157951 A1 | 10/2002 | Foret et al. |
| 2002/0160361 A1 | 10/2002 | Loehrlein et al. |
| 2003/0008308 A1 | 1/2003 | Enzelberger et al. |
| 2003/0021734 A1 | 1/2003 | Vann et al. |
| 2003/0029724 A1 | 2/2003 | Derand et al. |
| 2003/0070677 A1 | 4/2003 | Handique et al. |
| 2003/0077839 A1 | 4/2003 | Takei |
| 2003/0095897 A1 | 5/2003 | Grate et al. |
| 2003/0217923 A1 | 11/2003 | Harrison et al. |
| 2004/0003997 A1 | 1/2004 | Anazawa et al. |
| 2004/0013536 A1 | 1/2004 | Hower et al. |
| 2004/0014091 A1 | 1/2004 | Duck et al. |
| 2004/0018611 A1 | 1/2004 | Ward et al. |
| 2004/0021068 A1 | 2/2004 | Staats |
| 2004/0037739 A1 | 2/2004 | Mcneely et al. |
| 2004/0038385 A1 | 2/2004 | Langlois et al. |
| 2004/0053290 A1 | 3/2004 | Terbrueggen et al. |
| 2004/0063217 A1 | 4/2004 | Webster et al. |
| 2004/0072278 A1 | 4/2004 | Chou et al. |
| 2004/0086870 A1 | 5/2004 | Tyvoll et al. |
| 2004/0086872 A1 | 5/2004 | Childers et al. |
| 2004/0132170 A1 | 7/2004 | Storek et al. |
| 2004/0151629 A1 | 8/2004 | Pease et al. |
| 2004/0185484 A1 | 9/2004 | Costa et al. |
| 2004/0197845 A1 | 10/2004 | Hassibi et al. |
| 2004/0200724 A1 | 10/2004 | Fujii et al. |
| 2004/0209354 A1 | 10/2004 | Mathies et al. |
| 2004/0224380 A1 | 11/2004 | Chou et al. |
| 2005/0026300 A1 | 2/2005 | Samper et al. |
| 2005/0047967 A1 | 3/2005 | Chuang et al. |
| 2005/0053952 A1 | 3/2005 | Hong et al. |
| 2005/0142663 A1 | 6/2005 | Parthasarathy et al. |
| 2005/0161326 A1 | 7/2005 | Morita et al. |
| 2005/0161669 A1 | 7/2005 | Jovanovich et al. |
| 2005/0224134 A1 | 10/2005 | Yin et al. |
| 2005/0224352 A1 | 10/2005 | Harrison et al. |
| 2005/0241941 A1 | 11/2005 | Parce et al. |
| 2005/0255000 A1 | 11/2005 | Yamamoto et al. |
| 2005/0255003 A1 | 11/2005 | Summersgill et al. |
| 2005/0255007 A1 | 11/2005 | Yamada et al. |
| 2005/0266582 A1 | 12/2005 | Modlin et al. |
| 2005/0287572 A1 | 12/2005 | Mathies et al. |
| 2006/0027456 A1 | 2/2006 | Harrison et al. |
| 2006/0057209 A1 | 3/2006 | Chapman et al. |
| 2006/0073484 A1 | 4/2006 | Mathies et al. |
| 2006/0076068 A1 | 4/2006 | Young et al. |
| 2006/0140051 A1 | 6/2006 | Kim et al. |
| 2006/0163143 A1 | 7/2006 | Chirica et al. |
| 2006/0186043 A1 | 8/2006 | Covey et al. |
| 2006/0219307 A1* | 10/2006 | Wang et al. .................. 137/824 |
| 2006/0260941 A1 | 11/2006 | Tan et al. |
| 2006/0263789 A1 | 11/2006 | Kincaid |
| 2006/0266645 A1 | 11/2006 | Chen et al. |
| 2006/0292032 A1 | 12/2006 | Hataoka et al. |
| 2007/0015179 A1 | 1/2007 | Klapperich et al. |
| 2007/0017812 A1 | 1/2007 | Bousse |
| 2007/0031865 A1 | 2/2007 | Willoughby |
| 2007/0034025 A1 | 2/2007 | Pant et al. |
| 2007/0105163 A1 | 5/2007 | Grate et al. |
| 2007/0113908 A1 | 5/2007 | Lee et al. |
| 2007/0122819 A1 | 5/2007 | Wu et al. |
| 2007/0175756 A1 | 8/2007 | Nguyen et al. |
| 2007/0184463 A1 | 8/2007 | Molho et al. |
| 2007/0202531 A1 | 8/2007 | Grover |
| 2007/0237686 A1 | 10/2007 | Mathies et al. |
| 2007/0238109 A1 | 10/2007 | Min et al. |
| 2007/0248958 A1 | 10/2007 | Jovanovich et al. |
| 2007/0289941 A1 | 12/2007 | Davies |
| 2007/0297947 A1 | 12/2007 | Sommers et al. |
| 2008/0014576 A1 | 1/2008 | Jovanovich et al. |
| 2008/0014589 A1 | 1/2008 | Link et al. |
| 2008/0047836 A1 | 2/2008 | Strand et al. |
| 2008/0064610 A1 | 3/2008 | Lipovsek et al. |
| 2008/0124723 A1 | 5/2008 | Dale et al. |
| 2008/0138809 A1 | 6/2008 | Kapur et al. |
| 2008/0164155 A1 | 7/2008 | Pease et al. |
| 2008/0179255 A1 | 7/2008 | Jung et al. |
| 2008/0179555 A1 | 7/2008 | Landers et al. |
| 2008/0237146 A1 | 10/2008 | Harrison et al. |
| 2008/0242560 A1 | 10/2008 | Gunderson et al. |
| 2008/0257437 A1 | 10/2008 | Fernandes et al. |
| 2008/0281090 A1 | 11/2008 | Lee et al. |
| 2008/0302732 A1 | 12/2008 | Soh et al. |
| 2008/0311585 A1 | 12/2008 | Gao et al. |
| 2009/0004494 A1 | 1/2009 | Blenke et al. |
| 2009/0011959 A1 | 1/2009 | Costa et al. |
| 2009/0023603 A1 | 1/2009 | Selden et al. |
| 2009/0035770 A1 | 2/2009 | Mathies et al. |
| 2009/0053799 A1 | 2/2009 | Chang-Yen et al. |
| 2009/0056822 A1 | 3/2009 | Young et al. |
| 2009/0060797 A1 | 3/2009 | Mathies et al. |
| 2009/0084679 A1 | 4/2009 | Harrison et al. |
| 2009/0092970 A1 | 4/2009 | Williams |
| 2009/0134069 A1 | 5/2009 | Handique |
| 2009/0137413 A1 | 5/2009 | Mehta et al. |
| 2009/0148933 A1 | 6/2009 | Battrell et al. |
| 2009/0178934 A1 | 7/2009 | Jarvius et al. |
| 2009/0181411 A1 | 7/2009 | Battrell et al. |
| 2009/0253181 A1 | 10/2009 | Vangbo et al. |
| 2009/0269504 A1 | 10/2009 | Liao |
| 2009/0286327 A1 | 11/2009 | Cho et al. |
| 2009/0311804 A1 | 12/2009 | Mcbrady et al. |
| 2009/0314972 A1 | 12/2009 | Mcavoy et al. |
| 2009/0325277 A1 | 12/2009 | Shigeura et al. |
| 2010/0068723 A1 | 3/2010 | Jovanovich et al. |
| 2010/0111770 A1 | 5/2010 | Hwang et al. |
| 2010/0129810 A1 | 5/2010 | Greiner et al. |
| 2010/0172898 A1 | 7/2010 | Doyle et al. |
| 2010/0173398 A1 | 7/2010 | Peterman |
| 2010/0197507 A1 | 8/2010 | Rothberg et al. |
| 2010/0210008 A1 | 8/2010 | Strand et al. |
| 2010/0221726 A1 | 9/2010 | Zenhausern et al. |
| 2010/0224255 A1 | 9/2010 | Mathies et al. |
| 2010/0228513 A1 | 9/2010 | Roth et al. |

(56) References Cited

U.S. PATENT DOCUMENTS

| | | |
|---|---|---|
| 2010/0233696 A1 | 9/2010 | Joseph et al. |
| 2010/0243916 A1 | 9/2010 | Maurer et al. |
| 2010/0252123 A1 | 10/2010 | Mathies et al. |
| 2010/0266432 A1 | 10/2010 | Pirk et al. |
| 2010/0285578 A1 | 11/2010 | Selden et al. |
| 2010/0285606 A1 | 11/2010 | Phillips et al. |
| 2010/0285975 A1 | 11/2010 | Mathies et al. |
| 2010/0291666 A1 | 11/2010 | Collier et al. |
| 2010/0303687 A1 | 12/2010 | Blaga et al. |
| 2010/0304355 A1 | 12/2010 | Shuler et al. |
| 2010/0326826 A1 | 12/2010 | Harrison et al. |
| 2011/0003301 A1 | 1/2011 | Raymond et al. |
| 2011/0005932 A1 | 1/2011 | Jovanovich et al. |
| 2011/0008813 A1 | 1/2011 | Dilleen et al. |
| 2011/0020920 A1 | 1/2011 | Mathies et al. |
| 2011/0027913 A1 | 2/2011 | Bau et al. |
| 2011/0038758 A1 | 2/2011 | Akaba et al. |
| 2011/0045505 A1 | 2/2011 | Warthoe et al. |
| 2011/0053784 A1 | 3/2011 | Unger et al. |
| 2011/0070578 A1 | 3/2011 | Bell et al. |
| 2011/0124049 A1 | 5/2011 | Li et al. |
| 2011/0126910 A1 | 6/2011 | May |
| 2011/0127222 A1 | 6/2011 | Chang-yen et al. |
| 2011/0136179 A1 | 6/2011 | Bin/Lee et al. |
| 2011/0137018 A1 | 6/2011 | Chang-yen et al. |
| 2011/0171086 A1 | 7/2011 | Prins et al. |
| 2011/0172403 A1 | 7/2011 | Harrold et al. |
| 2011/0189678 A1 | 8/2011 | Mcbride et al. |
| 2011/0206576 A1 | 8/2011 | Woudenberg et al. |
| 2011/0212440 A1 | 9/2011 | Viovy et al. |
| 2011/0212446 A1 | 9/2011 | Wang et al. |
| 2011/0223605 A1 | 9/2011 | Bienvenue et al. |

FOREIGN PATENT DOCUMENTS

| | | |
|---|---|---|
| EP | 0637999 A1 | 2/1995 |
| EP | 0527905 B1 | 11/1995 |
| EP | 1065378 B1 | 4/2002 |
| EP | 1411340 A2 | 4/2004 |
| EP | 1411340 A3 | 5/2004 |
| EP | 1345697 B1 | 6/2007 |
| EP | 1658890 B1 | 5/2008 |
| EP | 1345551 B1 | 4/2009 |
| EP | 2345739 A2 | 7/2011 |
| JP | 2007-506430 A | 7/1995 |
| JP | 408327594 A | 12/1996 |
| JP | 2001-500966 A | 1/2001 |
| JP | 2001-521818 A | 11/2001 |
| JP | 2002-370200 A | 12/2002 |
| JP | 2003-536058 A | 12/2003 |
| JP | 2004-025159 A | 1/2004 |
| JP | 2004-108285 A | 4/2004 |
| JP | 2004-180594 A | 7/2004 |
| JP | 2005-323519 A | 11/2005 |
| JP | 2005-337415 | 12/2005 |
| JP | 2005-345463 A | 12/2005 |
| JP | 2007-155491 A | 6/2007 |
| JP | 2008-513022 A | 5/2008 |
| WO | WO 93/22053 A1 | 4/1993 |
| WO | WO 96/04547 A1 | 2/1996 |
| WO | WO 96/14934 A1 | 5/1996 |
| WO | WO 98/10277 A1 | 7/1997 |
| WO | WO 98/52691 A1 | 11/1998 |
| WO | WO 98/53300 A2 | 11/1998 |
| WO | WO 98/53300 A3 | 2/1999 |
| WO | WO 99/22868 A1 | 5/1999 |
| WO | WO 99/36766 A1 | 7/1999 |
| WO | WO 99/40174 A1 | 8/1999 |
| WO | WO 00/40712 A1 | 7/2000 |
| WO | WO 00/60362 A1 | 10/2000 |
| WO | WO 00/61198 A1 | 10/2000 |
| WO | WO 01/32930 A1 | 5/2001 |
| WO | WO 01/38865 A1 | 5/2001 |
| WO | WO 01/85341 A1 | 11/2001 |
| WO | WO 02/41995 A1 | 5/2002 |
| WO | WO 02/43615 A2 | 6/2002 |
| WO | WO 02/43864 A2 | 6/2002 |
| WO | WO 02/043864 A3 | 8/2002 |
| WO | WO 02/043615 A3 | 3/2003 |
| WO | WO 03/044528 A2 | 5/2003 |
| WO | WO 03/085379 A2 | 10/2003 |
| WO | WO 2004/038363 A2 | 5/2004 |
| WO | WO 03/044528 A3 | 6/2004 |
| WO | WO 2004/061085 A2 | 7/2004 |
| WO | WO 2004/061085 A3 | 10/2004 |
| WO | WO 2004/098757 A2 | 11/2004 |
| WO | WO 2004/038363 A3 | 12/2004 |
| WO | WO 2005/075081 A1 | 8/2005 |
| WO | WO 2005/091820 A2 | 10/2005 |
| WO | WO 2005/108620 A2 | 11/2005 |
| WO | WO 2005/118867 A2 | 12/2005 |
| WO | WO 2005/121308 A1 | 12/2005 |
| WO | WO 2006/032044 A2 | 3/2006 |
| WO | WO 2005/108620 A3 | 4/2006 |
| WO | WO 2004/098757 A3 | 5/2006 |
| WO | WO 2005/091820 A3 | 10/2006 |
| WO | WO 2006/032044 A3 | 1/2007 |
| WO | WO 2007/002579 A2 | 1/2007 |
| WO | WO 2007/064635 A1 | 6/2007 |
| WO | WO 2007/082480 A1 | 7/2007 |
| WO | WO 2007/109375 A2 | 9/2007 |
| WO | WO 2005/118867 A3 | 12/2007 |
| WO | WO 2008/012104 A2 | 1/2008 |
| WO | WO 2008/024319 A2 | 2/2008 |
| WO | WO 2008/024319 A3 | 4/2008 |
| WO | WO 2008/039875 A1 | 4/2008 |
| WO | WO 2008/012104 A3 | 5/2008 |
| WO | WO 2008/115626 A2 | 9/2008 |
| WO | WO 2007/109375 A3 | 10/2008 |
| WO | WO 2008/115626 A3 | 11/2008 |
| WO | WO 2009/008236 A1 | 1/2009 |
| WO | WO 2009/015296 A1 | 1/2009 |
| WO | WO 2007/002579 A3 | 9/2009 |
| WO | WO 2009/108260 A2 | 9/2009 |
| WO | WO 2009/129415 A1 | 10/2009 |
| WO | WO 2009/108260 A3 | 12/2009 |
| WO | WO 2010/041174 A1 | 4/2010 |
| WO | WO 2010/041231 A2 | 4/2010 |
| WO | WO 2010/042784 A2 | 4/2010 |
| WO | WO 2010/042784 A3 | 7/2010 |
| WO | WO 2010/041231 A3 | 9/2010 |
| WO | WO 2010/109392 A1 | 9/2010 |
| WO | WO 2010/130762 A2 | 11/2010 |
| WO | WO 2010/141921 A1 | 12/2010 |
| WO | WO 2011/003941 A1 | 1/2011 |
| WO | WO 2010/130762 A3 | 2/2011 |
| WO | WO 2011/012621 A1 | 2/2011 |
| WO | WO 2011/034621 A2 | 3/2011 |
| WO | WO 2011/084703 A2 | 7/2011 |
| WO | WO 2011/034621 A3 | 11/2011 |

OTHER PUBLICATIONS

U.S. Appl. No. 13/367,326, filed Feb. 6, 2012, Jovanovich et al.
U.S. Appl. No. 13/384,753, field Jan. 18, 2012, Stern et al.
Allowed Claims dated May 6, 2010 for U.S. Appl. No. 11/726,701.
Allowed Claims dated Jul. 1, 2010 for U.S. Appl. No. 11/139,018.
Allowed Claims dated Aug. 13, 2008 for U.S. Appl. No. 10/750,533.
Auroux, et al. Micro Total Analysis Systems 2. Analytical Standard Operations and Applications. Anal. Chem. 2002; 2637-2652.
Belgrader, et al. A Minisonicator to Rapidly Disrupt Bacterial Spores for DNA Analysis. Anal. Che. 1999; 4232-4236.
Belgrader, et al. PCR Detection of Bacteria in Seven Minutes. Science Magazin. 1999; 284(5413):449-450.
Belgrader, et al. Rapid PCR for Identity Testing Using a Battery-Powered Miniature Thermal Cycler. J Forensic Sci. 1998; 315-319.
Birnboim. A Rapid Alkaline Extraction Method for the Isolation of Plasmid DNA. Methods of Enzymology. 1983; 100:243-255.
Blazej, et al. Inline injection microdevice for attomole-scale sanger DNA sequencing. Anal Chem. Jun. 15, 2007;79(12):4499-506. Epub May 12, 2007.

(56) References Cited

OTHER PUBLICATIONS

Burns, et al. An Integrated Nanoliter DBA Analysis Device. Science Magazine. 1998; 484-487.
Call, et al. Detecting and genotyping *Escherichia coli* 0157:H7 using multiplexed PCR and nucleic acid microarrays. International Journal of Food Microbiology. 2001; 67:71-80.
Cameron, et al. High Internal Phase Emulsions (HIPEs) Structure, Properties and Use in Polymer Preparation. University of Strathclyde. 1995; 163214.
Canadian Office Action dated Jun. 10, 2011 for CA Application No. 2512071.
Capanu, et al. Design Fabrication and Testing of a Bistable Electromagnetically Actuated Microvalve. Journal of Microeclectromechanical System. 2000; 9:181-189.
Chandler, et al. Automated immunomagnetic separation and microarray detection of *E. coli* 0157:H7 from poultry carcass rinse. International Journal of Food Microbiology. 2001; 70:143-154.
Charlieu, et al. 3' Alu PCR: a simple and rapid method to isolate human polymorphic markers. Nucleic Acids Res. Mar. 25, 1992;20(6):1333-7.
Chinese office action dated Jan. 18, 2012 for CN 200980108368.7. (in Chinese with English translation).
Chinese Office Action dated Jan. 25, 2008 for Application No. 2003801100666.
Chinese office action dated Feb. 24, 2010 for CN Application No. 200780018073.1.
Delehanty, et al. A Microarray Immunoassay for Simultaneous Detection of Proteins and Bacteria. Anal. Chem. 2002; 74:5681-5687.
Dodson, et al. Fluidics Cube for Biosensor Miniaturization. Anal. Chem. 2001; 3776-3780.
Duffy, et al. Rapid Prototyping of Micro fluidic Systems in Poly(dimethylsiloxane). Anal. Chem. 1998; 4974-4984.
European office action dated Apr. 7, 2011 for EP Application No. 05804847.1.
Gau, et al. A MEMS based amperometric detector for *E. Coli* bacteria using self-assembled monolayers. Biosensors & Bioelectronic. 2001; 16:745755.
Hansen, et al. Polymerase chain reaction assay for the detection of *Bacillus cereus* group cells. FEMS Microbology Letters. 2001; 202:209-213.
Hartmann, et al. Direct immobilization of antibodies on phthalocyaninato-polysiloxane photopolymers. Thin Solid Films. 1994; 245:206-210.
Hartmann, et al. One-step immobilization of immunoglobulin G and potential of the method for application in immunosensors. Sensors and Actuators. 1995; 28 (2):143-149.
He, et al. Fabrication of Nanocolumns for Liquid Chromatography. Anal. Chem. 1998; 3790-3797.
Hjerten. High-performance electrophoresis : Elimination of electroendosmosis and solute adsorption. J. Chromotography. 1985; 347:191-198.
Hosokawa, et al. A Pneumatically-Actuated Three-Way Microvalve Fabricated with Polydimethylsiloxanc Using the Membrane Transfer Technique. J. Micinicch. Microcng. 2000; 10:415-420.
International search report and written opinion dated Oct. 29, 2007 for PCT/US2005/018678.
International search report and written opinion dated Mar. 16, 2012 for PCT/US2011/048528.
International search report and written opinion dated Jul. 15, 2008 for PCT/US2007/007381.
Jacobson, et al. High-Speed Separations on a Microchip. Anal. Chem. 1994; 1114-1118.
Jacobson, et al. Integrated Microdevice for DNA Restriction Fragment Analysis Anal. Chem. 1996; 720-723.
Japanese office action dated Jan. 5, 2012 for Application No. 2007-532553 (in Japanese with English translation).
Japanese Office Action dated Jan. 13, 2010 for JP Application No. 2005508628.
Japanese office action dated Mar. 1, 2011 for JP Application. No. 2007-515379.
Japanese Office Action dated Aug. 10, 2010 for JP Application No. 2005508628.
Kamei, et al. Integrated Amorphous Silicon Photodiode Detector for Microfabricaqted Capillary Electrophoresis Devices. Micro Total Analysis Systems. 2002; 257-259.
Kamei, et al. Integrated hydrogenated amorphous Si photodiode detector for microfluidic bioanalytical devices. Anal Chem. Oct. 15, 2003;75(20):5300-5.
Kimura, et al. Restriction-Site-Specific PCR as a Rapid Test to Detect Enterohemorrhagic *Escherichia coli* 0157:H7 Strains in Environmental Samples. Applied and Environmental Microbiology. Jun. 2000; 25132519.
Koch, et al. Optical flow-cell multichannel immunosensor for the detection of biological warfare agents. Biosens Bioelectron. Jan. 2000;14(10-11):779-84.
Kong, et al. Rapid detection of six types of bacterial pathogens in marine waters by multiplex PCR. Water Research. 2002; 36: 2802-2812.
Korean office action dated Mar. 5, 2012 for KR 10-2007-7008423. (in Korean with English translation).
Kourentzi, et al. Microbial identification by immunohybridization assay of artificial RNA labels. Journal of Microbiological Methods. 2002; 49:301-306.
Kuhnert, et al. Detection System for *Escherichia coli*—Specific Virulence Genes: Absence of Virulence Determinants in B and C Strains. applied and Environmental Microbiology. 1997:703-709.
Ligler, et al. Integrating Waveguide Biosensor. Anal Chem. Feb. 1, 2002;74(3):713-9.
Manz, et al. Miniaturized Total Chemical Analysis Systems: A Novel Concept for Chemical Sensing. Sensors & Actuators. 1990; 244-248.
McLaughlin, et al. Molecular Approaches to the Identification of Streptococci. Methods in Molecular Medicine. 1998; 15:117-139.
Medintz, et al. Genotyping Energy-Transfer Cassette Labeled Short Tandem Repeat Amplicons with Capillary Array Electrophoresis Microchannel Plates. Clinical Chemistry. 2001; 1614-1621.
Medintz, et al. High-Performance Genetic Analysis Using Microfabricated Capillary Array Electroporesis Microplates. Electrophoresis. 2001; 38453856.
Medintz, et al. High-Performance Multiplex SNP Analysis of Three Hemochmromatosis-Related Mutations with Capillary Array Electrophoresis Microplates. Genome Research. 2001; 413-421.
Medintz, et al. Novel Energy Transfer Fluorescence Labeling Cassette. BioTechniques. 2002; 32(2):270.
Nataro, et al. Diarrheagenic *Escherichia coli*. Clinical MicroBiology Reviews. Jan. 1998;142-201.
Notice of Allowance dated May 6, 2010 for U.S. Appl. No. 11/726,701.
Notice of Allowance dated Jul. 1, 2010 for U.S. Appl. No. 11/139,018.
Notice of Allowance dated Aug. 13, 2008 for U.S. Appl. No. 10/750,533.
Office action dated Jan. 7, 2011 for U.S. Appl. No. 12/844,544.
Office action dated Jan. 20, 2010 for U.S. Appl. No. 11/978,224.
Office action dated Feb. 22, 2010 for U.S. Appl. No. 11/139,018.
Office action dated Mar. 2, 2008 for U.S. Appl. No. 10/540,658.
Office action dated Mar. 29, 2012 for U.S. Appl. No. 12/789,186.
Office action dated Mar. 30, 2012 for U.S. Appl. No. 12/795,515.
Office action dated Apr. 11, 2012 for U.S. Appl. No. 11/139,018.
Office action dated Apr. 29, 2009 for U.S. Appl. No. 11/139,018.
Office action dated Aug. 27, 2008 for U.S. Appl. No. 11/139,018.
Office action dated Oct. 8, 2008 for U.S. Appl. No. 10/540,658.
Office action dated Oct. 25, 2010 for U.S. Appl. No. 11/978,224.
Office action dated Nov. 6, 2009 for U.S. Appl. No. 11/139,018.
Office action dated Dec. 11, 2009 for U.S. Appl. No. 11/726,701.
O'Mahony, et al. A real time PCR assay for the detection and quantitation of *Mycobacterium avium* subsp. Paratuberculosis using SYBR Green and the Light Cycler. Journal of Microbiological Methods. 2002; 51:283-293.
Papadelli, et al. Rapid detection and identification of *Streptococcus macedonicus* by species-specific PCR and DNA hybridisation. International Journal of Food Microbiology. 2003; 81:231-239.

(56) References Cited

OTHER PUBLICATIONS

Peng, et al. Immuno-capture PCR for detection of *Aeromonas hydrophila* Journal of Microbiological Methods. 2002; 49:335-338.
Press, et al., An Integrated Microfluidic Processor for Single Nucleotide Polymorphism-based DNA Computing, Lab on a Chip. 2005, 5:10, 8 pages.
Press, et al., The Art of Scientific Computing, Numerical Recipes in C, 2nd Edition, Cambridge University Press, 1992, (table of Contents).
Quake, et al. From Micro-to Nanofabrication with Soft Materials. Science Magazine. 2000; 1536-1540.
Reyes, et al. Micro Total Analysis Systems. 1. Introduction Theory and Technology. Anal Chem. 2002; 2623-2636.
Roth, et al. Fundamentals of Logic Design, $3^{rd}$ Edition, West Publishing Company, 1985 (Table of Content).
Rowe, et al. Array Biosensor for Simultaneous Identification of Bacterial, Viral and Protein Analytes. Anal. Chem. 1999; 71:3846-3852.
Rowe-Taitt, et al., Simultaneous detection of six biohazardous agents using a planar waveguide array biosensor. Biosensors & Bioelectronics. 2000; 15:579-589.
Ruan, et al. Immunobiosensor Chips for Detection of *Escherichia coli* 0157:H7 Using Electrochemical Impedance Spectroscopy. Anal. Chem. 2002; 74:4814-4820.
Sanford, et al. Photoactivatable Cross-Linked Polyacrylamide for the Site-Selective Immobilization of Antigens and Antibodies Chem Mater. 1998; 10(6): 15101520.
Shi, et al. Radial Capillary Array Electrophoresis Microplate and Scanner for High Performance Nucleic Acid Analysis. Anal. Chem. 1999; 5354-5361.
Soper, et al. Polymeric Microelectro-mechanical Systems. Anal. Chem 2000; 643-651.
Stumpfle, et al. Absence of DNA sequence homology with genes of the *Excherichia coli* hemB locus in Shiga-toxin producing *E. coli* (STEC) 0157 Strains. FEMS Microbiology Letters. 1999; 174:97-103.
Sun, et al. A Heater-Integrated Transparent Microchannel Chip for Continuous Flow PCR. Sensors and Actuators B. 2002; 84:283-289.
Tian, et al. Evaluation of Silica Resins for Direct and Efficient Extraction of DNA from Complex Biological Matrices in a Miniaturized Format. Analytical Biochemistry. 2000; 283:175-191.
Verlee, et al. .Fluid Circuit Technology: Integrated Interconnect Technology for Miniature Fluidic Devices. Abbott Laboratories Hospital Division, Abbott Park, IL. 1996; 9-14.
Walt, et al. Biological Warefare Detection. Analytical Chemistry 2000; 739-746.
Waters, et al. Microchip Device for Cell Lysis, Multiplex PCR Amplification, and Electrophoretic Sizing Anal. Chem. 1999; 158-162.
Webster, et al. Monolithic Capillary Electrophoresis Device with Integrated Fluorescence Detector. Anal. Chem. 2001;1622-1626.
White, et al. Flash detection/identification of pathogens, bacterial spores and bioterrorism agent biomarker from clinical and environmental matrices. Journal of Microbiological Methods. 2002; 48:139-147.
Yacoub-George, et al. Chemiluminescence multichannel immunosensor for biodetection Analytica Chimica Acta. 2002; 457:3-12.
Yang, et al. An Integrated Stacked Microlaboratory for Biological Agent Detection with DNA and Immunoassays. Biosensors & Bioelectronics. 2002; 17:605-618.
Zhu, et al. High-Sensitivity Capillary Electrophoresis of Double-Stranded DNA Fragments Using Monomeric and Dimeric Fluorescent Intercalating Dyes. Anal Chem. 1994; 1941-1948.
International search report dated May 14, 2010 for PCT Application No. US2009/06640.
International search report dated Jul. 30, 2010 for PCT Application No. US2010/36464.
Bianco, et al. Teflon-like coatings for micro devices. CPAC Satellite Workshops. Rome, Italy. Mar. 23, 2009.
Blaga, et al. Microfluidic device for automated sample preparation. Poster. MSB Conference. Dalian, China. Oct. 2009.
Blaga, et al. Plastic chips with valves and pumps. MSB Conference. Berlin, Germany. Mar. 2008. Abstract only.
Franklin, et al. Apollo 200: an integrated platform for DNA profiling. Poster. MCB Conference. Prague, Czech Republic. Mar. 2010.
International search report and written opinion dated Apr. 30, 2012 for PCT/US2012/021217.
Japanese office action dated May 11, 2012 for Application No. 2008-553535 (English translation).
Lee, et al. Polymer nanoengineering for biomedical applications. Annals Biomed. Eng. 2006; 34:75-88.
Lu, et al. New valve and bonding designs for microfluidic biochips containing proteins. Anal. Chem. 2007; 79:994-1001.
Office action dated May 22, 2012 for U.S. Appl. No. 12/526,015.
Oh, et al. A review of microvalves. J. Micromech. Microeng. 2006; 16:R13-R39.
Samel. Novel Microfluidic devices based on a thermally responsive PDMS composite. KTH Royal Institute of Technology, Stockholm, Sweden. 2007; 1-80.
Tajima, et al. Physiochemical properties and morphology of fluorocarbon films synthesized on crosslinked polyethylene by capacitively coupled octafluorocyclobutane plasma. J. Phys. Chem. C. 2007; 111(11):4358-4367.
Willis, et al. Monolithic teflon membrane valves and pumps for harsh chemical and low-temperature use. Lab Chip. 2007; 7:1469-1474.
Zhang, et al. PMMA/PDMS valves and pumps for disposable microfluidics. Lap Chip. 2009; 9:3088-3094.
U.S. Appl. No. 13/287,398, filed Nov. 2, 2011, Jovanovich et al.
Chinese office action dated Jul. 8, 2011 for CN 200580035911.7. (In Chinese with English translation).
International search report and written opinion dated Jan. 5, 2012 for PCT Application No. US2011/048527.
International search report and written opinion dated Oct. 26, 2011 for PCT Application No. US11/38180.
International written opinion dated Oct. 6, 2010 for PCT Application No. US10/37545.
International written opinion report dated Jul. 30, 2010 for PCT Application No. US2010/36464.
Japanese office action dated May 27, 2011 for Application No. 2007-532553 (in Japanese with English translation).
Japanese office action dated Jul. 28, 2011 for Application No. 2008-553535 (in Japanese with English translation).
U.S. Appl. No. 13/075,165, field Mar. 29, 2011, Eberhart et al.
U.S. Appl. No. 13/113,968, filed May 23, 2011, Majlof et al.
Armani, et al. Re-configurable fluid circuits by PDMS elastomer micromachining. Proceedings of IEEE Micro Electro Mechanical Systems: MEMS. 1999; 222-227.
European search report and search opinion dated Jun. 6, 2011 for Application No. 10011511.2.
International search report and written opinion dated Jun. 9, 2011 for PCT Application No. US2011/30973.
Notice of allowance dated Jun. 9, 2011 for U.S. Appl. No. 12/831,949.
U.S. Appl. No. 13/202,877, filed Aug. 23, 2011, Vangbo et al.
U.S. Appl. No. 13/202,884, filed Aug. 23, 2011, Jovanovich et al.
Bennett, et al. Toward the 1,000 dollars human genome. Pharmacogenomics, 6 (4) 373-382. (Jun. 2005).
Chinese office action dated Jan. 31, 2011 for CN 200580035911.7. (In Chinese with English translation).
Erratum for Margulies, et al. Genome sequencing in microfabricated high-density picolitre reactors. Nature. 2005;437(7057):376-80.: Margulies, et al. Nature. 441(7089):120. (May 4, 2006).
International search report dated Sep. 1, 2010 for PCT/US2010/040490.
U.S Appl. No. 12/026,510, filed Feb. 5, 2008, Jovanovich et al.
U.S Appl. No. 12/526,015, filed Nov. 3, 2010, Jovanovich et al.
U.S Appl. No. 12/815,685, filed Jun. 15, 2010, Jovanovich et al.
U.S Appl. No. 12/820,390, filed Jun. 22, 2010, Harrison et al.
U.S Appl. No. 12/845,650, filed Jul. 28, 2010, Jovanovich et al.
U.S Appl. No. 12/852,370, filed Aug. 6, 2010, Harrison et al.
U.S Appl. No. 12/949,623, filed Nov. 18, 2010, Kobrin et al.

(56) References Cited

OTHER PUBLICATIONS

Japanese Office Action dated Apr. 27, 2010 for Application No. JP2001-540363 (in Japanese with English translation).
Japanese Office Action dated Dec. 21, 2010 for Application No. JP2001-540363 (in Japanese with English translation).
MillGat pump user manual, version 2.12, published 2005, pp. 1-28.
International search report and written opinion dated Mar. 24, 2011 for PCT Application No. US2010/058227.
International search report and written opinion dated Sep. 1, 2010 for PCT Application No. US2010/040490.
Declaration of John R. Storella. Dated May 15, 2012.
Amendment and Request for Correction of Inventorship mailed Jan. 10, 2008 in U.S. Appl. No. 10/750,533.
Anderson, et al. A miniature integrated device for automated multistep genetic assays. Nucleic Acids Research. 2000;28:e60.
Bings, et al. Microfluidic Devices Connected to Fused-Silica Capillaries with Minimal Dead Dead Volume. Analytical Chemistry. 1999;71(15):3292-3296.
Blazej, et al. Microfabricated bioprocessor for integrated nanoliter-scale Sanger DNA sequencing. Proc. Natl. Acad. Sci. USA 2006;103:7240-7245.
Blazej, et al. Polymorphism Ratio Sequencing: A New Approach for Single Nucleotide Polymorphism Discovery and Genotyping. Genome Research. 2003;13:287-293.
Brenner, et al. Gene expression analysis by massively parallel signature sequencing (MPSS) on microbead arrays. Nature Biotechnology. 2000;18(6):630-634.
Buchholz, et al. The use of light scattering for precise characterization of polymers for DNA sequencing by capillary electrophoresis. Electrophoresis. 2001;22:4118-4128.
Caplus abstract of Krohkin et al. Modified silica as a stationary phase for ion chromatography. Journal of Chromatography A. 1995;706:93-8.
Chan, et al. Microfabricated Polymer Devices for Automated Sample Delivery of Peptides for Analysis by Electrospray Ionization Tandem Mass Spectrometry. Analytical Chemistry. 1999;71(20):4437-4444.
Chiem, et al. Microchip systems for immunoassay: an integrated immunoreactor with electrophoretic separation for serum theophylline determination. Clinical Chemistry.1998;44(3):591-598.
Chiem, et al. Room temperature bonding of micromachined glass devices for capillary electrophoresis. Sensors and Actuators. 2000;B63(3):147-152.
Coleman, et al. A sequential injection microfluidic mixing strategy. Microfluidics and Nanofluidics. 2005;319-327.
Curcio, et al. Continuous Segmented-Flow Polymerase Chain Reaction for High-Throughput Miniaturized DNA Amplification. Analytical Chemistry. 2003;75(1):1-7.
Diehl, et al. BEAMing: single-molecule PCR on microparticles in water-in-oil emulsions. Nature Methods. 2006;3(7):551-9.
Doherty, et al. Sparsely Cross-linked "Nanogel" Matrices as Fluid, Mechanically Stablized Polymer Networks for High-Throughput Microchannel DNA Sequencing. Analytical Chemistry. 2004;76:5249-5256.
Doherty, et al. Sparsely cross-linked "nanogels" for microchannel DNA sequencing. Electrophoresis. 2003;24(24):4170-4180.
Dorfman, et al. Contamination-Free Continuous Flow Microfluidic Polymerase Chain Reaction for Quantitative and Clinical Applications. Analytical Chemistry. 2005;77(11):3700-3704.
Doyle, et al: Self-Assembled Magnetic Matrices for DNA Separation Chips. Science. 2000;295:2237.
Dressman, et al. Transforming single DNA molecules into fluorescent magnetic particles for detection and enumeration of genetic variations. Proc Natl Acad Sci USA. 2003;100(15):8817-8822.
Emrich, et al. Microfabricated 384-Lane Capillary Array Electrophoresis Bioanalyzer for Ultrahigh-Throughput Genetic Analysis. Analytical Chemistry. 2002;74(19):5076-5083.
Ericson, et al. Electroosmosis- and Pressure-Driven Chromatography in Chips Using Continuous Beds. Analytical Chemistry. 2000;72(1):81-87.

European search report dated Dec. 18, 2009 for Application No. 03808583.3.
Ewing, et al. Base-Calling of Automated Sequencer Traces Using Phred. I. Accuracy Assessment. Genome Research. 1998;8:175-185.
Ewing, et al. Base-Calling of Automated Sequencer Traces Using Phred. II. Error probabilities. Genome Research. 1998;8:186-194.
Figeys, et al. A Microfabricated Device for Rapid Protein Identification by Microelectrospray Ion Trap Mass Spectrometry. Analytical Chemistry. 1997;69(16):3153-3160.
Figeys, et al. An Integrated Microfluidics-Tandem Mass Spectrometry System for Automated Protein Analysis. Analytical Chemistry. 1998;70(18):3728-3734.
Figeys, et al. Microfabricated Device Coupled with an Electrospray Ionization Quadrupole Time-of-Flight Mass Spectrometer: Protein Identifications Based on Enhanced-Resolution Mass Spectrometry and Tandem Mass Spectrometry Data. Rapid Communications in Mass Spectrometry. 1998;12:1435-1444.
Figeys, et al. Nanoflow Solvent Gradient Delivery from a Microfabricated Device for Protein Identifications by Electrospray Ionization Mass Spectrometry. Analytical Chemistry. 1998;70(18):3721-3727.
Francis, et al. Flow analysis based on a pulsed flow of solution: theory, instrumentation and applications. Talanta. 2002;58(6):1029-1042.
Ghadessy, et al. Directed evolution of polymerise function by compartmentalized self-replication. Proc Natl Acad Sci USA. 2001;98:4552-4557.
Giddings, et al. A software system for data analysis in automated DNA sequencing. Genome Research. 1998;8:644-665.
Goll, et al. Microvalves with bistable buckled polymer diaphragms. Journal of Micromechanics and Microengineering. 1996;6:77-79.
Grover, et al. An integrated microfluidic processor for single nucleotide polymorphism-based DNA computing. Lab on a Chip. 2005;5(10):1033-1040.
Grover, et al. Development and multiplexed control of latching pneumatic valves using microfluidic logical structures. Lab on a chip. 2006;6:623-631.
Grover, et al. Monolithic membrane valves and diaphragm pumps for practical large-scale integration into glass microfluidic devices. Sensors and Actuators. 2003;B89:315-323.
Grover, et al. Practical Valves and Pumps for Large-Scale Integration into Microfludic Analysis Devices. Micro Total Analysis Systems. 2002;1:136-138.
Hansen, et al. A robust and scalable microfluidic metering method that allows protein crystal. growth by free interface diffusion. Proc Natl Acad Sci USA. 2002;99(26):16531-16536.
Harrison, et al. Micromachining a Miniaturized Capillary. Electrophoresis-Based Chemical Analysis System on a Chip. Science. 1993;261(5123):895-897.
Hayes, et al. Edge: A Centralized Resource for the Comparison, Analysis, and Distribution of Toxicogenomic Information. Molecular Pharmacology. 2005;67(4):1360-1368.
Hultman, et al. Bidirectional Solid-Phase Sequencing of In Vitro-Amplified Plasmid DNA. BioTechniques. 1991;10(1):84-93.
International Preliminary Report for corresponding PCT Application No. PCT/CA2000/01421 dated Feb. 14, 2002.
International Preliminary Report for corresponding PCT Application No. PCT/US2005/018678 dated Nov. 13, 2007.
International Preliminary Report for corresponding PCT Application No. PCT/US2005/033347 dated Mar. 20, 2007.
International Preliminary Report for corresponding PCT Application No. PCT/US2007/007381 dated Sep. 23, 2008.
International Preliminary Report for corresponding PCT Application No. PCT/US2007/02721 dated Aug. 5, 2008.
International Preliminary Report for corresponding PCT Application No. PCT/US2007/061573 dated Aug. 26, 2008.
International search report dated Aug. 5, 2001 for PCT Application No. CA2000/01421.
International search report dated Jul. 11, 2008 for PCT Application No. US07/61573.
International search report dated Aug. 23, 2006 for PCT Application No. US2005/033347.

(56) References Cited

OTHER PUBLICATIONS

International search report dated Aug. 26, 2004 PCT Application No. US2003/41466.
International Search Report for PCT/US2005/033347.
Jacobson, et al. Electrokinetic Focusing in Microfabricated Channel Structures. Anal. Chem., 1997, 69 (16), pp. 3212-3217.
Ju, et al. Fluorescence energy transfer dye-labeled primers for DNA sequencing and analysis. Proc. Natl. Acad. Sci. USA. 1995;92:4347-4351.
Kan, et al. A novel thermogelling matrix for microchannel DNA sequencing based on poly-N-alkoxyalkylaclylamide copolymers. Electrophoresis. 2003;24(24):4161-4169.
Koh, et al. Integrating Polymerase Chain Reaction, Valving, and Electrophoresis in a Plastic Device for Bacterial Detection. Analytical Chemistry. 2003;75(17):4591-4598.
Kopp, et al. Chemical Amplification Continuous-Flow PCR on a Chip. Science. 1998;280:1046-1048.
Lagally, et al. Fully integrated PCR-capillary electrophoresis microsystem for DNA analysis. Lab on a Chip. 2001;1(2):102-107.
Lagally, et al. Integrated Portable Genetic Analysis Microsystem for Pathogen/Infectious Disease Detection. Analytical Chemistry. 2004;76:3162-3170.
Lagally, et al. Monolithic integrated microfluidic DNA amplification and capillary electrophoresis analysis system. Sensors and Actuators. 2000;B63(3):138-146.
Lagally, et al. Single-Molecule DNA Amplification and Analysis in an Integrated Microfluidic Device. Analytical Chemistry. 2001;73(3): 565-570.
Lazar, et al. Subattomole-Sensitivity Microchip Nanoelectrospray Source with Time-of-Flight Mass Spectrometry Detection. Analytical Chemistry. 1999;7(17):3627-3631.
Li, et al. Integration of Microfabricated Devices to Capillary Electrophoresis-Electrospray Mass Spectrometry Using a Low Dead Volume Connection: Application to Rapid Analyses of Proteolytic Digests. Analytical Chemistry. 1999;71(15):3036-3045.
Li, et al. Rapid and sensitive separation of trace level protein digests using microfabricated devices coupled to a quadrupole—time-of-flight mass spectrometer. Electrophoresis. 2000;21:198-210.
Li, et al. Separation and Identification of Peptides from Gel-Isolated Membrane Proteins Using a Microfabricated Device for Combined Capillary Electrophoresis/Nanoelectrospray Mass Spectrometry. Analytical Chemistry. 2000;72(3):599-609.
Licklider, et al. A Micromachined Chip-Based Electrospray Source for Mass Spectrometry. Analytical Chemistry. 2000;72(2):367-375.
Lisec, et al. A bistable pneumatic microswitch for driving fluidic components. Sensors and Actuators. 1996;A54:746-749.
Liu, et al. Automated parallel DNA sequencine on multiple channel microchips. Proc. Natl. Acad. Sci. USA. 2000;97(10):5369-5374.
Liu, et al. Optimization of High-Speed DNA Sequencing on Microfabricated Capillary Electrophoresis Channels. Analytical Chemistry. 1999;71:566-573.
Margulies, et al. Genome sequencing in microfabricated high-density picolitre reactors. Nature. 2005;437(7057):376-80. (Abstact only).
Melin, et al. A Passive 2-Dimensional Liquid Sample Micromixer. 7th International Conference on Miniaturized Chemical and Biochemical Analysis Systems. 2003;167-170.
Mitra, et al. Digital genotyping and haplotyping with polymerase colonies. Proc Natl Acad Sci USA. 2003.100(10):15926-5931.
Norris, et al. Fully-integrated, multiplexed STR-based human identification using a single microfluidic chip and automated instrument. Available at http://www.promega.com/geneticidproc/ussymp20proc/oralpresentations/landersbienvenue.pdf. Accessed Jun. 2, 2010.
Obeid, et al. Microfabricated Device for DNA and RNA Amplification by Continuous-Flow Polymerase Chain Reaction and Reverse Transcription-Polymerase Chain Reaction with Cycle Number Selection. Analytical Chemistry. 2003;75(2): 288-295.

Ocvirk, et al. High Performance Liquid Chromatography Partially Integrated onto a Silicon Chip. Analytical Methods and Instrumentation. 1995;2:74-82.
Ocvirk, et al. Optimization of confocal epifluorescence microscopy for microchip-based miniaturized total analysis systems. The Analyst. 1998;123:1429-1434.
Office Action Final dated Feb. 19, 2008 issued in U.S. Appl. No. 10/540,658.
Office Action Final dated Feb. 6, 2008 issued in U.S. Appl. No. 11/139,018.
Office Action mailed Apr. 27, 2007 in U.S. Appl. No. 11/139,018, filed May 25, 2005.
Office Action mailed Jul. 2, 2007 in U.S. Appl. No. 10/540,658, filed Jun. 23, 2005.
Office Action mailed Jul. 12, 2007 in U.S. Appl. No. 10/750,533, filed Dec. 29, 2003.
Ohori, et al. Partly disposable three-way mirovalve for a medical micro total analysis system (muTAS). Sensors and Actuators. 1998;A64(1): 57-62.
Oleschuk, et al. Trapping of Bead-Based Reagents within Microfluidic Systems: On-Chip Solid-Phase Extraction and Electrochromatography. Analytical Chemistry. 2000;72:585-590.
Olsen, et al. Immobilization of DNA Hydrogel Plugs in Microfluidic Channels. Analytical. Chemistry. 2002;74:1436-1441.
Paegel, et al. High-throughput DNA sequencing with a 96-lane capillary array electrophoresis bioprocessor. Proc Natl Acad Sci USA. 2002;99:574-579.
Paegel, et al. Microchip Bioprocessor for Integrated Nanovolume Sample Purification and DNA Sequencing. Analytical Chemistry. 2002;74(19):5092-5098.
Paegel, et al. Microfluidic devices for DNA sequencing: sample preparation and electrophoretic analysis. Current Opinion in Biotechnology. 2003;14(1):42-50.
Paegel, et al. Turn Geometry for Minimizing Band Broadening in Microfabricated Capillary Electrophoresis Channels. Analytical Chemistry. 2000;72:3030-3037.
PCT Notification of Transmittal of the International Search Report and the Written Opinion of the International Searching Authority, or the Declaration, mailed Jun. 17, 2008, Application No. PCT/US2007/082568.
Peterson, et al. Enzymatic Microreactor-on-a-Chip: Protein Mapping Using Trypsin Immobilized on Porous Polymer Monoliths Molded in Channels of Microfluidic Devices. Analytical Chemistry. 2002;74:4081-4088.
Ramsey, et al. Generating Electrospray from Microchip Devices Using Electroosmotic Pumping. Analytical Chemistry. 1997;69(6):1174-1178.
Rohr, et al. Porous polyiner monoliths: Simple and efficient mixers prepared by difect polymerization in the channels of microfluidic chips. Electrophoresis. 2001;22:3959-3967.
Rye, et al. High-sensitivity two-color detection of double-stranded DNA with a confocal fluorescence gel scanner using ethidium homodimer and thiazole orange. Nucleic Acids Research. 1991;19(2):327-333.
Scherer, et al. High-Pressure Gel Loader for Capillary Array Electrophoresis Microchannel Plates. Biotechniques. 2001;31(5):1150-1154.
Schomburg, et al. Design Optimization of Bistable Microdiaphragm Valves. Sensors and Actuators. 1998;A64:259-264.
Seifar, et al. Capillary electrochromatography with 1.8-mum ODS-modified porous silica particles. Journal of Chromatography. 1998; A808:71-77.
Simpson, et al. High-throughput genetic analysis using microfabricated 96-sample capillary array electrophoresis microplates. Proc Natl Acad Sci USA. 1998;95:2256-2261.
Simpson, et al. Microfabrication Technology for the Production of Capillary Array Electrophoresis Chips. Biomedical Microdevices. 1998;1:7-26.
Soper, et al. Sanger DNA Sequencing Reactions Performed in a Solid-Phase Nanoreactor Directly Coupled to Capillary Gel Electrophoresis. Analytical Chemistry. 1998;70:4036-4043.

(56) References Cited

OTHER PUBLICATIONS

Spiering, et al. Novel microstructures and technologies applied in chemical analysis techniques. 1997 International Conference on Solid-State Sensors and Actuators. 1997;1:511-514.
Takao, et al. A Pneumatically Actuated Full In-Channel Microvalve With MOSFET-Like Function in Fluid Channel Networks. Journal of Microelectromechanical Systems. 2002; 11(5):421-426.
Takao, et al. Microfluidic Integrated Circuits for Signal Processing Using Analogous Relationship Betweeen Pneumatic Microvalve and MOSFET. Journal of Microelectromechanical Systems. 2003;12(4):497-505.
Thomas, et al. Application of Genomics to Toxicology Research. Environmental Health Perspectives. 2002;110(6):919-923.
Thorsen, et al. Microfluidic Large-Scale Integration. Science. 2002;298(5593):580-584.
Tice, et al. Formation of Droplets and Mixing in Multiphase Microfluidics at Low Values of the Reynolds and the Capillary Numbers. Langmuir. 2003;19:9127-9133.
Unger, et al. Monolithic Microfabricated Valves and Pumps by Multilayer Soft Lithography. Science. 2000;288:113-116.
Van Der Moolen, et al. A Micromachined Injection Device for CZE: Application to Correlation CZE. Analytical Chemistry. 1997;69(20):4220-4225.
Van Der Moolen, et al. Correlation Capillary Zone Electrophoresis, a Novel Technique to Decrease Detection Limits. Chromatographia. 1995;40(7/8):368-374.
Vazquez, et al. Electrophoretic Injection within Microdevices. Analytical Chemistry. 2002;74:1952-1961.
Veenstra, et al. The design of an in-plane compliance structure for microfluidical systems. Sensors and Actuators. 2002;B81:377-383.
Waller, et al. Quantitative Immunocapture PCR Assay for Detection of Campylobacter jejuni in Foods. Applied Environmental Microbiology. 2000; 66(9):4115-4118.
Weimer, et al. Solid-Phase Capture of Proteins, Spores; and Bacteria. Applied Environmental Microbiology. 2001;67(3):1300-1307.
Wen, et al. Microfabricated isoelectric focusing device for direct electrospray ionization-mass spectrometry. Electrophoresis. 2000;21:191-197.
Wikipedia brochure for defining stocahstic process. Sep. 2, 2009.
Williams, et al. Amplification of complex gene libraries by emulsion PCR. Nature Methods. 2006;3(7):545-50.
Woolley, et al. Functional Integration of PCR Amplification and Capillary Electrophoresis in a Microfabricated DNA Analysis Device. Analytical Chemistry. 1996;68(23):4081-4086.
Wright, et al. Behavior and Use of Nonaqueous Media without Supporting Electrolyte in Capillary Electrophoresis and Capillary Electrochromatography. Analytical Chemistry. 1997;69(16):3251-3259.
Xiang, et al. An Integrated Microfabricated Device for Dual Microdialysis and On-Line ESI-Ion Trap Mass Spectrometry for Analysis of Complex Biological Samples. Analytical Chemistry. 1999;71(8):1485-1490.
Xue, et al. Integrated Multichannel Microchip Electrospray Ionization Mass Spectrometry: Analysis of Peptides from On-Chip Tryptic Digestion of Melittin. Rapid Communications in Mass Spectrometry. 1997;11:1253-1256.
Xue, et al. Multichannel Microchip Electrospray Mass Spectrometry. Analytical Chemistry. 1997;69(3):426-430.
Yang, et al. A MEMS thermopneumatic silicone rubber membrane valve. Sensors and Actuators. 1998;A64(1):101-108.
Yu, et al. Preparation of Monolithic Polymers with Controlled Porous Properties for Microfluidic Chip Applications Using Photoinitiated Free Radial Polymerization Journal of Polymer Science. 2002;40:755-769.
Yu, et al. Towards stationary phases for chromatography on a microchip: Molded porous polymer monoliths prepared in capillaries by photoinitiated in situ polymerization as separation media for electrochromatography. Electrophoresis 2000;21:120-127.
Zhang, et al. A Microdevice with Integrated Liquid Junction for Facile Peptide and Protein Analysis by Capillary Electrophoresis/Electrospray Mass Spectrometry Analytical Chemistry. 2000;72(5):1015-1022.
Zhang, et al. Microfabricated Devices for Capillary Electrophoresis-Electrospray Mass Spectrometry. Analytical Chemistry. 1999;71(15):3258-3264.
U.S. Appl. No. 90/011,453, filed Jan. 21, 2011, Mathias et al.
European search report and search opinion dated Aug. 17, 2011 for Application No. 08799648.4.
Notice of allowance dated Sep. 8, 2011 for U.S. Appl. No. 12/820,390.
Datasheet Cycle Sequencing, Retrieved from the internet, URL:http//answers.com/topic/cycle sequencing. Printed Sep. 3, 2010, pp. 1-2.
European search report dated Sep. 1, 2010 for Application No. 5804847.1.
International search report dated Oct. 6, 2010 for PCT Application No. US10/37545.
International search report dated Aug. 18, 2009 for PCT Application No. US09/00419.
International search report dated Sep. 25, 2007 for PCT Application No. US2007/02721.

\* cited by examiner

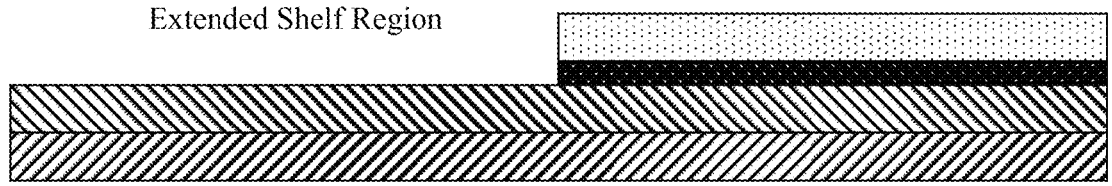
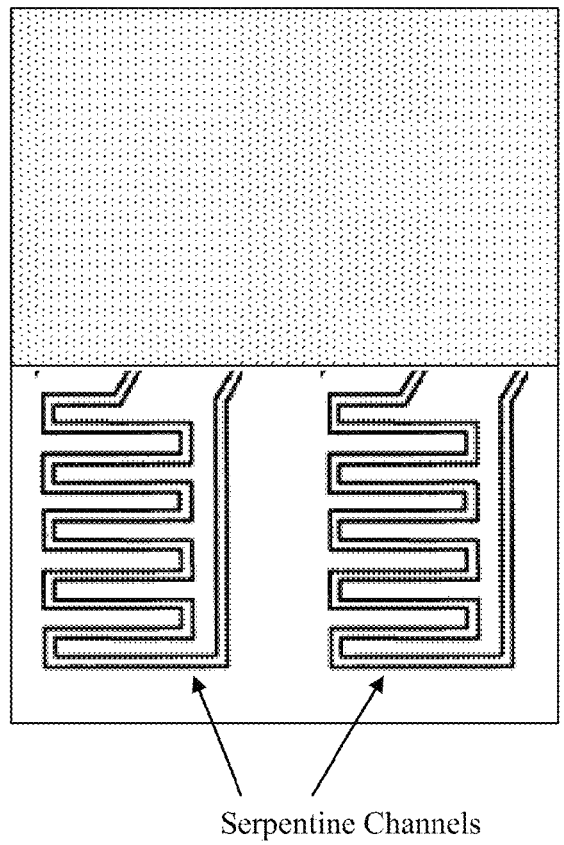
Figure 1

Fabrication chip with 2 MicrofluidicChip Devices
Actual chip on 4 inch diameter circle
Standard 9mm center to center spacing for
compatibility with lab Thermal control element: four thermal zone stations Thermal control element: bottom view Microfluidic chip device attached to one station of thermal control element

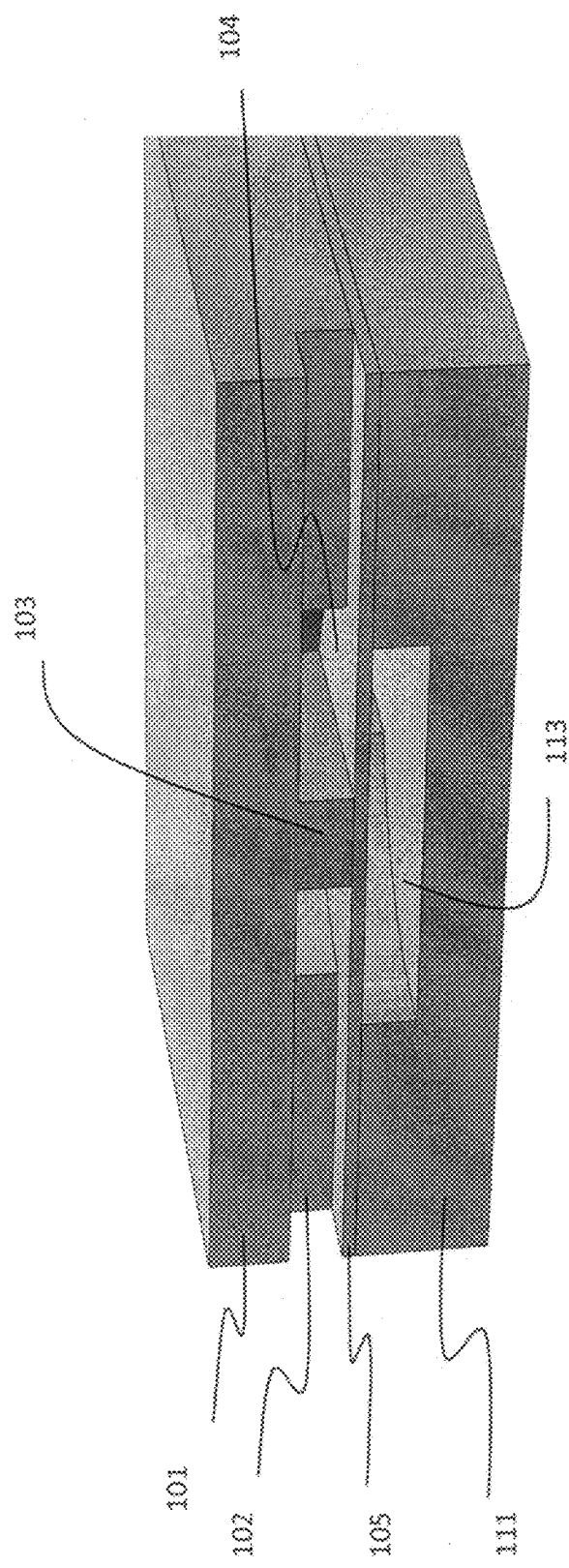

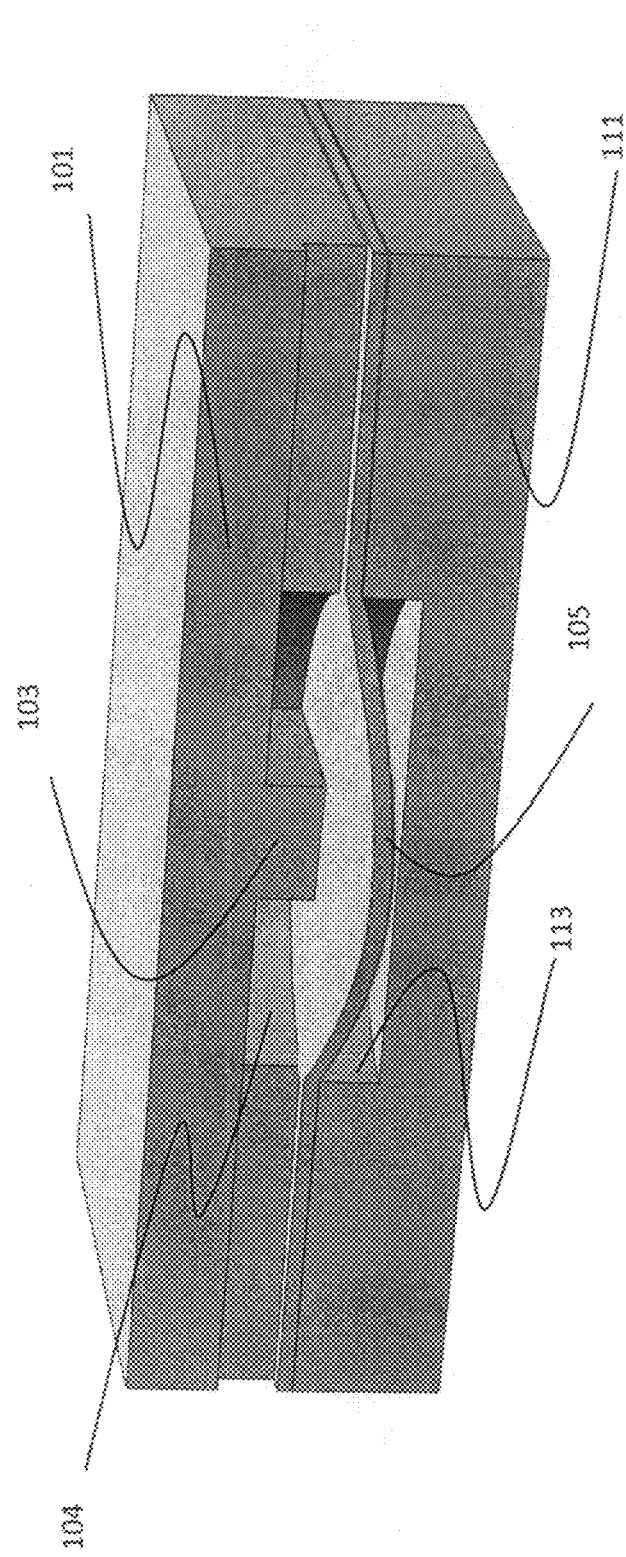

MICROFLUIDIC METHODS

CROSS-REFERENCE

This application claims the benefit of the filing date of the following U.S. Provisional Patent Applications: 61/204,179, filed Dec. 31, 2008; 61/205,534, filed Jan. 20, 2009; 61/162,080, filed Mar. 20, 2009; and 61/227,382, filed Jul. 21, 2009.

STATEMENT AS TO FEDERALLY SPONSORED RESEARCH

This invention was made with government support under Grant No. HG003583 awarded by the NIH. The government has certain rights in the invention.

BACKGROUND OF THE INVENTION

A variety of microfluidic devices of disparate design have been developed in the past often with the goal of reducing sample volume requirements in bioanalytical methods, integrating multiple steps into automated processes, integrating sample preparation and analysis, and connecting to the full volume world of samples and procedures.

In the absence of standards controlling external dimensional form factors, the nature of the upstream and downstream external interface, and the length, cross-sectional geometry, and diameter of the internal microfluidic pathways, such microfluidic devices often proved incompatible with one another and with existing upstream purification and downstream analytical devices. Despite advances in microfabrication, the processing, reaction, and sample size requirements for many biochemical and chemical reactions have served as obstacles for the creation of microfluidic devices useful in many fields, including nucleic acid sequencing. Thus, there is a need in the art for microfluidic devices that are suitable for use in the processing and recovery of biochemical and chemical reactions for subsequent analyses in these fields.

SUMMARY OF THE INVENTION

In one aspect, this invention provides a microfluidic device comprising: (a) a fluidics layer comprising fluidic channels; (b) a pneumatics layer comprising pneumatic channels; and (c) an actuation layer sandwiched between the fluidics layer and the pneumatic layer, wherein the device comprises at least one diaphragm valve comprised in the sandwich, wherein activation of the valve regulates fluid flow in a fluidics channel, and wherein the device further comprises an isolated portion of the fluidics layer that comprises microfluidic channels and that is not covered by the pneumatics layer and, optionally, the actuation layer. In one embodiment, the fluidic layers of the device comprise internal channels and the isolated portion is not covered by the actuation layer. In one embodiment, the fluidics layer comprises grooves in a surface of the layer that function as fluidic channels and in the isolated portion the grooves are covered by the actuation layer or a layer of another material. In another embodiment, the isolated portion of the microfluidic device forms a shelf that extends beyond an edge of the sandwich. In one embodiment, the fluidic channels in the isolated portion of the microfluidic device comprise a plurality of curves. In another embodiment, the fluidic channels in the isolated area of the microfluidic device form a serpentine shape. In one embodiment, the fluidic channels within the isolated portion of the fluidic layer of the microfluidic device have an aspect ratio of height to width of up to or less than 0.2, 0.5, 0.75, 1, or 2. In another embodiment, the isolated portion of the fluidics layer of the microfluidic device is between about ½ and about 1/100 of the area of the entire fluidics layer.

In one embodiment, the fluidics layer of the microfluidic device is comprised of glass. In another embodiment, the actuation layer of the microfluidic device comprises PDMS.

In another embodiment, the fluid flow in a plurality of the fluidics channels of the microfluidic device is regulated by a single pneumatics channel. In yet another embodiment, the microfluidic device comprises a plurality of fluidic circuits.

In another embodiment, the microfluidic device further comprises a heat spreader in thermal contact with the isolated portion. In another embodiment, the isolated portion of the microfluidic device is in thermal contact with a thermal regulator. In one embodiment, the thermal regulator comprises one or more resistive wires. In another embodiment, a first surface of the isolated portion of the microfluidic device is in thermal contact with a first thermal regulator and a second surface opposing the first surface is in thermal contact with a second thermal regulator. In another embodiment, a first surface of the isolated portion of the microfluidic device is in thermal contact with a first thermal regulator and a second surface is in thermal contact with an insulator.

In another aspect, the invention provides a microfluidic device comprising: (a) a fluidics layer comprising fluidic channels; and (b) an actuation layer in contact with a portion of the fluidics layer, wherein the actuation layer regulates fluid flow in the fluidics channels, and wherein the fluidics layer comprises a portion that is not in contact with the actuation layer and that comprises microfluidics channels.

In another aspect, the invention provides a microfluidic device comprising: first, second, and third glass layers, and an elastomeric layer, wherein: (a) the first glass layer is interfaced with the second glass layer and the first and second glass layers form one or more fluidic channels; (b) the elastomeric layer is positioned between the second and third glass layers and the second glass layer and elastomeric layer form one or more chambers that are in fluid communication with the one or more fluidic channels; and (c) the elastomeric layer and the third glass layer form one or more pneumatic channels, and further wherein a first portion of the first and second glass layers are isolated from the elastomeric layer and the third glass layer. In one embodiment, the isolated portion of the microfluidic device extends beyond the edge of the elastomeric layer and the third glass layer to form a shelf. In another embodiment, the one or more chambers of the microfluidic device have adjustable volume. In another embodiment, the one or more chambers of the microfluidic device comprise valves. In one embodiment, the third glass layer of the microfluidic device does not extend beyond the elastomeric layer. In another embodiment, a portion of the first glass layer of the microfluidic device extends beyond the elastomeric layer. In yet another embodiment, the portion of the first glass layer of the microfluidic device that extends beyond the elastomeric layer is in thermal contact with a thermal regulator. In one embodiment, the one or more fluidic channels of the microfluidic device form serpentine channels.

Another aspect of the invention provides a method for regulating temperature of a fluid in a microfluidic channel comprising: (a) providing a microfluidic device comprising a fluidics layer comprising fluidic channels; a pneumatics layer comprising pneumatic channels; and an actuation layer sandwiched between the fluidics layer and the pneumatic layer, wherein the device comprises at least one diaphragm valve comprised in the sandwich, wherein activation of the valve regulates fluid flow in a fluidics channel, and wherein the device further comprises an isolated portion of the fluidics layer that comprises microfluidic channels and that is not covered by the pneumatics layer and, optionally, the actuation layer; (b) moving liquid into a segment of a fluidic channel in the isolated portion; and (c) regulating the temperature of the liquid while in the fluidic channel in the isolated portion. In one embodiment, the method for regulating temperature of a fluid in a microfluidic channel comprises cycling the temperature of the liquid.

Another aspect of the invention provides an instrument comprising: (a) a base comprising a thermal regulator; and (b) a microfluidic device comprising a fluidics layer comprising fluidic channels; a pneumatics layer comprising pneumatic channels; and an actuation layer sandwiched between the fluidics layer and the pneumatic layer, wherein the device comprises at least one diaphragm valve comprised in the sandwich, wherein activation of the valve regulates fluid flow in a fluidics channel, and wherein the device further comprises an isolated portion of the fluidics layer that comprises microfluidic channels and that is not covered by the pneumatics layer and, optionally, the actuation layer; engaged with the base so that the isolated portion of the fluidics layer is in thermal contact with the thermal regulator. In one embodiment, the thermal regulator of the instrument comprises at least one resistive wire connected to a voltage source. In one embodiment, the resistive wire of the instrument is attached to the base through a biasing element that maintains tension on the wire as the wire is heated. In another embodiment, the thermal control device of the instrument comprises one or more fans directed to blow air toward or away from the isolated portion. In another embodiment, the thermal control device of the instrument comprises a Peltier device.

Another aspect of the invention provides an instrument comprising: (a) a chip station assembly comprising at least one station, each station configured to engage a microfluidic chip, wherein each microfluidic chip comprises a plurality of microfluidic circuits, each circuit comprising a chamber; and (b) a magnet moving assembly comprising: (i) a magnet for each station; and (ii) an actuator configured to move each magnet into a functional position at a station so as to exert a magnetic force of at least 30 $T^2/m$ in each of the chambers in the microfluidic chip when engaged with the station, and wherein the magnetic force is substantially the same in each chamber of the plurality of microfluidic circuits. The instrument chip station assembly of the instrument can comprise a plurality of stations. In one embodiment, the plurality of stations is 4.

In the embodiments, the magnet comprises a long dimension, an intermediate dimension and a short dimension, wherein the long and short dimensions define a first pair of faces defining north and south magnetic poles, and one of the first pair of faces, faces the engaged chip in the functional position to exert the magnetic force. In one embodiment, each magnet further comprises a shield that contacts a second face of the magnet defined by the long and intermediate dimension, wherein the shield substantially directs the magnetic force of the magnet. In another embodiment, the shield also contacts the face of the first pair that does not face the chip.

In another embodiment, the chip station assembly of the instrument comprises a plurality of stations, the magnets are substantially parallel to each other and a plurality of the shields contact the second face on a side that faces another magnet. In one embodiment, the magnet of the instrument can be substantially rectangular.

In one aspect of the invention, each station of the instrument is engaged with a microfluidic chip. In one embodiment, the chambers of the microfluidic chip are diaphragm chambers. In a further embodiment, the chambers in each chip are arranged in substantially linear fashion.

The magnet moving assembly of the instrument can comprise a magnet holder that holds the magnets and can be moved by the actuator. In one embodiment, the actuator comprises an electric motor.

In another aspect, the invention provides a method comprising moving a magnet into a functional position with respect to a microfluidic chip, wherein the chip a plurality of microfluidic circuits, each circuit comprising a chamber; and magnet exerts, when in the functional position, a magnetic force of at least 30 $T^2/m$ in each of the chambers in the chip, and wherein the magnetic force is substantially the same in each chamber in the chip. In one embodiment, the method comprises capturing magnetically response particles in each chamber from a fluid flowing in each circuit with the magnetic force. In a further embodiment, the chambers are diaphragm chambers and capturing comprises increasing the volume of the chambers by deforming the diaphragm. The method can also comprise moving the magnet out of the functional position to release the particles.

Another aspect of the invention provides for a method for mixing a first liquid and a second liquid comprising positioning a first bolus of the first liquid adjacent and downstream of a second bolus of the second liquid within a channel, positioning a third bolus of a third liquid adjacent and upstream of the second bolus of the second liquid within a channel, moving the first bolus, the second bolus, and the third bolus within the channel in a first direction under laminar flow conditions, whereby the moving facilitates mixing of the first liquid, the second liquid, and the third liquid, wherein one or more pneumatically actuated diaphragm pumps are used for the positioning of the first the second bolus, and the third bolus within the channel, and wherein the first liquid and second liquid are different.

In some embodiments the first bolus and/or the second bolus have a volume that is less than about 1000, 750, 500, 400, 300, 200, 100, 50, 25, 20, 15, 10, 5, 4, 3, 2, or 1 µL. The channel can have a cross-sectional area and a length, and the cross-sectional area of the channel can increases or decrease along the length of the channel. In one embodiment, movement of the one or more diaphragm pumps causes turbulent flow within the pump. One or more diaphragm pumps can be used for the moving of the first and the second bolus within the channel. In other embodiments, the first and second liquids are aqueous liquids. The one or more diaphragm pumps can be microfluidic diaphragm pumps.

In another embodiment, the channel is a microfluidic channel. In some embodiments, the microfluidic channel has a cross-sectional area between approximately 20 to 10,000,000 microns squared. In some embodiments, the first liquid and the third liquid are the same.

Another aspect of the invention provides for a method for combining a first liquid and a second liquid in a microfluidic mixing channel comprising providing a device with a first liquid channel and a second liquid channel each fluidically connected to the microfluidic mixing channel, wherein a first diaphragm valve is positioned within the first liquid channel, a second diaphragm valve is positioned within the second liquid channel, and third and fourth diaphragm valves are positioned within the microfluidic mixing channel; and using the first, second, third and fourth diaphragm valves to sequentially pump the first liquid and the second liquid into the microfluidic mixing channel to form a plurality of boluses of first liquid and second liquid, wherein the first, third, and fourth diaphragm valves are used to pump the first liquid into the microfluidic mixing channel and the second, third, and fourth diaphragm valves are used to pump the second liquid into the microfluidic mixing channel, and wherein the first liquid and second liquid are different.

In some embodiments, one or more of the first, second, third, and fourth diaphragm valves are pneumatically actuated. In other embodiments, one or more of the boluses have a volume that is less than about 1000, 750, 500, 400, 300, 200, 100, 50, 25, 20, 15, 10, 5, 4, 3, 2, or 1 µL. In one embodiment, the method can further comprise moving the plurality of boluses down the microfluidic mixing channel, whereby an amount of interfacial area between adjacent boluses increases as the plurality of boluses move down the microfluidic mixing channel.

In some embodiments, the microfluidic mixing channel has a cross-sectional area and a length, and the cross-sectional area of the microfluidic mixing channel increases or decreases along the length of the microfluidic mixing channel. In some embodiments, the opening or closing of one or more of the diaphragm valves causes turbulent flow within the diaphragm valve. In some embodiments, the second valve is a flow-through valve. In other embodiments, the first liquid and the second liquid move in the microfluidic mixing channel under laminar flow conditions. In one embodiment, the plurality of boluses is mixed due to moving of the plurality of boluses down the microfluidic mixing channel. The first liquid channel and the second liquid channel can be microfluidic channels.

One aspect of the invention provides for a method for providing a first liquid and a second liquid to a mixing channel comprising the steps of a) providing a device with a first liquid channel and a second liquid channel each fluidically connected to the mixing channel, wherein a first valve is positioned within the first liquid channel, a second valve is positioned within the second liquid channel, a pumping valve is positioned within the mixing channel, and an exit valve is positioned downstream of the pumping valve within the mixing channel, and wherein the first liquid and the second liquid are different; b) providing the first liquid to the first liquid channel and the second liquid to the second liquid channel; c) configuring the valves such that the first valve is open and the second valve, the pumping valve, and the exit valve are closed; d) opening the pumping valve; e) configuring the valves such that the pumping valve and exit valve are open and the first valve and the second valve are closed; f) closing the pumping valve; g) configuring the valves such that the second valve is open and the first valve, the pumping valve and the exit valve are closed; h) opening the pumping valve; i) configuring the valves such that the pumping valve and the exit valve are open and the first valve and the second valve are closed; and j) closing the pumping valve.

In some embodiments, one or more of the first valve, the second valve, the pumping valve, or the exit valve are pneumatically actuated. In other embodiments, step d) moves the first liquid and step h) moves the second liquid. In other embodiments, the first liquid and/or the second liquid that is moved has a volume that is less than about 1000, 750, 500, 400, 300, 200, 100, 50, 25, 20, 15, 10, 5, 4, 3, 2, or 1 µL. In some embodiments, steps c) through j) are repeated. In other embodiments, the second valve is a flow-through valve that joins the second liquid channel to the mixing channel.

In some embodiments, the method further comprises moving the first and the second bolus within the mixing channel. In some embodiments, the mixing channel has a cross-sectional area and a length, and the cross-sectional area of the channel increases or decreases along the length of the mixing channel. In other embodiments, the moving of the first and the second bolus occurs under laminar flow conditions. In another embodiment, the opening or closing of one or more of the valves causes turbulent flow within the valve. In one embodiment, the first liquid and second liquid have a combined volumetric flow rate between approximately 0.001 µL/sec to 100 µL/sec. In other embodiments, the first liquid and second liquid are aqueous liquids.

In another aspect, this invention provides a method of mixing fluids in a microfluidic device comprising: a) stacking alternating boluses of a first liquid and a second liquid in a microfluidic channel; and b) moving the stack of boluses through the channel, wherein the channel is configured so that moving the boluses increases an area of surface contact between the boluses, promoting mixing of first and second liquids. In one embodiment, the boluses are created using successive strokes of a diaphragm pump comprising three diaphragm valves on the microfluidic device. In another embodiment the channel is configured for laminar flow of liquid.

In another aspect this invention provides a method of mixing fluids in a microfluidic device comprising: a) stacking alternating boluses of a first liquid and a second liquid in a microfluidic channel; b) moving the stack of boluses into a chamber of a diaphragm valve, wherein the chamber, when open, has a volume greater than the volume of at least four boluses; and c) closing the diaphragm valve, wherein closing pumps the liquids out of the valve, thereby mixing the liquids. In one embodiment the valve pumps the fluids into a second microfluidic channel. In certain embodiments the number of alternating boluses in the stack is at least 4, at least 8 or at least 12.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 1 depicts a schematic of a microfluidic chip of this invention. FIG. 1A is a side view that shows the first microfluidics sandwich region and the second region of the extended shelf. The sandwich region has a top layer that comprises the pneumatics channels, a second layer underneath that comprises the deformable membrane, and two microfluidics layers. In the four-layer configuration, the microfluidics layer has a via layer and a layer that has the microfluidics channels. It will be noted that in this configuration, the extended shelf is an extension of the two microfluidics layers. FIG. 1B is a top view that shows the microfluidics sandwich region, the extended shelf region, and serpentine channels.

FIG. 4B illustrates the MOVe valve with the membrane and seat in an open position, allowing fluid flow through the channels.

FIG. 5B illustrates the MOVe valve with the membrane and seat in an open position, allowing fluid flow through the channels.

FIG. 32A and FIG. 32B show a cross-section of a "three layer" diaphragm valve in closed (FIG. 32A) and open (FIG. 32B) configurations.

DETAILED DESCRIPTION OF THE INVENTION

I. Microfluidic Chip Device

Figure 2:
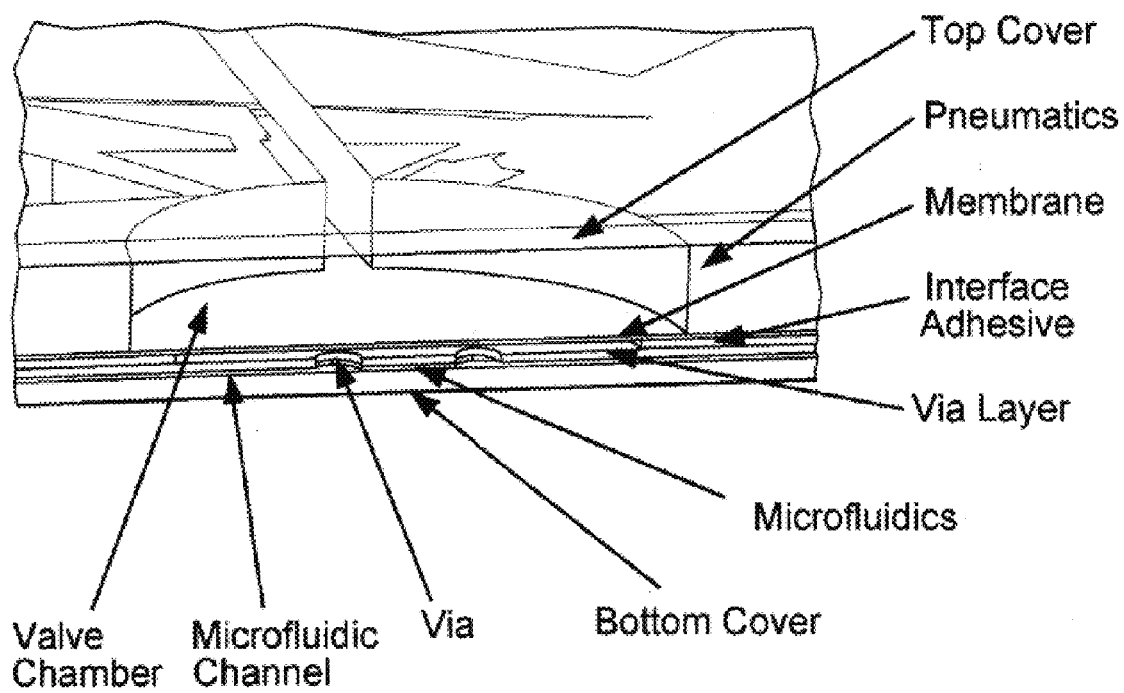
FIG. 2 illustrates a cross section of an embodiment of a MOVe valve in which a fluidic channel opens into a chamber at the valve. This embodiment comprises an optional adhesive layer.

The present disclosure provides systems comprising microfluidic chip devices and thermal regulators and methods of use of the devices. The systems disclosed herein find use in the preparation and analysis of target analytes, including processing biochemical or chemical samples, the analysis of target analytes, or the recovery of processed biochemical or chemical samples for analysis in a separate device. In one aspect, the microfluidic chip device comprises a first region and a second region (FIG. 1). As depicted in FIG. 2, the first region, or microfluidics sandwich region, has multiple layers comprising a fluidics layer comprising fluidic channels; a pneumatics layer comprising pneumatic channels; and an actuation layer (e.g., an elastomeric layer) sandwiched between the fluidics layer and the pneumatic layer, wherein the sandwich comprises Micro-Robotic on-Chip Valve and Pump valves (MOVe) to regulate fluid flow in the fluidics channels. The second region (FIG. 1A), an isolated portion in this case taking the form of an extended shelf region, of the microfluidics device comprises an extended portion of the fluidics layer of the first region that extends beyond an edge of the sandwiched layers to form a shelf. In other embodiments, the isolated region is a region that is surrounded by a pneumatics layer sandwiched with another portion of the fluidics layer. Generally, the isolated region comprises one or more microfluidic channels (see FIG. 1B) configured to contain a fluidic sample of sufficient volume for the subsequent recovery and analysis of a biochemical or chemical reaction from the sample introduced into the channel. In one embodiment, the channel takes a serpentine shape. The microfluidics device is configured so that one or more of the devices can attach to the thermal regulator, with the extended shelf region of the microfluidics device in a temperature regulation zone for the controlled regulation of the temperature of the shelf region and a fluidic sample contained therein. The extended shelf can be in physical contact with a temperature regulated surface, e.g., a Peltier, or can be heated and cooled by non-physical contact, e.g., IR heating, radiant heating, air cooling. The pneumatics layer generally is outside of the temperature regulation zone. The thermal regulator, described more fully below, can be an electrical device that comprises one or more thermal regulators, temperature sensors, temperature regulators, fans and power supply that are operably connected to a device, microprocessor, or computer control for regulating the temperature and temperature regulation times of the device and the extended shelf region of the microfluidics chip device.

The fluidic devices of this invention comprise at least one or a plurality of fluidic conduits in which fluid flow is controlled by on-device diaphragm valves and pumps actuatable by, for example, pneumatics or hydraulics. The device comprises a fluidics layer, a pneumatic layer and an actuation layer sandwiched there-between. In some embodiments the three layers are bonded together into a unit. In other embodiments, the fluidics layer and the actuation layer are bonded together to form a unit that can be mated with and removed from the pneumatic layer, e.g., by applying and releasing pressure, for example by clamping. When the fluidic sublayers comprise glass, the sublayers can be bonded together by heating the pieces so as to cause them to fuse.

Fluidic conduits and pneumatic conduits may be formed in the surface of the fluidic or pneumatic layer as furrows, dimples, cups, open channels, grooves, trenches, recesses and the like. Conduits or passages can take any shape appropriate to their function. This includes, for example, channels having, hemi-circular, circular rectangular, oblong or polygonal cross sections. Valves, reservoirs and chambers having circular or other shapes and having dimensions that are larger than channels to which they connect can be made. Areas in which a conduit becomes deeper or less than a connecting passage can be included. The conduits comprise surfaces or walls that contact fluids flowing through them. The fluid in the fluidic layer can be a liquid or a gas.

The fluidics layer, itself, can be comprised of more than one sublayers, wherein channels in certain sublayers connect through vias in other sublayers to communicate with other channels or with the actuation layer. In multiple sublayer situations, fluidic paths can cross over one another without being fluidically connected at the point of crossover.

The diaphragm valves and pumps are comprised of functional elements in the three layers. A diaphragm valve comprises a body, a seat (optionally), a diaphragm and ports configured to allow fluid to flow into and out of the valve. The body is comprised of a cavity or chamber in the pneumatic layer that opens onto the surface facing the actuation layer ("pneumatic valve body"). Optionally, the valve body also includes a chamber in the fluidics layer that opens onto a surface facing the actuation layer and which is disposed opposite the pneumatic layer chamber ("fluidics valve body"). The pneumatic layer chamber communicates with a passage, e.g., a channel, through which positive or negative pressure can be transmitted by a gas or liquid. In certain embodiments, the gas is air. In other embodiments, the liquid is water, oil, Fluorinert, etc. The fluidics layer can comprise a valve seat that faces the actuation layer. The valve seat interrupts a fluidic channel either directly or by being disposed within a body chamber in the fluidics layer. The diaphragm is included in the actuation layer. The valve may be configured so that the diaphragm naturally sits on the valve seat, thus closing the valve, and is deformed away from the seat to open the valve. The valve also may be configured so that the diaphragm naturally does not sit on the seat and is deformed toward the seat to close the valve. When the diaphragm is off the valve seat, it creates a fluidic chamber or passage through which fluid may flow. The channel is in fluid communication with the valve chamber through the valve ports.

In another embodiment a diaphragm valve is formed from a body comprising a chamber in the pneumatic layer and the fluidics layer, but without a valve seat. In this embodiment, deforming the diaphragm into the pneumatic chamber creates a volume to accept fluid, and deforming the diaphragm into the fluidics chamber pumps liquid out of the pump or seals a valve. In this configuration, the position of the diaphragm also can regulate the speed of flow through the pump by changing the volume of the fluidic passage. This type of valve is useful as a fluid reservoir and as a pumping chamber, and can be referred to as a pumping valve.

At least one of the layers can have a smooth surface that bonds with another layer. A smooth surface may be rigid or flexible. The substrate can have a generally planar, e.g., a flat surface. In other embodiments, if one of the surfaces is curved, the other substrate can be a material that is configured to conform to it.

In the sandwich configuration just described, the surface or face of the fluidics or pneumatic layer that faces the actuation layer generally comprises a flat or smooth surface into which indentations, depressions or etchings have been made to form the functional elements of fluidics and pneumatic layers, e.g., channels, chambers and valves. A portion of the surface (e.g., a smooth or flat surface) that contacts the actuation layer is referred to as a contact surface. Portions of the surfaces that are indented, depressed or etched that face the actuation layer are referred to as exposed surfaces. Surfaces over which fluid flows, including conduits, channels, valve or pump bodies, valve seats, reservoirs, and the like functional surfaces.

In the construction of the fluidic device, pressure or bonding of the actuation layer to all or part of the contact surfaces can function to cover exposed conduits and contain liquid within the fluid or pneumatic conduits. These surfaces are referred to as sealing surfaces. In the functioning of the valves and pumps, a diaphragm moves on or off a valve seat or contact surface and toward or away from the surface of a body chamber in the fluidics or pneumatic layer.

The actuation layer typically is formed of a substance that can deform when vacuum or pressure is exerted on it and can return to its un-deformed state upon removal of the vacuum or pressure, e.g., an elastomeric material. Because the deformation dimension is measure in less than ten mm, less than one mm, less than 500 µm, or less than 100 µm, the deformation required is lessened and a wide variety of materials may be employed. Generally, the deformable material has a Young's modulus having a range between about 0.001 GPa and 2000 GPa, preferably between about 0.01 GPa and 5 GPa. Examples of deformable materials include, for example but are not limited to thermoplastic or a cross-linked polymers such as: silicones (e.g., polydimethylsiloxane ("PDMS")), polyimides (e.g., Kapton™, Ultem), cyclic olefin co-polymers (e.g., Topas™, Zeonor), rubbers (e.g., natural rubber, buna, EPDM), styrenic block co-polymers (e.g., SEBS), urethanes, perfluoro elastomers (e.g., Teflon, PFPE, Kynar), Mylar, Viton, polycarbonate, polymethylmethacrylate, santoprene, polyethylene, or polypropylene. Other classes of material that could function as the actuation layer include, for example, but are not limited to metal films, ceramic films, glass films or single or polycrystalline films. Furthermore an actuation layer could comprise multiple layers of different materials such as combination of a metal film and a PDMS layer.

The actuation layer typically is formed of a deformable, generally an elastomeric, substance, such as PDMS, that can deform when vacuum or pressure is exerted on it. At points where the fluidic channels or pneumatic channels open onto or are otherwise in contact with the actuation layer, functional devices such as valves can be formed. Such a valve is depicted in cross section in FIG. 13. Both the fluidics layer and the pneumatics layer can comprise ports that connect channels to the outside surface as ports. Such ports can be adapted to engage fluidics manifolds, e.g., cartridges, or pneumatics manifolds.

The microfluidic device typically comprises multiple microchannels and vias that can be designed and configured to manipulate samples and reagents for a given process or assay. In some embodiments the microchannels have the same width and depth. In other embodiments the microchannels have different widths and depths. In one embodiment a microchannel is characterized as having a channel wider than the average size of an analyte of interest in a sample delivered to the microstructure. In another embodiment a microchannel has a width equal to or larger than the largest analyte (such as the largest cell) separated from the sample. For example, in some embodiments, a microchannel in a microfluidics chip device can have a width greater than 50, 60, 70, 80, 90, 100, 110, 120, 130, 140, 150 microns. In some embodiments, a microchannel has a width of up to or less than 100, 90, 80, 70, 60, 50, 40, 30, or 20 microns. In some embodiments a microchannel in a microstructure can have a depth greater than 50, 60, 70, 80, 90, 100, 110, 120, 130, 140, 150 microns. In some embodiments, a microchannel has a depth of up to or less than 100, 90, 80, 70, 60, 50, 40, 30, or 20 microns. In some embodiments a microchannel has side walls that are parallel to each other. In some other embodiments a microchannel has a top and bottom that are parallel to each other. In some other embodiments a microchannel comprises regions with different cross sections. In some embodiments, a microchannel has a cross section in the shape of a cheese wedge, wherein the pointed end of the wedge is directed downstream.

The microfluidic layers of the device may be made out of different materials including, but not limited to, borosilicate glasses, pyrex, borofloat glass, Corning 1737, Corning Eagle 2000, silicon acrylic, polycarbonate, liquid crystal polymer, polymethylmethoxyacrylate (PMMA), Zeonor, polyolefin, polystyrene, polypropylene, and polythiols. Depending on the choice of the material different fabrication techniques may also be used. The device may be made out of plastic, such as polystyrene, using a hot embossing technique. The obstacles and the necessary other structures are embossed into the plastic to create the bottom surface. A top layer may then be bonded to the bottom layer. Injection molding is another approach that can be used to create such a device. Soft lithography may also be utilized to create either a whole chamber out of plastic or only partial microstructures may be created, and then bonded to a glass substrate to create the closed chamber. Yet another approach involves the use of epoxy casting techniques to create the obstacles through the use of UV or temperature curable epoxy on a master that has the negative replica of the intended structure. Laser or other types of micromachining approaches may also be utilized to create the flow chamber. Other suitable polymers that may be used in the fabrication of the device are polycarbonate, polyethylene, and poly(methyl methacrylate). In addition, metals like steel and nickel may also be used to fabricate the device of the invention, e.g., by traditional metal machining. Three-dimensional fabrication techniques (e.g., stereolithography) may be employed to fabricate a device in one piece. Other methods for fabrication are known in the art.

In some embodiments microstructures of channels and vias are formed using standard photolithography. For example, photolithography can be used to create a photoresist pattern of obstacles on a glass wafer or on a silicon-on-insulator (SOI) wafer. In one embodiment, a glass wafer comprises of a 100 µm thick glass layer atop a 1 µm thick glass layer on a 500 µm thick wafer. In another embodiment, a SOI wafer comprises of a 100 µm thick Si(100) layer atop a 1 µm thick $SiO_2$ layer on a 500 µm thick Si(100) wafer. To optimize photoresist adhesion, the wafers may be exposed to high-temperature vapors of hexamethyldisilazane prior to photoresist coating. UV-sensitive photoresist is spin coated on the wafer, baked for 30 minutes at 90° C., exposed to UV light for 300 seconds through a chrome contact mask, developed for 5 minutes in developer, and post-baked for 30 minutes at 90° C. The process parameters may be altered depending on the nature and thickness of the photoresist. The pattern of the contact chrome mask is transferred to the photoresist and determines the geometry of the microstructures.

Figure 8:
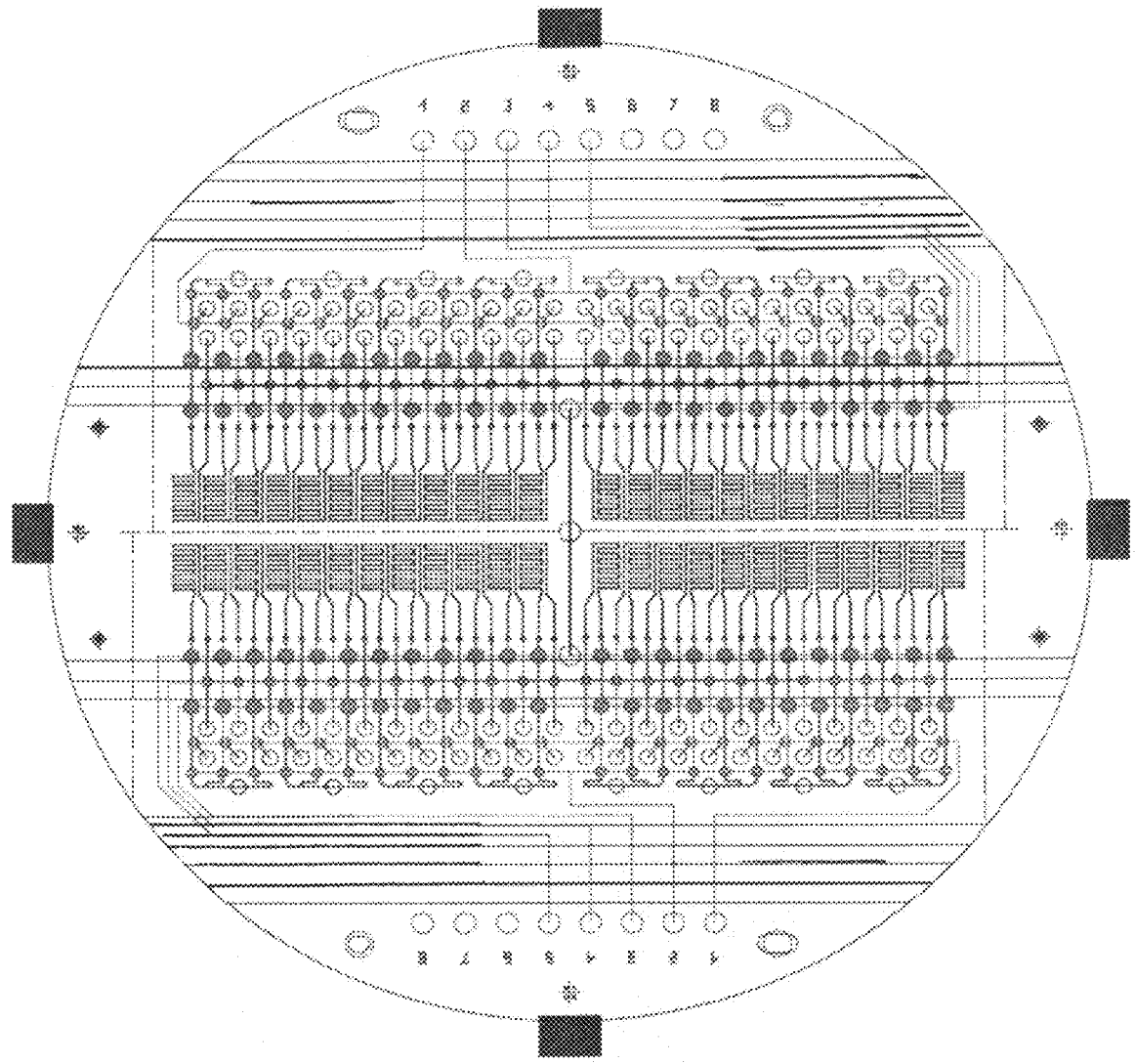
FIG. 8 illustrates an embodiment of a fabrication chip with microfluidic chip devices. This circular chip can be diced to provide the embodiment of FIG. 7.

Upon the formation of the photoresist pattern that is the same as that of the microstructures, the etching is initiated. $SiO_2$ may serve as a stopper to the etching process. The etching may also be controlled to stop at a given depth without the use of a stopper layer. The photoresist pattern is transferred to the 100 µm thick Si layer in a plasma etcher. Multiplexed deep etching may be utilized to achieve uniform microstructures. For example, the substrate is exposed for 15 seconds to a fluorine-rich plasma flowing $SF_6$, and then the system is switched to a fluorocarbon-rich plasma flowing only $C_4F_8$ for 10 seconds, which coats all surfaces with a protective film. In the subsequent etching cycle, the exposure to ion bombardment clears the polymer preferentially from horizontal surfaces and the cycle is repeated multiple times until, e.g., the $SiO_2$ layer is reached. The microstructures can be etched into 4 inch diameter discs of suitable material, as described above, with multiple microfluidic devices etched into single discs, as is illustrated in FIG. 8.

Valve seats and other surfaces of the fluidics or pneumatics layers through which fluid passes and which may come into contact with the actuation layer can be made more hydrophobic to resist sticking or bonding with the actuation layer. For example, a low surface energy material, such as a noble metal, e.g., gold, or a perfluoropolymer, such as Teflon, can be used to coat these surfaces. The material can be applied, for example, by chemical vapor deposition or other methods known in the art. See, for example, provisional patent application 61/227,186, filed Jul. 21, 2009, entitled "Fluidic Devices With Diaphragm Valves."

In certain embodiments, the microfluidic devices of this invention are monolithic devices. In monolithic devices, a plurality of circuits are provides on a single substrate. In the case of devices comprising diaphragm valves, a monolithic device comprises a single actuation layer (e.g., elastic layer) functioning as a diaphragm for a plurality of valves. In certain embodiments, one actuation channel can operate a plurality of valves on a monolithic device, e.g., valves in different fluidic circuits. This allows parallel activation of many fluidic circuits. Monolithic devices can have dense arrays of microfluidic circuits. These circuits function with high reliability, in part because the channels in each circuit are fabricated simultaneously on a single substrate, rather than being made independently and assembled together.

The fluidic circuits and of these devices can be densely packed. A circuit comprises an open or closed fluid conduit. In certain embodiments, the device can comprise at least 1 fluidic circuit per 1000 $mm^2$, at least 2 fluidic circuits per 1000 $mm^2$, at least 5 fluidic circuits per 1000 $mm^2$, at least 10 fluidic circuits per 1000 $mm^2$, at least 20 fluidic circuits per 1000 $mm^2$, at least 50 fluidic circuits per 1000 $mm^2$ Alternatively, the device can comprise at least 1 mm of channel length per 10 $mm^2$ area, at least 5 mm channel length per 10 $mm^2$, at least 10 mm of channel length per 10 $mm^2$ or at least 20 mm channel length per 10 $mm^2$. Alternatively, the device can comprise valves (either seated or unseated) at a density of at least 1 valve per $cm^2$, at least 4 valves per $cm^2$, or at least 10 valves per $cm^2$. Alternatively, the device can comprise features, such as channels, that are no more than 5 mm apart edge-to-edge, no more than 2 mm apart, no more than 1 mm apart, no more than 500 microns apart or no more than 250 microns apart.

The actuation layer can comprise a silicone polymer (polysiloxane) such as poly(dimethylsiloxane) (PDMS). Silicones typically are water repellant due, in part, to an abundance of methyl groups on their surfaces. In order to increase the strength of bonding between polysiloxanes and substrates comprising reactive groups, such as hydroxyls (e.g., glass), the siloxanes can be made more hydrophilic by UV ozone, plasma oxidation, or other methods that place silanol groups (Si—OH) on the surface. When activated PDMS is contacted with glass or other materials comprising active hydroxyl groups and preferably subjected to heat and pressure, a condensation reaction will produce water and covalently bond the two layers through, e.g., siloxane bonds. This produces a strong bond between the surfaces. However, in order for the valves to be functional, the actuation layer (e.g., elastic layer) cannot bind to the valve seats, and, preferably, does not bind to any surface of the valve or to any channel in the surface of the fluidic or actuation layer (e.g., elastic layer) that faces the actuation layer (e.g., elastic layer). A low energy coating is one embodiment to prevent binding.

In one method, the layers are sealed by bonded together with covalent or non-covalent bonds (e.g., hydrogen bonds). This can be achieved by mating the fluidics, actuation and pneumatic layers together as a sandwich and applying pressure and heat. For example, when the actuation layer comprises a silicone, such as PDMS treated as above to render the surface more hydrophilic, and the fluidics and pneumatic layers are glass treated to render the exposed surfaces more hydrophobic, the pieces can be pressed together at a pressure of 100 kg to 500 kg, e.g., about 300 kg. They can be baked between 25° C. and 100° C., e.g., about 90° C. for about 5 minutes to about 30 minutes, e.g., about 10 minutes, depending on the combination of temperature and pressure used. This will cure the bonding between the actuation layer (e.g., elastic layer) and the sealing surfaces.

In another method, the device can be assembled by holding the pieces together under pressure during functioning of the chip, thereby sealing the functional areas of the fluidics layer from leakage. This can be done mechanically, e.g., by clipping or clamping the layers together.

When the fluidics and pneumatic layers comprise plastics, the plastic can be adhered to a polysiloxane, such as PDMS, through non-covalent bonds. For example, an adhesive, such as a tape or a glue, can be used to adhere the plastic and the siloxane. In certain embodiments, the adhesive is removed from selected locations on the surface of the plastic. In this case, the polysiloxane can be free from adhesion to the plastic at the selected locations. The adhesive can be, for example, transfer tape, adhesive coated tape such as silicone based, acrylic, or other materials in thin sheets or films.

A. Micro-Robotic on-Chip Valve and Pump ("MOVe") Technology

In some instances, the microfluidic device or chip has diaphragm valves for the control of fluid flow. Microfluidic devices with diaphragm valves that control fluid flow have been described in U.S. Pat. No. 7,445,926, U.S. Patent Publication Nos. 2006/0073484, 2006/0073484, 2007/0248958, 2008/0014576 and 2009-0253181, and PCT Publication No. WO 2008/115626. The valves can be controlled by applying positive or negative pressure to a pneumatics layer of the microchip through a pneumatic manifold.

Figure 13:
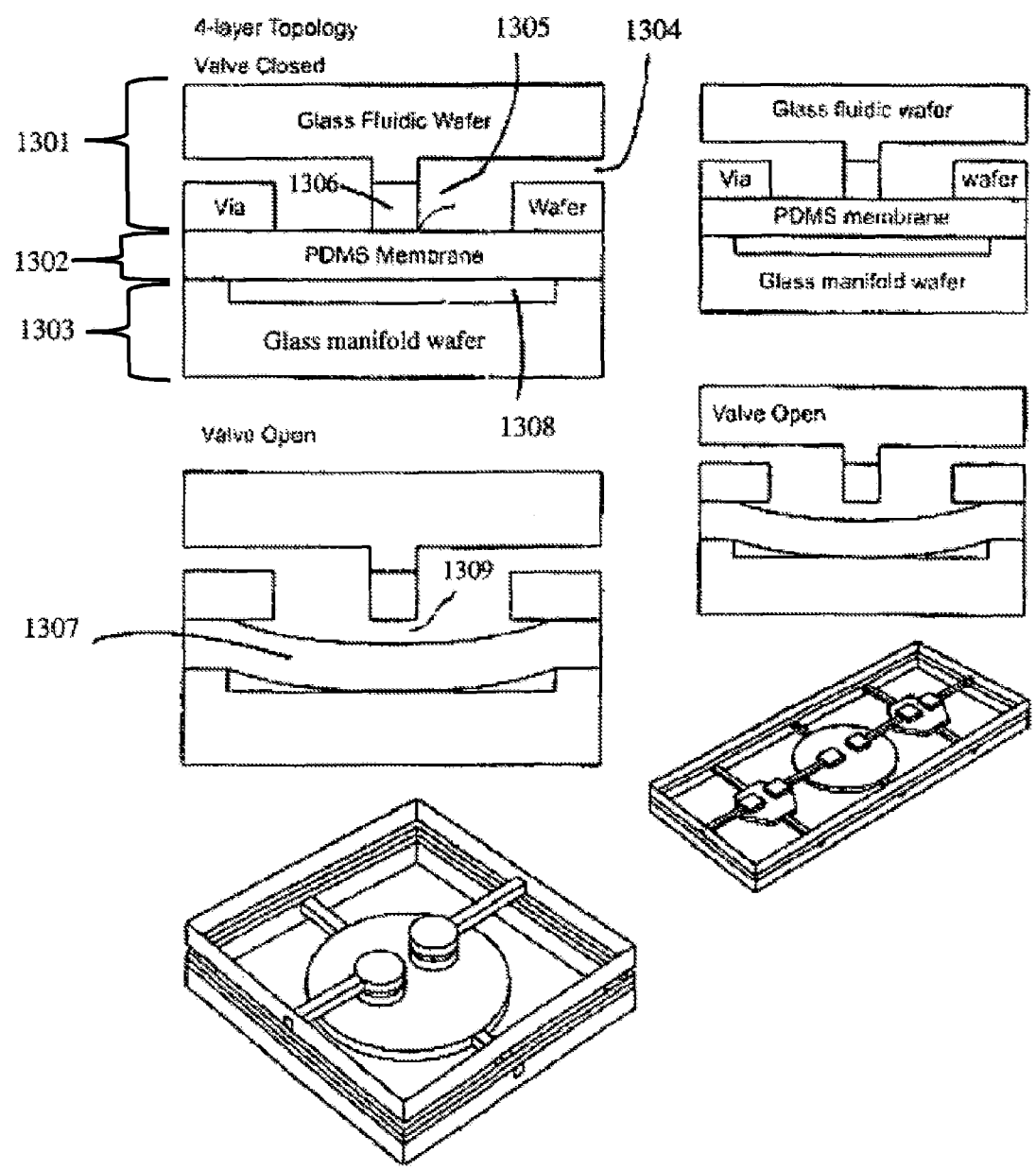
FIG. 13 illustrates an embodiment of a MOVe valve in cross-section, as well as a three-dimensional view of a MOVe valve and a MOVe pump formed from three MOVe valves in series. This embodiment depicts a fluidics layer with internal channels that open onto the actuation layer through vias. However, it is clear that a valve also could be formed using a fluidics layer in which the channels are formed in the surface of the fluidics layer and covered over by the actuation layer. Fluidics layer 1301, actuation layer 1302 and pneumatics layer 1303 are sandwiched together. Microfluidic channel 1304 opens onto the actuation layer through a via 1305. Valve seat 1306 is in contact with the actuation layer, resulting in a closed valve. When the pneumatics layer is activated, the actuation layer 1307 is deformed into the pneumatic chamber 1308. This opens the valve, creating a path 1309 through which liquid can flow.

MOVe elements, such as valve, routers and mixers are formed from sub-elements in the fluidics, actuation layer (e.g., elastic layer) and pneumatic layer of the device. A MOVe valve is a diaphragm valve formed from interacting elements in the fluidics, actuation layer and pneumatics layers of a microfluidic chip (FIG. 13). The diaphragm valve is formed where a microfluidic channel and a pneumatic channel cross over each other and open onto the actuation layer. At this location, deflection of the actuation layer into the space of the fluidics channel or into the space of the pneumatics channel will alter the space of the fluidics channel and regulate the flow of fluid in the fluidics channel. The fluidics channel and pneumatics channels at the points of intersection can assume different shapes. For example, the fluidics channel can comprise an interruption that functions as a valve seat for the actuation layer. The fluidics channel could open into a chamber like space in the valve. The pneumatics channel can assume a larger space and/or cross section than the channel in other parts of the pneumatics layer, for example a circular chamber.

FIG. 13 shows an embodiment of a MOVe valve in cross-section, as well as a three-dimensional view of a MOVe valve and a MOVe pump formed from three MOVe valves in series. This embodiment depicts a fluidics layer with internal channels that open onto the actuation layer through vias. However, it is clear that a valve also could be formed using a fluidics layer in which the channels are formed in the surface of the fluidics layer and covered over by the actuation layer. Fluidics layer 1301, actuation layer 1302 and pneumatics layer 1303 are sandwiched together. Microfluidic channel 1304 opens onto the actuation layer through a via 1305. Valve seat 1306 is in contact with the actuation layer, resulting in a closed valve. When the pneumatics layer is activated, the actuation layer 1307 is deformed into the pneumatic chamber 1308. This opens the valve, creating a path 1309 through which liquid can flow. The pressure in the pneumatic chamber 1308 relative to the microfluidic channel 1304 controls the position of the actuation layer 1302. The actuation layer can be deformed toward the pneumatic chamber 1308 when the pressure is lower in the pneumatic chamber relative to the microfluidic channel 1304. Alternatively, the actuation layer can be deformed toward the microfluidic channel 1304 when the pressure is lower in the microfluidic channel relative to the pneumatic chamber. When pressure is equal or approximately equal in the microfluidic channel and the pneumatic chamber, the valve can be in a closed position. This configuration can allow for complete contact between the seat and the elastomeric layer when the valve is closed. Alternatively, when pressure is equal or approximately equal in the microfluidic channel and the pneumatic chamber, the valve can be in an open position. The pneumatically actuated valves can be actuated using an inlet line that is under vacuum or under positive pressure. The vacuum can be approximately house vacuum or lower pressure than house vacuum. The positive pressure can be about 0, 5, 10, 15, 20, 25, 30, or 35 psi. The fluid for communicating pressure or vacuum from a source can be any fluid, such as a liquid or a gas. The gas can be air, nitrogen, or oxygen. The liquid can be an organic liquid or aqueous liquid, e.g., water.

Figure 3:
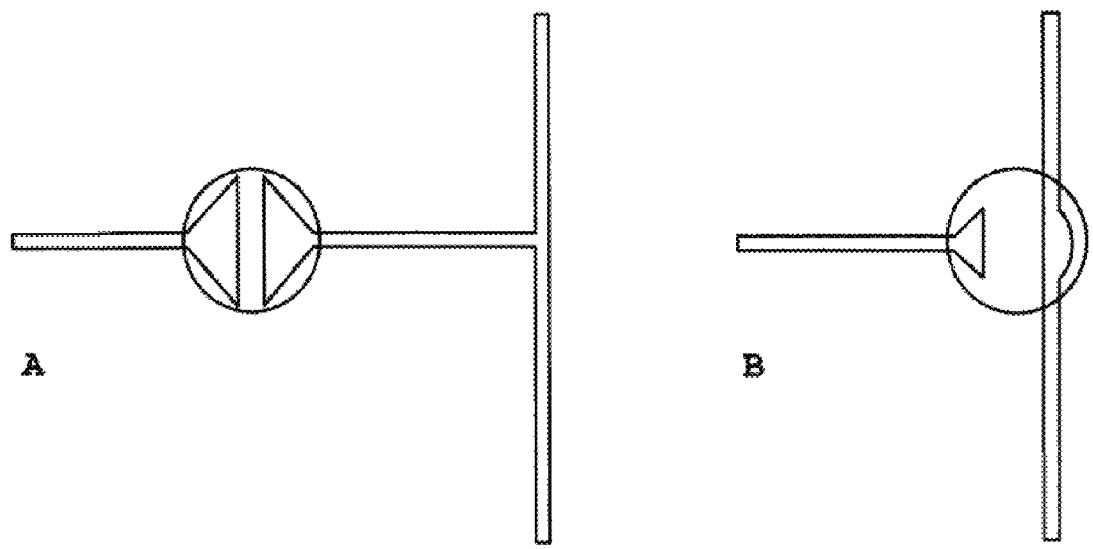
FIG. 3A illustrates an embodiment of a single channel actuation valve or in-line valve. Fluid flow can be blocked or reduced through the horizontal channel when the valve is closed.
FIG. 3B illustrates a two channel flowthrough valve in which fluid can flow along the vertical channel through the valve when the valve is closed and becomes connected to the horizontal channel when the valve is opened.

MOVe micro-valves, micro-pumps, and micro-routers can combine two glass microfluidic layers with a deformable membrane layer, such as polydimethyl siloxane (PDMS), that opens and closes the valve, and a pneumatic (or elastomeric) layer to deform the membrane and actuate the valve. The microfluidic layer can have multiple configurations. In one embodiment, the elastomeric membrane simultaneously modulates fluid flow across said at least two microfluidic channels or discontinuities, as shown in FIG. 2. In another embodiment, the elastomeric membrane simultaneously modulates fluid flow across said at least three microfluidic channels or discontinuities, thereby forming at least a three channel valve, as shown in FIG. 3A and FIG. 3B. In some embodiments, an open channel, furrow or groove can be etched into the surface of one of the glass layer. In other embodiments, the channel can be internal to the layer, e.g., in the form of a tunnel, tube or via. The fluidic channels etched in the top glass layer can be discontinuous and lead to vias, or ports, in the second glass layer that bridge opposing discontinuous channels at a nexus of the top glass layer, wherein the vias act as valve seats. The PDMS membrane sits against the valve seat and normally closes the fluidic path between the two vias. On the opposite side of PDMS membrane, a pneumatic displacement chamber, formed by etching in the layer, is connected to a full-scale vacuum or pressure source. By controlling a miniaturized off-chip solenoid, vacuum or pressure (approximately one-half atmosphere) can be applied to PDMS membrane to open or close the valve by simple deformation of the flexible membrane, e.g., application of vacuum to the membrane deflects the membrane away from a valve seat, thereby opening the valve.

Figure 4:
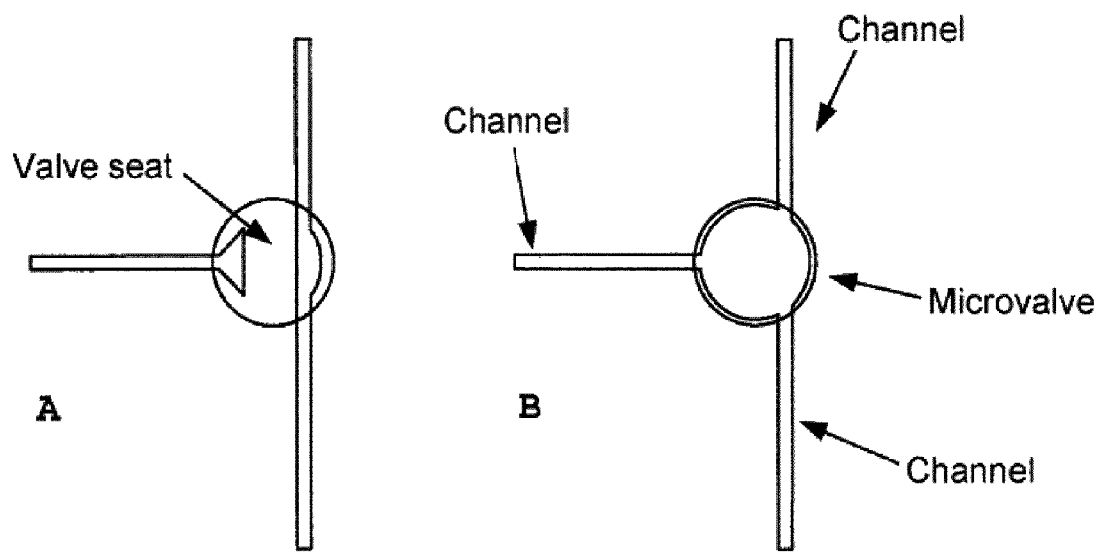
FIG. 4 illustrates an embodiment of a two channel MOVe valve, with FIG. 4A illustrating the channel inlets and the valve seat of the via.

Diaphragm valves of this invention can displace defined volumes of liquid. A diaphragm valve can displace a defined volume of liquid when the valve moved into a closed or opened position. For example, a fluid contained within a diaphragm valve when the valve is opened is moved out of the diaphragm valve when the valve is closed. The fluid can be moved into a microchannel, a chamber, or other structure. The diaphragm valve can displace volumes that are about, up to about, less than about, or greater than about 1000, 750, 500, 400, 300, 200, 100, 50, 25, 20, 15, 10, 5, 4, 3, 2, 1, 0.5, 0.25, or 0.1 µL. A diaphragm valve can be an in-line valve or a flow-through valve, as shown in FIGS. 3A and 3B, respectively. In FIG. 3A, the location of the valve seat in the diaphragm valve is shown by a vertical bar in the horizontal channel. Closure of the valve is by contact of the elastomeric layer with the valve seat, thus reducing or blocking flow along the horizontal channel. In FIG. 3B, the valve seat is located along the horizontal channel. Closure of the valve by contact of the elastomeric layer with the valve seat prevents or reduces fluid flow along the horizontal channel. Fluid can flow along the vertical channel when the flow-through valve is either open or closed. The flowthrough valve shown is also illustrated in FIG. 4A and FIG. 4B. FIG. 4A shows the two intersecting channels with a flowthrough valve positioned at the junction between the two channels. FIG. 4A shows the valve in a closed position, such that fluid in the horizontal channel is not fluidically connected with fluid in the vertical channel, but liquid can flow past the flowthrough valve in the vertical channel when the valve is closed. FIG. 4B shows the flowthrough valve in an open position, such that the vertical channel is fluidically connected to the horizontal channel.

Figure 5:
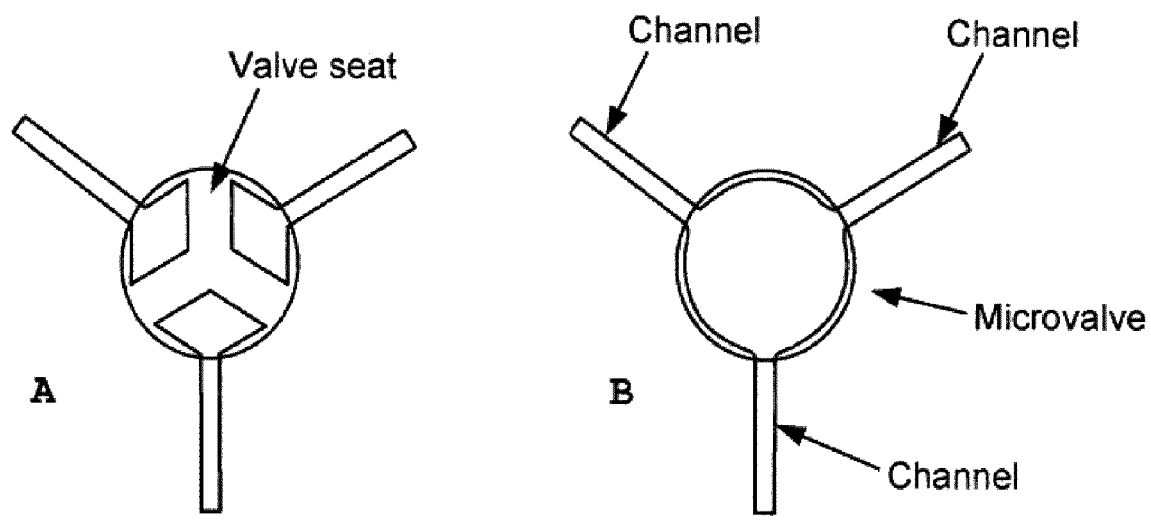
FIG. 5 illustrates an embodiment of a three channel MOVe valve, with FIG. 5 A illustrating the channel inlets and the valve seat of the via.

FIG. 5A and FIG. 5B show three channels that are connected by a valve that when closed, prevents or reduces fluid flow between all three channels. FIG. 5A shows the three-way valve in a closed position, such that all channels are blocked. FIG. 5B shows the valve in an open position, such that fluid communication can occur between all three valves.

Variations on flow-through and in-line valves can include valves that are situated at intersections of greater than two, three, four, or more channels. Valve seats or other structures can be designed such that closure of the valve can prevent or reduce flow in one or more of the channels while allowing fluid to flow in one or more of the other channels. For example flow can be blocked along three of five channels, while flow can continue through two of the five channels. A flow-through valve can also be referred to as a T-valve, as described in U.S. application Ser. No. 12/026,510 and WO 2008/115626, each incorporated herein by reference in their entirety.

When placed in a series of three, diaphragm valves can function as a diaphragm pump, which functions as a positive displacement pump. Self-priming MOVe pumps can be made by coordinating the operation of three valves (including but not limited to, 4, 5, 6, 7, 8, 9, 10, 11, 12, 13, 14, 15, 16, 17, 18, 19, or 20 valves), and can create flow in either direction. A variety of flow rates can be achieved by the timing of the actuation sequence, diaphragm size, altering channel widths, and other on-chip dimensions. Routers can similarly be formed from these valves and pumps. The routers can be formed using three or more valves each on a separate channel connecting to central diaphragm valve. Bus structures can also be created.

Figure 21:
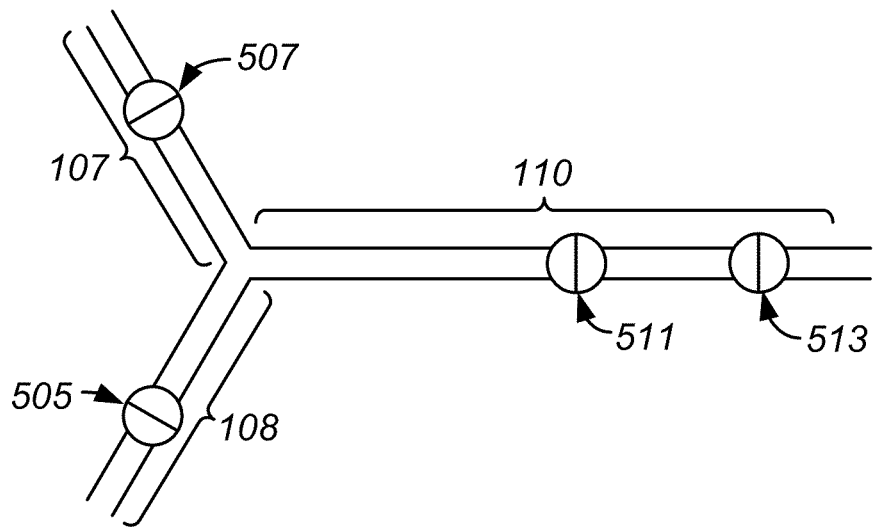
FIG. 21 shows a view of three fluidically connected microchannels with four in-line diaphragm valves.
Figure 22:
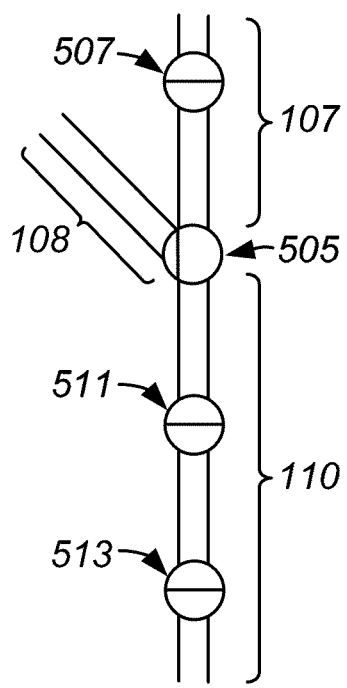
FIG. 22 shows a view of three fluidically connected microchannels with three in-line diaphragm valves and one flowthrough diaphragm valve.
Figure 23:
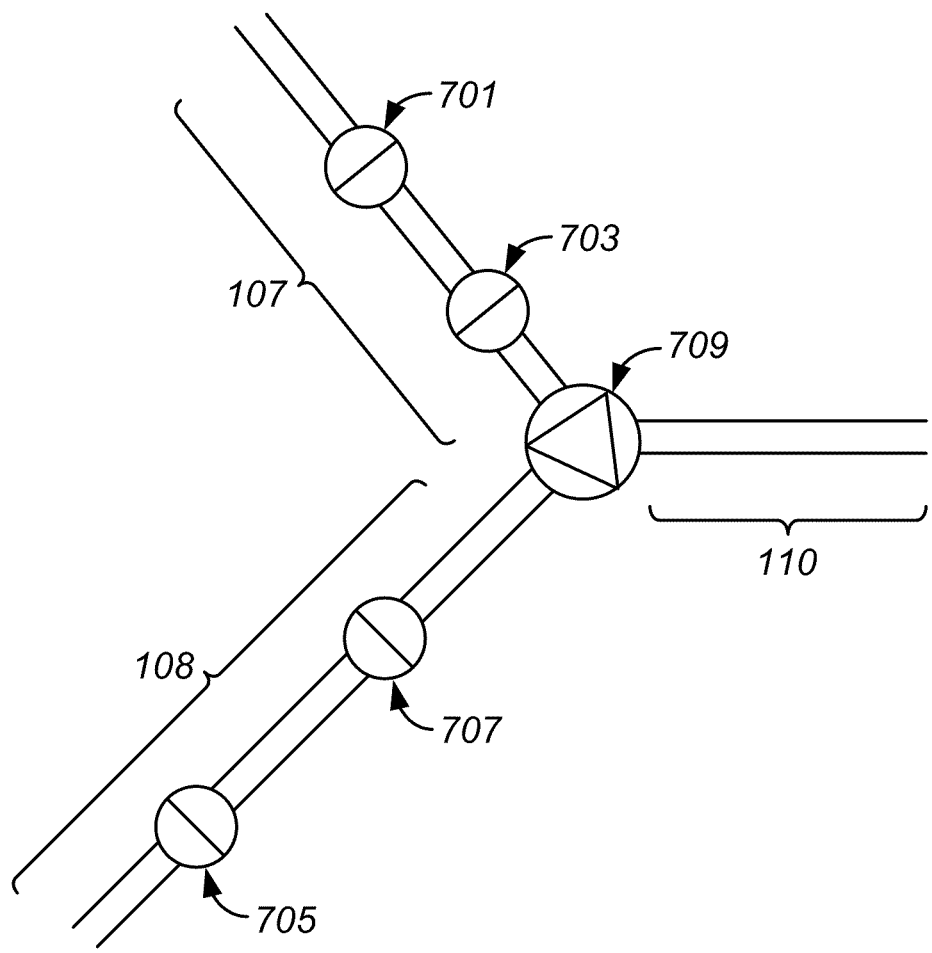
FIG. 23 shows a view of three fluidically connected microchannels with four in-line diaphragm valves positioned in the microchannels and one junction diaphragm valve positioned at the intersection of the three microchannels.
Figure 24:
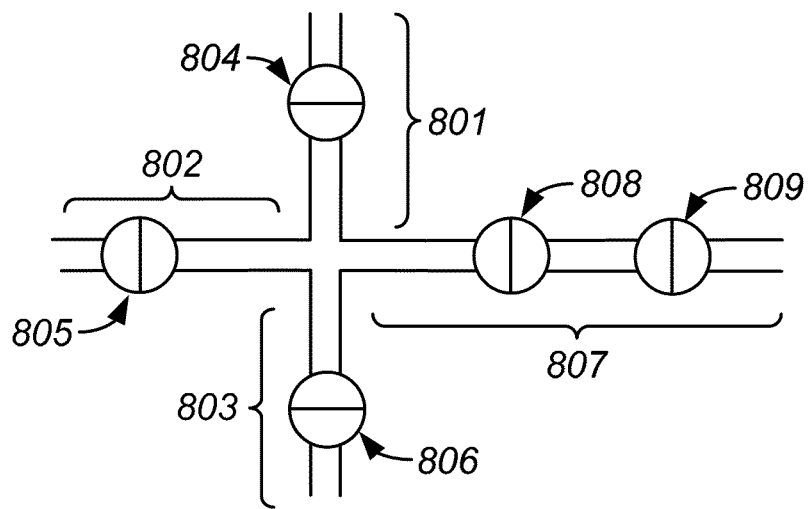
FIG. 24 shows a view of four fluidically connected microchannels with five in-line diaphragm valves.
Figure 25:
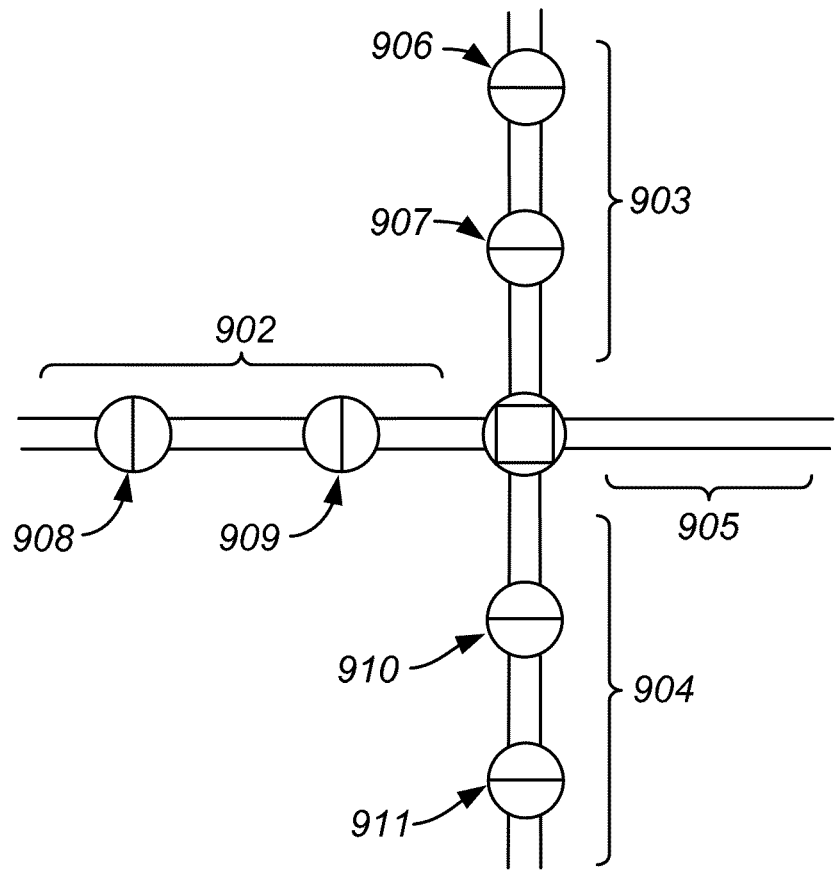
FIG. 25 shows a view of four fluidically connected microchannels with six in-line diaphragm valves positioned in the microchannels and one junction diaphragm valve positioned at the intersection of the four microchannels.

Examples of diaphragm valves placed along microfluidic channels are shown in FIG. 21, FIG. 22, FIG. 23, FIG. 24, and FIG. 25. FIG. 21 shows a first channel (107) and a second channel (505) that are fluidically connected to a mixing channel (110). A first in-line diaphragm valve (507) is placed along the first channel. A second in-line diaphragm valve (505) is placed along the second channel Two in-line valves (511 and 513) are positioned along the mixing channel. A pump can be formed by three diaphragm valves that are positioned linearly along a flow path. For example, valves 507, 511, and 513 can form a first pump and valves 505, 511, and 513 can form a second pump. The centrally located valve, valve 511, can be the pumping valve. The pumping valve can have a desired stroke or displacement volume as described herein. The first pump can move liquids from the first channel to the mixing channel or vice-versa. The second pump can move liquids from the second channel to the mixing channel or vice-versa. The first pump can be operated while fluid flow in the second channel is blocked by closure of valve 505 or another valve positioned on the second channel or on other channels that are connected to the second channel. FIG. 22 shows a first channel 107 and a second channel 108 that are connected to a mixing channel 110. Flow through the first channel can be controlled by in-line valve 507 and flow through the second channel can be controlled by flow-through valve 505. Similar to as shown in FIG. 21, the mixing channel can have two in-line valves (511 and 513). FIG. 23 shows an alternative arrangement of microfluidic valves positioned along three channels. The first channel 107 can have two in-line valves 701 and 703, and the second channel 108 can have two in-line valves 705 and 707. The first and second channel can be connected to a mixing channel 110. A junction valve 709 can be positioned at the intersection between the first channel, the second channel, and the mixing channel. Closure of the junction valve can prevent or reduce fluid flow in the first channel, the second channel, and the mixing channel. The junction valve 709 can have a seat that is triangular-shaped or shaped as shown in FIG. 5A. FIG. 24 shows a first channel 801, a second channel 805, and a third channel 803 that are connected to a mixing channel 807. The valves and channels can be operated in a similar manner as the valves and channels shown in FIG. 21. Referring to FIG. 24, fluid can be moved from the first channel to the mixing channel while preventing or reducing flow of fluid in the second channel and the third channel by closure of valve 805 and 803. FIG. 25 shows a first channel 903, a second channel 902, a third channel, 904 connected to a mixing channel 905. A junction diaphragm valve can be positioned at the intersection between the first channel, the second channel, the third channel, and the mixing channel, similar to the junction diaphragm valve shown in FIG. 23. The valves and channels can be operated in a similar manner as the valves and channels shown in FIG. 23.

Figure 26:
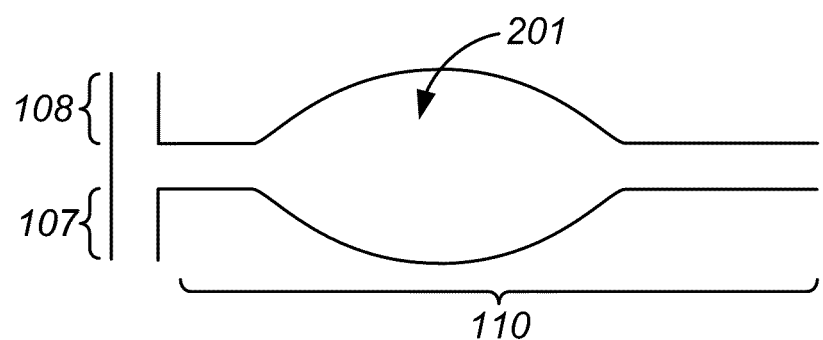
FIG. 26 shows a microchannel with an oval-shaped chamber.
Figure 27:
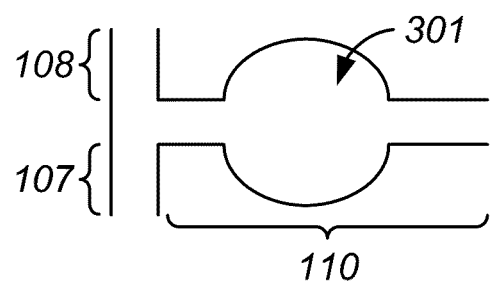
FIG. 27 shows a microchannel with a circular-shaped chamber.
Figure 28:
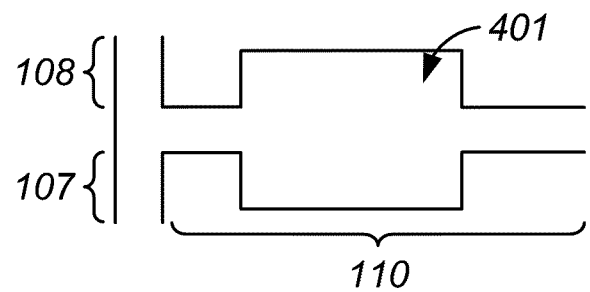
FIG. 28 shows a microchannel with a rectangular-shaped chamber.

As shown in FIG. 26, FIG. 27, and FIG. 28, the mixing channel can have a chamber of variable cross-sectional area. The shape of the chamber can be oval 201, spherical 110, or rectangular 401. In some embodiments of the invention, the chamber can be irregularly shaped to improve mixing of fluids passing through the chamber. An elastomeric layer can form one wall of the chamber. The elastomeric layer can be deformed such that the volume of the chamber is variable. The elastomeric layer can be deformed at a rate such that mixing within the chamber is improved.

Using the diaphragm valves to pump fluids can move a bolus of liquid into a microchannel. In some embodiments of the invention, two different fluids can be pumped into a microchannel such that a bolus of a first fluid is layered against a bolus of a second fluid in the microchannel. The first fluid and the second fluid can be different fluids. The first fluid and the second fluid can comprise different components. The fluids can be a reagent solution and a sample solution. The reagent solution can be a solution containing magnetically responsive particles, e.g., magnetic or paramagnetic beads.

In some embodiments, the microfluidic chip devices herein include one or more reservoirs capable of containing a sample or a reagent (e.g., labeled nucleotides). The reservoir is preferably fluidically coupled to one or more of the microchannels or valves disclosed herein.

The ability to mix fluids on microchips and capillaries is disclosed. By actuating the proper combinations of valves, liquids from one of the channels or reservoirs can be drawn into the central diaphragm valve and expelled into a different channel to rout the liquid in a fluidic circuit. The liquids can comprise, without limitation, analytes, biological samples, chemical and biochemical reagents, buffers, binding moieties, beads, magnetically responsive particles, detection moieties and other materials used in the performance of assays or biochemical or chemical reactions.

The MOVe valves, pumps, and routers are durable, easily fabricated at low cost, can operate in dense arrays, and have low dead volumes. Arrays of MOVe valves, pumps, and routers are readily fabricated on microchips, such as NanoBio-Processor microchips. In one embodiment, all the MOVe valves, pumps, and routers on a microchip are created at the same time in a simple manufacturing process using a single membrane, such as a sheet of Teflon, silicone elastomers, polydimethylsiloxane (PDMS), polyimide, Mylar, Latex, Viton, polycarbonate, acrylic, santaprene, polyurethane, or buna. It costs the same to make 5 MOVe pumps on a chip as it does to create 500. This technology provides the ability to create complex micro- and nanofluidic circuits on microchips. Thus, the disclosure herein provides methods and the ability to create complex micro-, nano-, and pico-fluidic circuits on chips, and allows the implementation of virtually any reaction or assay onto a chip. In general, this technology can be at least substantially insensitive to variations in solution ionic strength and surface contamination, and does not require applied electric fields.

Figure 6:
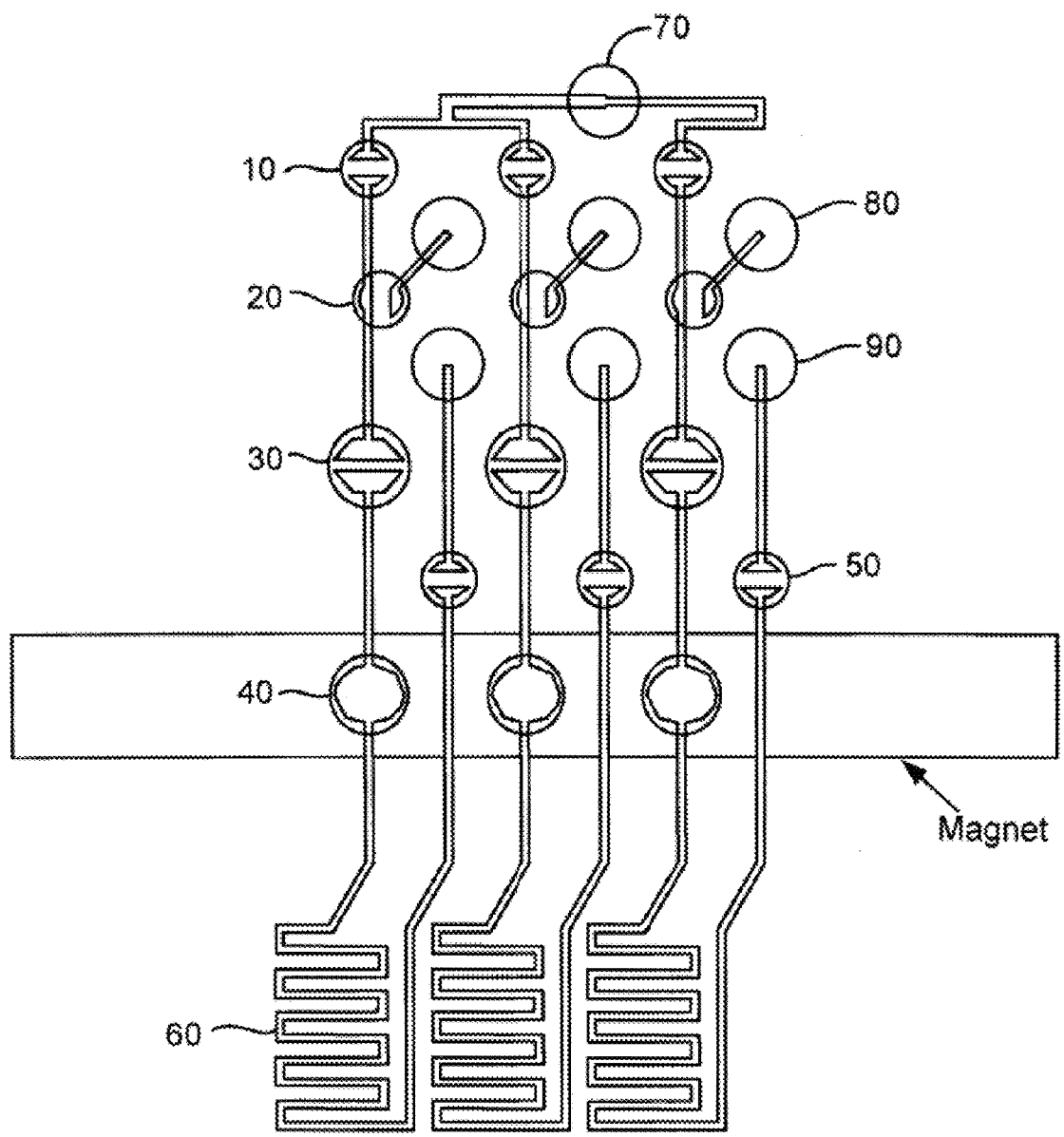
FIG. 6 illustrates a schematic of an embodiment of a microfluidic device, including first port 70 (e.g., for reagent), second ports 80 (e.g., for sample), valves 10, flow through valves 20, pumping valves 30, capture chamber/valve 40, serpentine channels 60 of the isolated region, valves 50 and port (e.g., exit port) 90.

A chip typically will comprise a plurality of fluidics circuits, each circuit comprising a microfluidic channel and functional elements, such as valves, routers, pumps (e.g., three independently operable valves in series), chambers, and ports. An exemplary schematic of the microfluidic circuits of the microfluidic device is shown in FIG. 6. This shows three circuits that share a common port, 70. The microfluidic circuits can move fluids from sample input areas or reservoirs 80, mix them with reagents or other materials at valve 20 and deliver them to other areas within the microfluidic chip device 30, 40. Two or three or more fluidic streams can be joined by configuration of the appropriate number of valves, pumps, and channels. The streams can contain samples, reagents, buffers, and other components. The microchannels 70 and ports can be variable in width or height. In one embodiment, the samples and reagents are delivered to the serpentine channel 60 in the extended shelf region for incubation and/or processing, and then returned to an output area in the microfluidics device 90 through a gated valve 50. The processed sample can also be moved to a region for removal of an analyte or other component, such as magnetically responsive particles, e.g., magnetic or paramagnetic beads 40. The individual fluid streams can be moved by pumps comprising three or more valves including MOVe valves or other valves 10. The valves can be created actuation of a deformable structure, changes in temperature, pressure. Two or more streams can be combined using MOVe and other microvalves. In one embodiment the MOVe valves are self priming and are under computer control; they may be driven in either direction and the same circuit can be used to split a sample into two streams by simply running the two co-joined pumps to move samples to two areas within the microfluidic chip device.

Figure 7:
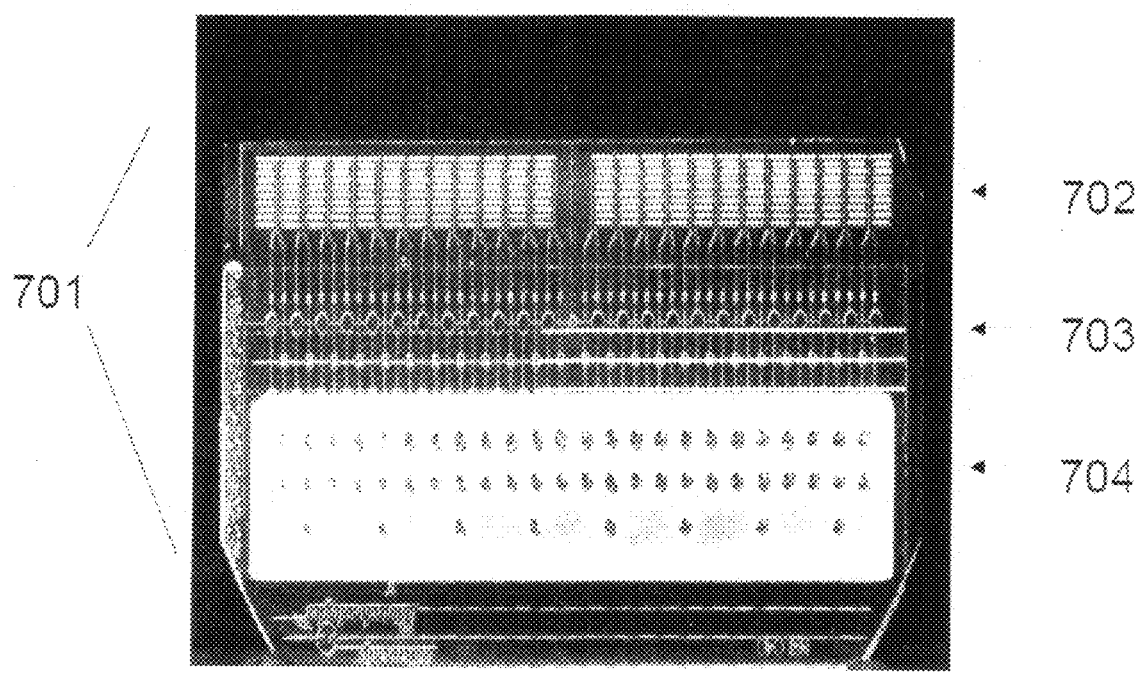
FIG. 7 illustrates an embodiment of a microfluidic chip device with an array of 24 individual circuits and the extended shelf region. Chip 701 includes isolated portion of the fluidics layer 702 comprising serpentine fluidics channels and sandwich section 703, in which the pneumatics layer and actuation layer cover the fluidics layer. Section 703 can have a capture chamber for the capture of magnetically responsive particles, as described herein. Also attached is a fluidics manifold 704 mated with the fluidics layer.

In certain embodiments, the chip comprises a plurality of parallel circuits. Such an embodiment is shown in FIG. 7, which illustrates a microfluidics chip configured for 24 samples, and has an array of 24 fluidic circuits arranged in a serpentine pattern on the extended shelf portion of the microfluidic chip device.

B. Isolated Portion of the Fluidics Layer

The microfluidic chip device has a region in which the fluidics layer is isolated from (e.g., not covered by) a layer that controls flow in the fluidics channels. For example, the fluidics layer is not covered by a pneumatic layer and, in certain embodiments, an actuation layer. In certain embodiments, this isolated portion takes the form of an extended portion of the fluidics layer that extends beyond an edge of the sandwich layer to form a shelf, wherein the shelf comprises one or more microfluidic channels, optionally in serpentine configuration. In other embodiments, the fluidic layer can surround the isolated region, as if to form a sandwich with a hole in the pneumatics layer, exposing the otherwise covered fluidic layer.

In one embodiment, when the fluidics layer is constructed so that the fluidic channels are internal to the layer and, typically, open to the actuation layer through vias, the extended portion, or shelf does not have the deformable membrane or the pneumatics layer. Thus, the shelf includes of an extension of the fluidics layer, which may comprise first and the second layers which define the microfluidic channels. The extended portion comprises one or more microfluidics channels optionally in serpentine configurations.

In another embodiment, the fluidic channels are formed by overlaying grooves in a surface of the fluidics layer with the actuation layer. In this case, the isolated portion, or shelf, can be overlaid with a layer of glass or other suitable material that provides a top surface and seals the microfluidic channels in the extended portion. Alternatively, this covering can be the material of the actuation layer. In one embodiment, the isolated portion comprises at least a first continuous channel that emerges from a channel of the first region and extends within the isolated portion in a serpentine configuration and returns to a different channel in the first region. In another embodiment, the isolated portion comprises a plurality of adjacent channels that emerge from the first region, extend within the isolated portion in serpentine or other dense pattern configurations and return to the first region. In some embodiments, the isolated portion comprises 1, 2, 3, 4, 5, 6, 7, 8, 9, 10, 11, 12, 13, 14, 15, 16, 17, 18, 19, 20, 22, 24 or more adjacent fluidic channels (FIG. 7).

In exemplary embodiments, the channels of the isolated shelf portion of the microfluidic device can have an aspect ratio of height to width of up to or less than 0.2, 0.5, 0.75, 1, or 2 to promote effective heat transfer from a thermal regulator to a fluid sample contained within the serpentine channel for the initiation, incubation, thermal cycling, or termination of a biochemical or chemical reaction therein. In some embodiments, the channels have a constant aspect ratio. In other embodiments, the channels have a variable aspect ratio along the length of the channel. The channels of the isolated shelf portion can be created with different patterns; e.g., serpentine, curves, zig-zag, etc., in order to provide increased length and surface area of the channel and a permit a high density of the individual channels to be incorporated as a compact array within the extended shelf portion of the microfluidic device. The excellent volume-to-surface ratio the long path imparted by such configurations of the channels in the isolated portion benefits both the mixing of sample and introduced reagents and the thermal transfer of heat or cooling or temperature regulation to the sample mixture. Because of the volume to surface ratio of the channels, the temperature of small samples (0.01-10 µl) contained in each of the channels of the extended shelf region quickly equilibrates with the temperature of the thermal regulator. In other embodiments, large chambers with low surface to volume ratios can be used.

To permit more control, in another embodiment, one or both surfaces of the isolated portion comprise heat spreaders. These include, for example, metal strips or graphite strips that cover all or part of the exposed portion and that spread heat provided from the other side of the heat spreaders. In another embodiment, thermal insulators are provided in thermal contact with at least part of the isolated portion to lessen the effects of ambient air above the isolated region.

C. Fluidics and Pneumatics Manifolds

In certain embodiments, the chip is mated with fluidics and/or pneumatic manifolds. These manifolds comprise openings that mate with openings in the fluidics layer or the pneumatics layer of the chip, allowing introduction of sample or reagents into the microfluidic circuits of the chip, or to remove material from the fluidic circuits, such as reaction product. A fluidics manifold is shown in FIG. 7, 704.

II. Instrument

A. Thermal Regulator

In another aspect of the invention, the isolated portion comprising the one or more microfluidic channels is in thermal contact with a thermal regulator. The thermal regulator can be any device that regulates temperature. This includes, for example, resistive wires that heat up when a voltage is applied (such as those used in toasters), resistive heaters, fans for sending hot or cold air toward the isolated portion, Peltier devices, IR heat sources such as projection bulbs, circulating liquids or gases in a contained device, and microwave heating.

Figure 12:
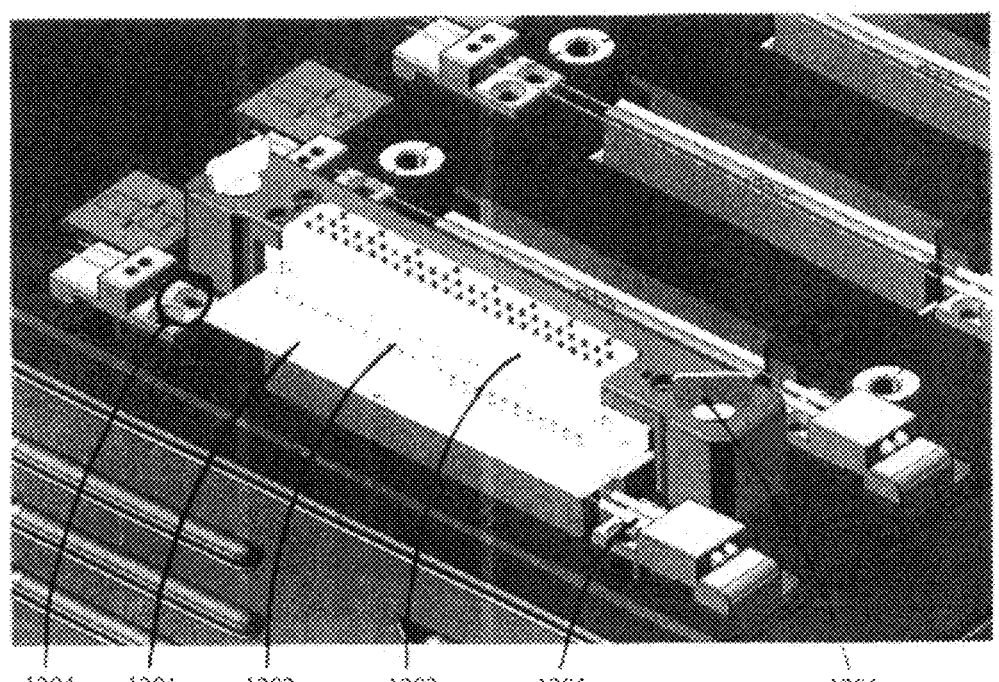
FIG. 12 illustrates an embodiment of an instrument of this invention. Elements include thermal regulator (1204, resistive wires) biased with spring bias 1205, microfluidic chip comprising sandwich portion 1202 and isolated portion (1201, extended shelf region). A fluidics manifold 1203 is mated with the chip, which engaged with the base of the instrument with locks (1206, screws).

The thermal contact between the isolated portion and the thermal regulator provides thermal regulation of the isolated portion and fluidic samples contained therein for incubation and/or regulation of biochemical or chemical reactions. The ability of the thermal regulator to be programmed for different temperatures and incubation times, together with the ability to control the introduction of samples, reactants and other reagents into the microfluidic channel of the extended shelf region that is in thermal contact with the thermal regulator, provides the ability to control the reaction times, temperatures, and reaction conditions within the microfluidic channels. In one embodiment, thermal contact between a first surface of the isolated portion of a microfluidic chip device is established by securing a microfluidic chip device to a first surface, or heat spreader, of the thermal regulator. Where the microfluidic chip device is attached to a heat spreader, there may be an air gap between the isolated portion of the microfluidic chip device and the heating element of the thermal regulator. The microfluidic device can be secured to the thermal regulator by one or more bolts, screws, pins, clips, brackets, or other such securing devices (FIG. 12). In one embodiment, the first surface of the isolated portion of the microfluidic device is in thermal contact with a flat surface, or platen, of a thermal regulator that covers one or more thermal regulators. In another embodiment, a first surface of the isolated portion is in thermal contact with a slotted surface, or heat spreader of a thermal regulator (FIG. 12). In the latter embodiment, the one or more thermal regulators are housed in the slotted surface and the first surface of the isolated portion substantially covers or bridges the slotted portion of the heat spreader when the microfluidic chip device is secured to the thermal regulator. In other embodiments, the first surface of the isolated portion of the microfluidic device is in thermal contact with a first surface of a thermal regulator and a second surface of the isolated portion is in thermal contact with a second thermal regulator. In another embodiment, a first surface of the isolated portion is in thermal contact with a first surface of a thermal regulator and a second surface of the isolated portion is in thermal contact with an insulator.

Figure 9:
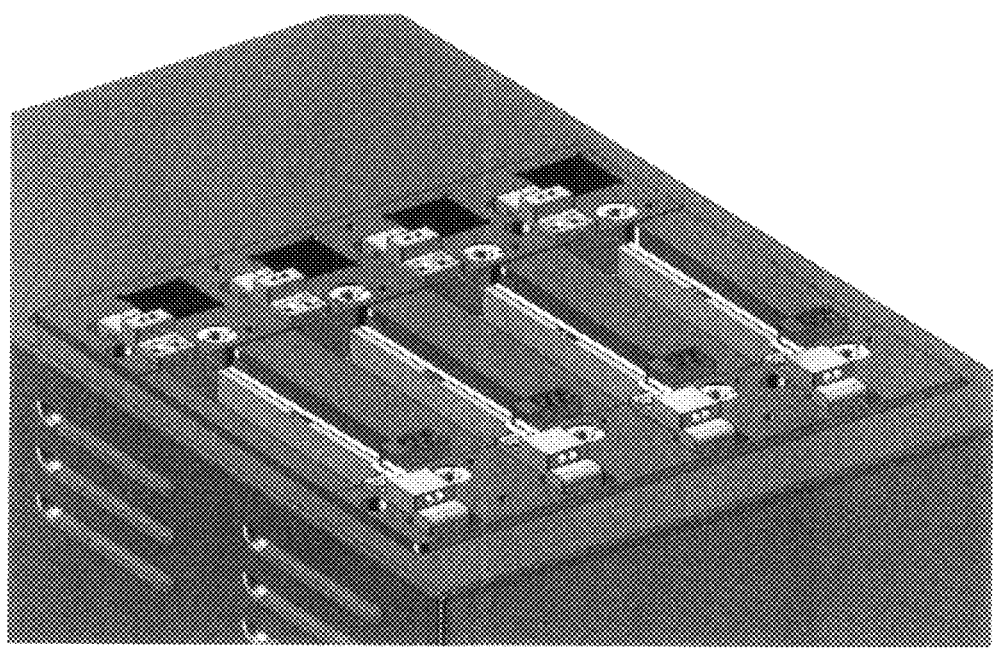
FIG. 9 illustrates an embodiment of a thermal regulator with four temperature regulation zones, each with two resistive thermal regulators and threaded holes for securing the microfluidic chip devices.

The thermal regulator can be an electrical apparatus comprising one or more temperature sensors, e.g., thermocouples, thermistors, RTDs, and one or more regulators configured for temperature regulation, incubating, or thermal cycling the isolated portion of an attached microfluidic chip device. In turn, the fluidic biological or chemical samples introduced into the isolated portion of the microfluidic device are heated, incubated, cooled, or thermal cycled in repetitive fashion in order to carry out one or more of a number of biochemical or chemical procedures or processes. In one embodiment, the thermal regulators comprise two parallel metal resistive temperature regulation rods, wires, or coils that substantially traverse the width of the thermal regulator (FIG. 9). The thermal regulators can be retained on each end by insulators with integrated resistive spring elements configured to contract as the thermal regulators expand. Thus, the device can comprise a biasing element so that the wire can be biased to maintain a substantially straight orientation. See, e.g., FIG. 12, 1205. The thermal regulators may be made from standard resistance metals known in the art such as nichrome, platinum, titanium, and optionally coated with silicon carbide. The thermal regulator may contain 1, 2, 3, or 4 or more separate thermal regulators oriented parallel to each other within the apparatus or in other geometries. In one embodiment, the one or more thermal regulators are under the control of a single regulator. In another embodiment, each thermal regulator is under the control of a separate regulator. The use of the regulator and temperature sensors in conjunction with the thermal regulators permits control of the rate of temperature change as well as the set point. For example, the rate of temperature change can be more than 1° C./sec, more than 2° C./sec, more than 3° C./sec, or higher rates of temperature change.

Figure 10:
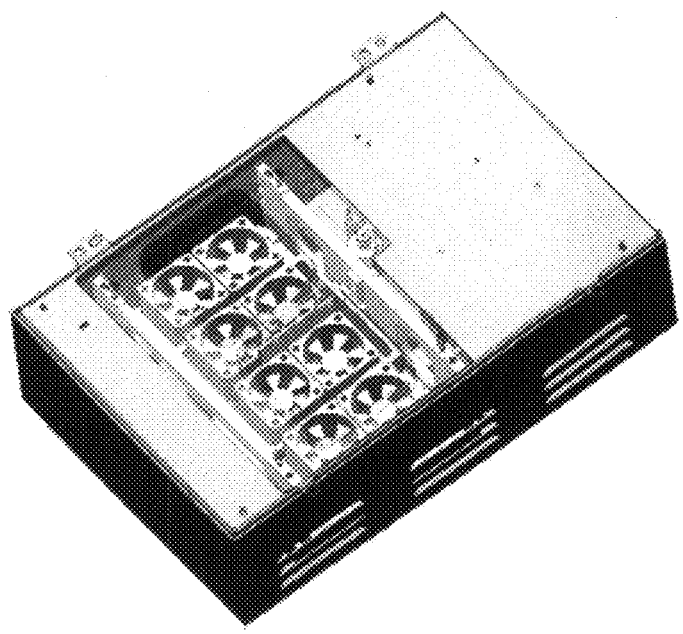
FIG. 10 illustrates an embodiment of a thermal regulator as a cut-away bottom view showing the cooling fans located under the temperature regulation zones.

A preferred embodiment of the invention includes four powered and controlled thermal regulators. Generally, the thermal regulators are located under or recessed into a first surface of the thermal regulator that contacts the first surface of the isolated region of the microfluidic device. In the embodiments, the thermal regulators do not directly contact the heat transfer surfaces or the isolated region of the microfluidics device. In one embodiment, the thermal regulators are located under or within a temperature conductive platen. In another embodiment, the thermal regulators are located in a recessed or slotted portion of a conductive heat spreader. The platen or heat spreader can be comprised of a metal that has a high thermal conductivity but low thermal capacity such as, but not limited to copper, silver, aluminum, steel, or alloys thereof. The platen or heat spreader further comprises one or more temperature sensors attached to or embedded in the platen or heat spreader, configured to be in proximity to the isolated region of the microfluidic device when it is in contact with the first surface of the thermal regulator. In one embodiment, the thermal regulator comprises one temperature sensor operably connected to a regulator for the control of the thermal regulator. In another embodiment, the thermal regulator comprises one temperature sensor for each thermal regulator, which detects a temperature in the vicinity of the corresponding thermal regulator and the attached isolated region of the microfluidic device, and is operably connected to one or more regulators for the control of each thermal regulator. The thermal regulator may further comprise one or more cooling fans located under the one or more thermal regulators to rapidly cool the device by forcing air across the elements and the base of the platen or heat spreader, and means for venting the air out of the apparatus, taking the unwanted heat with it (FIG. 10). The embodiments allows temperature regulation and cooling of a sample to take place both quickly and uniformly. In one embodiment, the one or more cooling fans provide cooling for the entire apparatus.

In another embodiment, the thermal regulator is configured into separate thermal zones, or stations, with each zone comprising a separate thermal regulator, one or more temperature sensors, one or more fans, and a regulator dedicated to each zone for the separate thermal control of that zone, a separate platen or heat spreader above the zone, and configured to attach and connect the microfluidic device such that the isolated region of the microfluidic device is in contact with the thermal zone. A preferred embodiment of the invention includes four individually controlled thermal zones (FIG. 9), each configured to accept an attached microfluidic chip device with the isolated region in physical contact with the corresponding surface of the thermal zone or station (FIG. 12).

Figure 11:
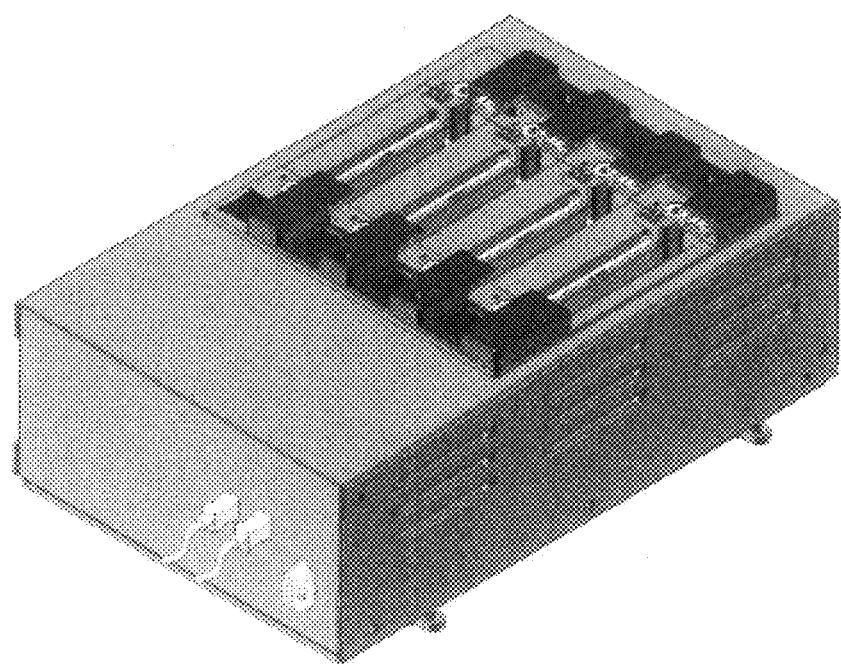
FIG. 11 illustrates an embodiment of a thermal regulator showing electrical and input/output connections for powering and controlling the device.

It is to be understood that the teachings of the invention encompass an automated control such as, for example, a microprocessor or computer controlled system. The regulator, temperature sensors, thermal regulators, cooling fans and electric power supply are operably connected with standard connectors known in the art (FIG. 11) to the microprocessor or computer that can be programmed by using a recording medium or input device for operating the apparatus through the desired time versus temperature profile or to maintain a constant temperature, and to regulate or correct the temperature in response to the signals generated by the temperature sensors. In one embodiment, the microprocessor can be programmed to control the individual thermal zones of the apparatus separately.

In another embodiment, the thermal regulator comprises a thermoelectric pump, or Peltier module, in which one surface of the Peltier module serves as the first surface of the platen, in contact with the first surface of the isolated region. The module further comprises one or more temperature sensors attached to or embedded in the platen that are operably connected to a regulator for the control of the Peltier module. As the Peltier module can function as both a temperature regulation and a cooling surface by directional control of the current passing through it, the device enables constant-temperature control of the platen so that a reaction in the corresponding isolated region of the microfluidic device can be controlled with high accuracy. The regulator, temperature sensors and Peltier module are operably connected to a microprocessor that can be programmed for operating the apparatus through the desired time versus temperature profile, and to regulate or correct the temperature in response to the signals generated by the temperature sensors.

B. Magnet Assembly

Figure 14:
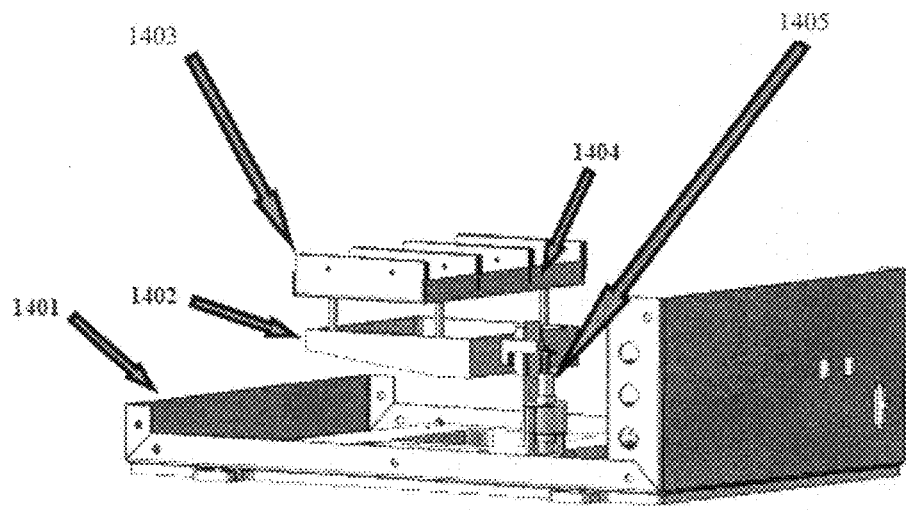
FIG. 14 illustrates an embodiment of a magnet assembly. Items 1401-1405: 1401-instrument chassis; 1402-magnet lift mechanism structural bracket; 1403-magnet assembly; 1404-magnet holder weldment; 1405-linear motion actuator.

In another aspect, the invention provides a magnet assembly 1401 (FIG. 14). The magnet assembly can be a component of the instrument of the invention. The magnet assembly can be used to provide a magnetic field to one or more chambers or areas of the microfluidic chip assemblies of the invention. For example, the magnetic assembly can be used to provide a magnetic field to a capture chamber described herein.

In one embodiment, the magnet assembly comprises a magnet moving device 1402 which comprises one or more magnets 1403. The magnet assembly can comprise one, two, three, four or more magnets. The magnet assembly can comprise holders 1404 to secure the one or more magnets. In one embodiment, the magnet assembly comprises slots to secure the one or more magnets. In another embodiment, the magnet assembly comprises brackets to secure the one or more magnets. In another embodiment, the one or more magnets are secured to the magnet assembly by one or more plates, bolts, screws, pins, clips, brackets, or a combination of securing devices to attach the one or more magnets to the assembly. In some embodiments the magnet assembly is mobile and can be moved in relation to the instrument. In one embodiment, the magnet assembly is operably connected to the chip station assembly and can be moved within the chip station assembly by an actuator or other mechanical device.

Figure 15:
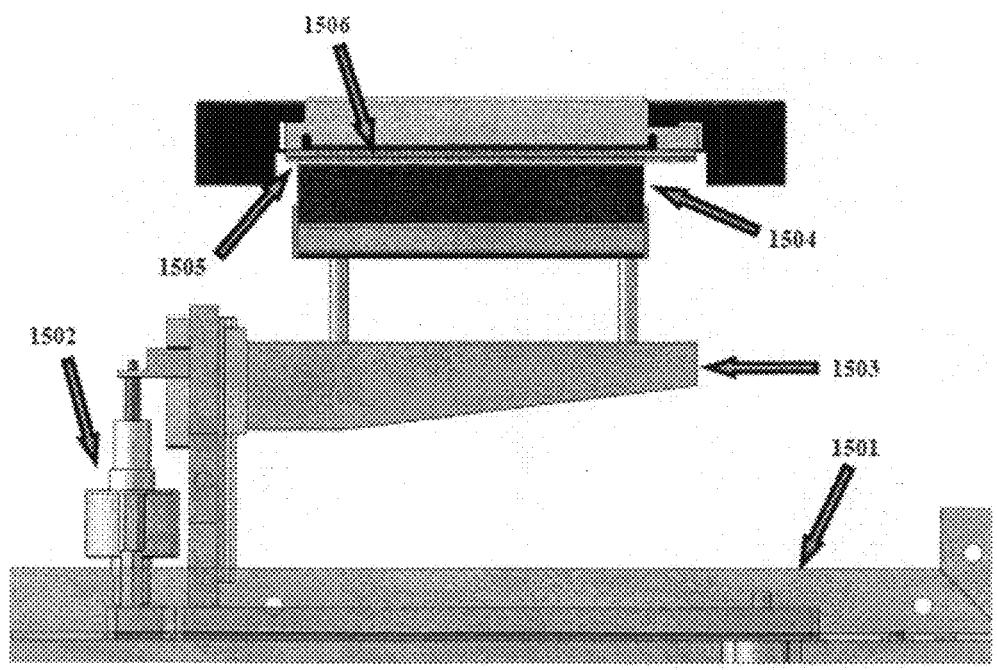
FIG. 15 illustrates an embodiment of a magnet assembly wherein a magnet has been moved by the device into a functional position relative to a microfluidic chip. Items 1501-1506: 1501-instrument chassis; 1502-linear actuator; 1503-magnet lift mechanism structural bracket; 1504-magnet assembly; 1505-microchip, extended shelf portion; 1506-microchip, sandwich portion.

Illustrated as one embodiment in FIG. 15, the magnet assembly 1501 can further comprise an actuator 1502. The actuator can be operably connected to a power supply and a control device that can be a microprocessor or computer control for regulating the position, movement, and time in a given position of the magnetic assembly in relation to the chip station assembly and the microfluidic devices.

The actuator can comprise a motor and a mechanical device 1502, e.g., levers, rotating screws, rods, springs, a shelf, a bracket or a platform 1503 that are connected and operably configured to move the magnet assembly. In one embodiment, the actuator is a linear actuator. In one embodiment, the assembly comprising one or more magnets 1504 can be moved into or away from a functional position 1505 at a station holding one or more microfluidic chips 1506. In one embodiment, the moving into a functional position can be accomplished by the actuator such that the magnets are moved into a close proximity to a region of the microfluidic chip station 1505. In one embodiment, the actuator can move the magnet assembly to a functional, or capture position in relation to an isolated region of one or more microfluidic chip devices; e.g., a capture chamber/valve. For example, the magnet can be moved into a position so that it exerts sufficient force to capture or immobilize paramagnetic microparticles in the chip under microfluidic flow conditions. In another embodiment, the actuator can move the magnet assembly away from the functional position to a release position. The actuator can also variably adjust the position of the magnet assembly in relation to a discrete location of one or more microfluidic chips that are connected to chip stations on the thermal regulator device.

Figure 16:
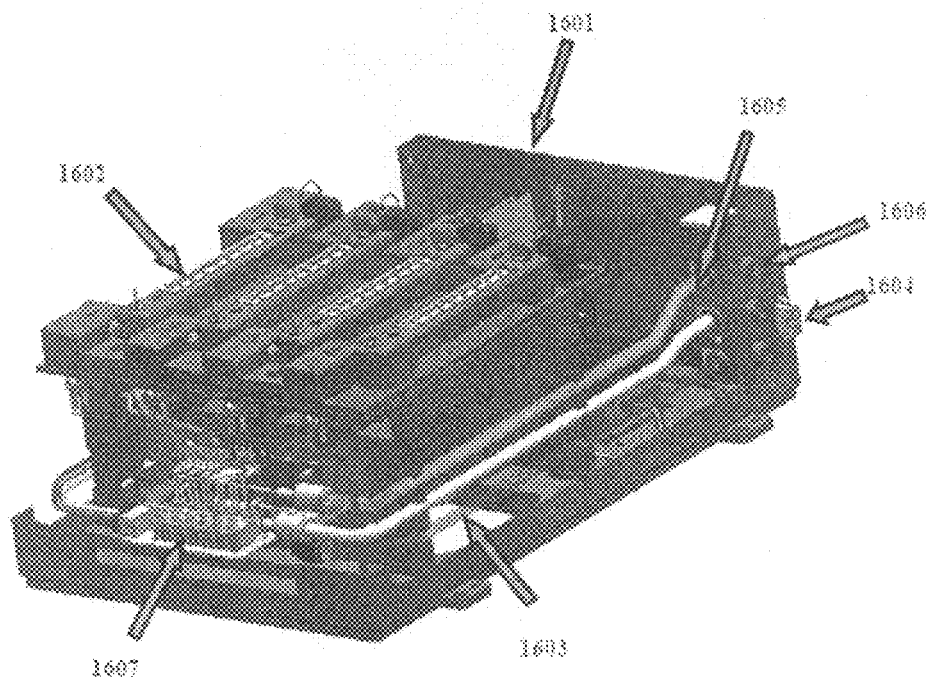
FIG. 16 illustrates an embodiment of the instrument 1601 of the invention including four microfluidic chip assemblies 1602 attached to the instrument, with electrical circuits for the thermal regulators 1603 connected to an in/out connection 1605. Pneumatic conduits 1605 are fed through pneumatic ports 1606 to pneumatic actuators 1607 to control the valves and ports of the microfluidic chip.

FIG. 16 illustrates an embodiment of the instrument 1601 of the invention including four microfluidic chip assemblies 1602 attached to the instrument, with electrical circuits for the thermal regulators 1603 connected to an in/out connection 1605. Pneumatic conduits 1605 are fed through pneumatic ports 1606 to pneumatic actuators 1607 to control the valves and ports of the microfluidic chip. The four microfluidic chip assemblies are shown as positioned parallel to one another. The microfluidic chip assemblies can be secured to the instrument 1601 by hand-operated screws, levers, or latches.

Figure 17:
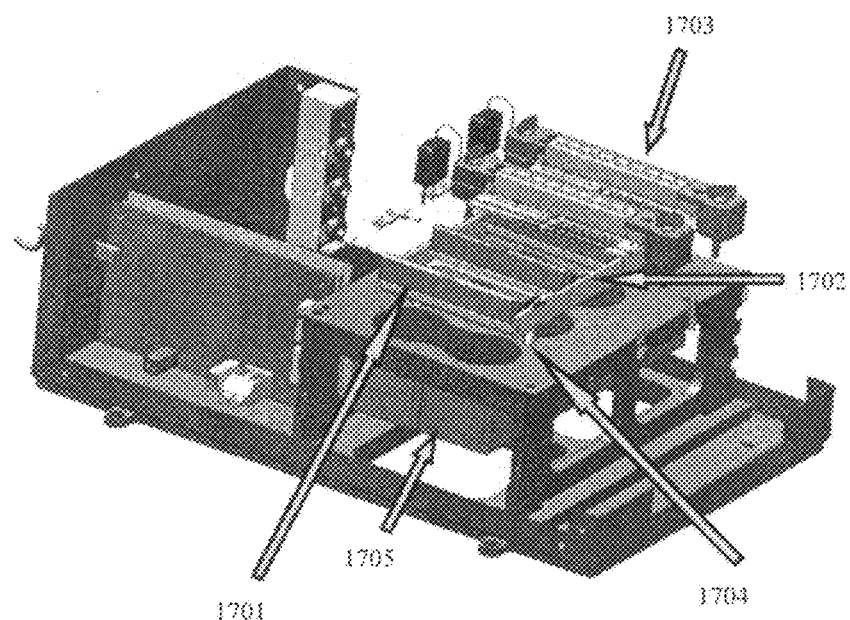
FIG. 17 illustrates a partial view of an embodiment of the instrument, including a magnet assembly operably connected through the thermal regulator, in relation to the chip stations. The view shows an array of four magnets 1701 held in parallel orientation by brackets 1702, with two chip stations 1703 located adjacent to two of the magnets. Connecting rods 1704 of the magnet assembly pass through the thermal regulator, a portion of which is shown in 1705.

FIG. 17 illustrates a partial view of an embodiment of the instrument, including a magnet assembly operably connected through the thermal regulator, in relation to the chip stations. The device can have an array of four magnets 1701 held in parallel orientation by brackets 1702, with two chip stations 1703 located adjacent to two of the magnets. Connecting rods 1704 of the magnet assembly pass through the thermal regulator 1705 to brackets that hold the magnets, to move the magnets into or away from a functional position relative to the microfluidic chips in response to the actuator. The magnet assembly can move orthogonally with respect to the plane of the microchip and/or in an up-and-down direction.

The instrument can be programmed to operate the actuator to move the magnet assembly into or away from one or more microfluidic devices that are attached to the instrument. The actuator can be moved in response to commands from a microprocessor, computer, or switch of the instrument. In the embodiments, the instrument can be programmed with different assay profiles to move the magnet assembly into various positional configurations as a function of time or assay steps, depending on the assay to be performed. In other embodiments, the magnet assembly can be directly controlled by the operator through inputs to a microprocessor, computer, or switch device.

1. Magnets of the Magnet Assembly

Figure 18:
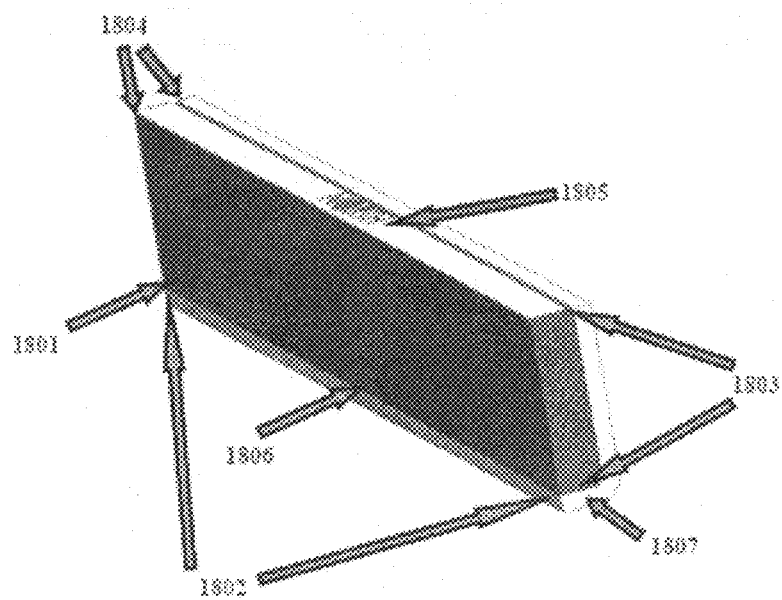
FIG. 18 illustrates an embodiment of a magnet and shield of the magnet assembly. The magnet 1801 has a long dimension 1802, an intermediate dimension 1803 and a short dimension 1804, and is substantially rectangular in shape. The long and short dimensions define a first pair of faces defining north 1805 and south magnetic poles 1806. A shield 1807 contacts a second face of the magnet defined by the long and intermediate dimension.

The magnet of the magnet assembly can be a permanent magnet, an electromagnet, or a rare earth magnet. The magnet can further comprise a shield (FIG. 18). The magnet can have dimensions so that it exerts a magnetic field across a plurality of fluidic circuits in a chip, e.g., circuits arranged geometrically in parallel (e.g., FIG. 7). Magnet 1801 has a long dimension 1802, an intermediate dimension 1803 and a short dimension 1804, and is substantially rectangular in shape.

The long and short dimensions define pairs of faces defining north 1805 and south magnetic poles 1806. The shield 1807 contacts two faces of the magnet, bridging the long and short dimensions. The magnet can be oriented within the magnet assembly such that in one embodiment the north pole faces up in relation to the chip station and the south pole faces down, and in another embodiment the south pole faces up and the north pole faces down.

The magnets exert a magnetic force, which, in the case of a permanent or rare earth magnet, can be constant, or can be induced by application of an electrical force to the magnet in the case of an electromagnet. The shield 2002 comprises materials that distort or direct the magnetic field 2003 or flux of the attached magnet 2001. The shield can be comprised of materials with a higher permeability to magnetic fields than air, resulting in the magnetic field lines traveling the path of least resistance through the higher permeability shield material, leaving less magnetic field in the surrounding air. The shield can be comprised of nickel, iron, steel, or various alloys thereof. In one embodiment, the shield comprises 1010 stainless steel. In addition, the shield may comprise various alloys of iron, nickel and cobalt including but not limited to Alnico and Permalloy. In one experiment, the effects of attaching a steel shield to an N42 magnet were tested. The N42 magnet had an average magnetic force density of 16.6 $T^2/m$ ($Tesla^2$/meter) and a maximum force density of 27.7 $T^2/m$. When a steel shield of 0.050" thickness was attached to the N42 magnet, the average force density increased to 67.3 $T^2/m$, while the maximum force density was 138.9 $T^2/m$.

Figure 20:
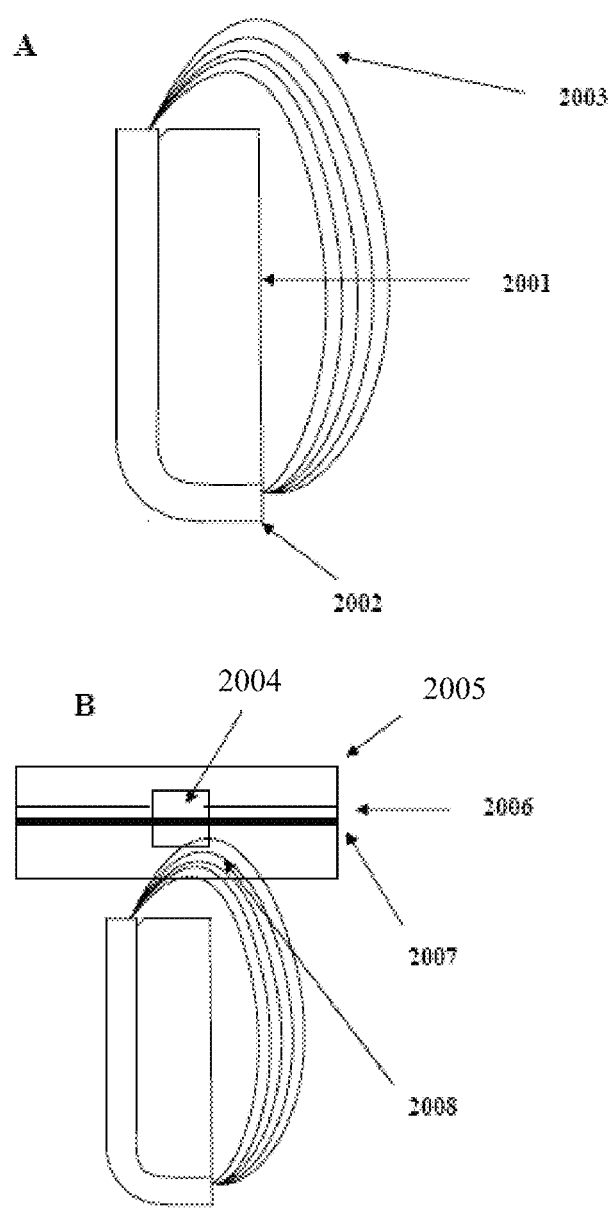
FIG. 20A illustrates a magnet 2001 with attached magnetic shield 2002 and the resulting focused magnetic field 2003.
FIG. 20B illustrates a microfluidic chip 2005 with capture chamber/valve 2004, microfluidic channels 2006, and elastomeric membrane 2007. The chip is in the functional position where the chamber is in the focused magnetic field 2008.

In one embodiment, the magnets and shields of the invention are configured such that the magnetic field is distorted, with field lines substantially focused and compressed within the shield, with other field lines radiating above and away from the shield and returning to the opposite pole, as shown in FIG. 20. Accordingly, in the embodiments the shielded magnet can be positioned by the instrument such that the maximum intensity of the magnetic field force can be focused within a region of the microfluidic chip when placed in the functional position, and can also be retracted to substantially remove the influence of the magnetic field on the microfluidic chip.

The magnet and attached shield can be configured to provide a focused magnetic field density within the functional position of at least about 15, at least about 20, at least 25, at least about 30, at least about 50, at least about 140, or at least about 160 $T^2/m$.

2. Magnet Assembly and Microfluidic Devices

Figure 19:
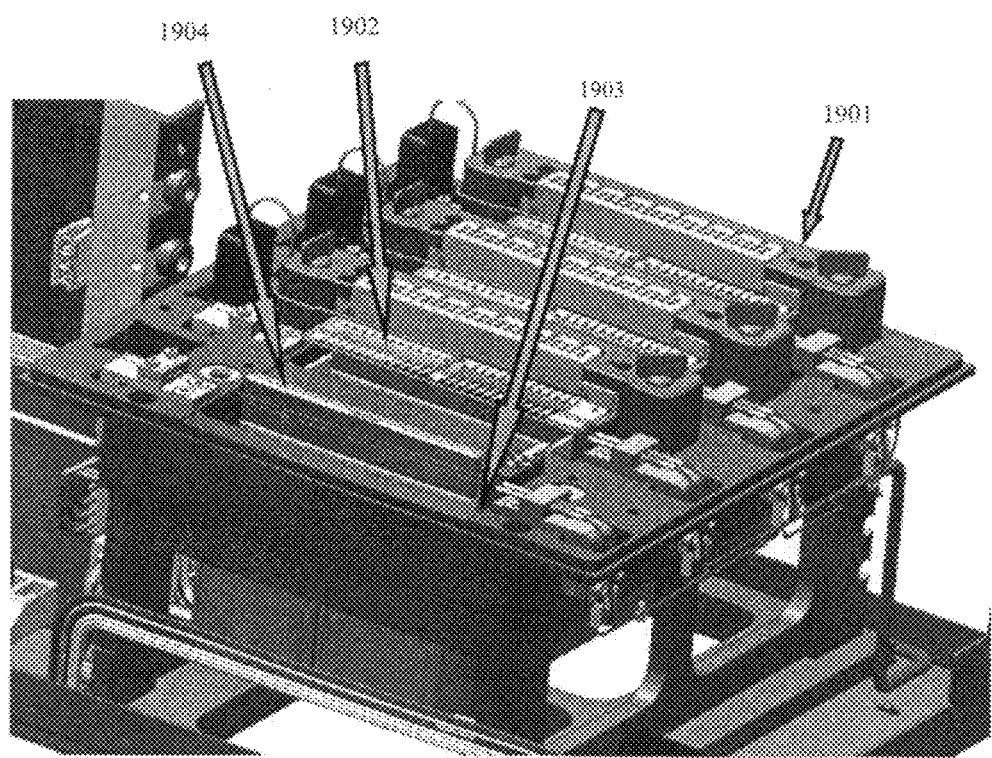
FIG. 19 is a partial view of an embodiment of the instrument, illustrating the relative positions of various components. The instrument is shown with four chip stations 1901 with three fluidic manifolds and chips 1902 attached. The heating elements 1903 are located under the extended region, or shelf of the microfluidic chip, and are fed by controlled electrical circuits. The magnets 1904 are located adjacent to the heating elements with the attached shield oriented on face the opposite the heating element. In this illustration, the magnet in the view has the north pole oriented up. In this embodiment, the remaining three magnets would be configured, in order, with alternating orientations of south, north, and south poles facing up.

The instrument of the invention can comprise a magnet assembly, a thermal regulator and microfluidic chip stations with microfluidic chips operably attached. FIG. 19 is a partial view of an embodiment of the instrument, illustrating a non-limiting example of the relative positions of various components. The instrument of the example is shown with four chip stations 1901 with three manifolds and chips 1902 attached. The heating elements 1903 of the thermal regulator are located under the extended region, or shelf, of the microfluidic chip, and are fed by controlled electrical circuits. The magnets 1904 are located in a slot adjacent to the heating elements with the attached shield oriented on the magnet face opposite the heating element. The magnet assembly can move the magnets up and down in the slot, to place them or remove them from the functional position. In this illustration (FIG. 19), the magnet in the view has the north pole oriented up. In this embodiment, the magnets of the magnetic assembly would be configured, in order, with alternating orientations of north, south, north, and south poles facing up, towards the chip station. In another embodiment, the first station could be configured with the south pole of the magnet facing up, with the remaining magnets configured, in order, north, south, north.

The invention further provides that the magnets of the magnet assembly can be moved from a distant position into a functional position, or capture position, in close proximity to a region of the microfluidic station that comprises one or more capture chambers/valves (see 40, FIG. 6). In one embodiment, the magnetic assembly is configured to move the magnets to a close position within about 0.1, 0.2, 0.3, 0.4, 0.5, 0.7, 1, 2, 4, 6, or 8 mm of a capture chamber/valve region of a microfluidic station. In another embodiment, the magnetic assembly is configured to move the magnets to a close position within about 0.1, 0.2, 0.3, 0.4, 0.5, 0.7, 1, 2, 4, 6, or 8 mm of a region of each of a plurality of microfluidic stations with attached microfluidic chips comprising a plurality of adjacent capture chamber/valves. In another embodiment, the magnetic assembly is configured to move the magnets to a location that provides a focused magnetic field force, or flux, to a substantially linear region across each microfluidic chip attached to a station, wherein the microfluidic chip comprises a plurality of adjacent fluidic channels, each with one or more capture chamber/valves. In one embodiment, each microfluidic chip comprises 24 adjacent fluidic circuits with at least one capture chamber/valve in each circuit. In another embodiment, the magnetic assembly is configured to move the magnets from the functional, or capture position to a distant, or release position that substantially withdraws or reduces the focused magnetic force in the capture chamber/valve region of the one or plurality of microfluidic circuits of microfluidic chips of each chip station.

In one embodiment, the magnetic assembly is configured to move the magnets to a functional position that provides a focused magnetic force, or flux, to a region of four microfluidic chips that are that each operably attached to a chip station of the instrument. In another embodiment, the magnetic assembly is configured to move the magnets to a location that substantially removes the focused magnetic force, or flux, from the functional positions of a plurality of microfluidic chips. In another embodiment, the magnetic assembly is configured to move the magnets to variable positions in relation to the chip station, as required by the assay parameters.

3. Use of the Magnetic Assembly and Microfluidic Devices

The magnet assembly can be used, for example, in the movement, capture, confinement, and release of reagents, samples, and analytes in association with particles, for example, magnetic or paramagnetic beads or particles, that are used in assays and procedures that employ the microfluidic chip device and the instrument. The magnet assembly is particularly useful in the capture, confinement and release of particles within a capture chamber/valve 40 of the microfluidic chip (FIG. 6). The capture chamber/valve can be created as an area, or opening, within two glass microfluidic layers with a deformable membrane layer, such as polydimethyl siloxane (PDMS) but which does not have a valve seat. A microfluidic chip can comprise a capture chamber/valve connected to two or more microfluidic channels in each microcircuit of the microfluidic chip. The deformable layer can be in one of three positions; a first deformed position, a neutral position, and a second deformed position. By application of a positive or negative pneumatic force to the channel that controls the valve. The pneumatic (or elastomeric) layer that spans the valve is deformed into the first or the second deformed position. When the membrane is deformed in a first direction, the volume area of the chamber increases such that the rate of flow of liquids across the chamber decreases relative to that in the microfluidic channels connected to the chamber. In one embodiment, when the membrane is deformed in a first direction and the magnet assembly is moved into the functional, or capture position, magnetic or paramagnetic beads or particles that enter the chamber are substantially retained within the chamber due to the slower rate of flow and the focused magnetic field within the chamber. In another embodiment, when the pneumatic force is withdrawn, the membrane returns to a neutral, or non-deformed position such that the rate of fluid flow across the chamber increases, which may overcome the magnetic resistive force retaining the beads. In another embodiment, when the pneumatic force is withdrawn (returning the membrane to the neutral position) and the magnet assembly is withdrawn to the distant, or release position and fluid flow is introduced into the chamber, the beads are not retained within the chamber and move with the fluid flow to other regions of the microfluidic chip. In another embodiment, when the magnet assembly is moved to the release, or distant position and the membrane of the capture chamber/valve is deformed in a second deformed direction by pneumatic force, the valve acts as a pump to move fluid and any beads that may be in the chamber into a microfluidic channel.

The capture chamber/valve may be used in conjunction with the magnet assembly for the capture of beads or particles and subsequent processing of materials or analytes associated with the beads. Accordingly, the beads may first be captured by the deformation of the membrane, the moving of the magnet assembly into the functional, or capture position, and the introduction of magnetic or paramagnetic beads or particles into the chamber by controlled fluid flow in the microfluidic channel. In one embodiment, the captured beads and any attached analyte or substrate may be washed by the introduction of fluid into the chamber that does not overcome the restraining force of the magnetic field holding the beads within the capture chamber. In another embodiment, reactants, labels, or other assay materials or reagents can be introduced into the capture chamber restraining the captured beads for reaction of analytes, reactants or substrates associated with the beads. In another embodiment, analytes, labels, or other reactants can be dissociated from the captured or restrained beads by introduction of other materials, liquids, or temperature controlled solutions from other regions or reservoirs of the microfluidic chip into the captured chamber with the captured beads. The invention provides for combinations of the various embodiments of capture, introduction of solutions and reagents, and release of bound or unbound analytes by various permutations of pneumatic control of the capture chamber/valve, position of the magnetic assembly, and flow of fluid from the microfluidic channels.

In some embodiments the beads may comprise binding moieties linked to a substrate, including, but not limited, antibodies, Fc fragments, Fab fragments, lectins, polysaccharides, receptor ligands, DNA sequences, PNA sequences, siRNA sequences, or RNA sequences. In another embodiment, one or more regions of the microstructure may comprise beads, such as magnetically responsive beads or particles. In some embodiments the beads may comprise binding moieties, including, but not limited, antibodies, Fc fragments, Fab fragments, lectins, polysaccharides, receptor ligands, DNA sequences, PNA sequences, siRNA sequences, or RNA sequences. In some embodiments the magnetically responsive particles have dimensions smaller than 600 nm, such as 590 nm, 580 nm, 570 nm, 560 nm, 550 nm, 540 nm, 530 nm, 520 nm, 510 nm, 500 nm, 490 nm, 480 nm, 470 nm, 460 nm, 450 nm, 440 nm, 430 nm, 420 nm, 410 nm, 400 nm, 390 nm, 380 nm, 370 nm, 360 nm, 350 nm, 340 nm, 330 nm, 320 nm, 310 nm, 300 nm, 290 nm, 280 nm, 270 nm, 260 nm, 250 nm, 240 nm, 230 nm, 220 nm, 210 nm, 200 nm, 190 nm, 180 nm, 170 nm, 160 nm, 150 nm, 140 nm, 130 nm, 120 nm, 110 nm, 100 nm, 90 nm, 80 nm, 70 nm, 60 nm, 50 nm, 40 nm, 30 nm, 20 nm, or 10 nm. In some embodiments the magnetically responsive beads comprise an iron compound. In one embodiment the magnetically responsive beads is a ferrite bead.

In some embodiments, a magnetically responsive particle, e.g., a magnetic or paramagnetic bead or particle has a diameter that is between 10-1000 nm, 20-800 nm, 30-600 nm, 40-400 nm, or 50-200 nm. In some embodiments, a magnetically responsive particle, e.g., a magnetic or paramagnetic bead or particle has a diameter of more than 10 nm, 50 nm, 100 nm, 200 nm, 500 nm, 1000 nm, or 5000 nm. The magnetic or paramagnetic beads can be dry or suspended in a liquid. Mixing of a fluid sample with a second liquid medium containing magnetic or paramagnetic beads can occur by any means known in the art including those described in U.S. Ser. No. 11/227,469, entitled "Methods and Systems for Fluid Delivery."

In some embodiments, when an analyte in a sample (e.g., analyte of interest or not of interest) is ferromagnetic or otherwise has a magnetic property, such analyte can be separated or removed from one or more other analytes (e.g., analyte of interest or not of interest) or from a sample depleted of analytes using a magnetic field. For example, a first analyte is coupled to antibodies that specifically bind the first analyte and wherein the antibodies are also coupled to magnetically responsive particles, e.g., magnetic or paramagnetic beads or particles. When a mixture of analytes comprising the first analyte-magnetic or paramagnetic bead complex and a second analyte are delivered into a magnetic field, the first analyte-magnetic or paramagnetic bead complex will be captured while other cells continue to migrate through the field. The first analyte can then be released by removing the magnetic field.

In some embodiments, when an analyte desired to be separated (e.g., analyte of interest or not of interest) is not ferromagnetic or does not have a magnetic property, magnetically responsive particle, e.g., a magnetic or paramagnetic bead or particle can be coupled to a binding moiety that selectively binds such analyte. Examples of binding moieties include, but are not limited to, lectins, polypeptides, antibodies, nucleic acids, etc. In preferred embodiments, a binding moiety is an antibody or antibody fragment (such as Fab, Fc, sfv) that selectively binds to an analyte of interest (such as a red blood cell, a cancer cell, a sperm cell, a nuclei, a chromosome, a white blood cell, an epithelial cell, a bacterium, a virus or fungi). Therefore, in some embodiments magnetically responsive particle, e.g., a magnetic or paramagnetic bead or particle may be decorated with an antibody (preferably a monoclonal antibody).

Magnetically responsive particles may be coupled to any one or more of the microstructures disclosed herein prior to contact with a sample or may be mixed with the sample prior to delivery of the sample to the device(s).

In some embodiments, the systems herein include a reservoir containing a reagent (e.g., magnetic or paramagnetic beads) capable of altering a magnetic property of the analytes captured or not captured. The reservoir is preferably fluidly coupled to one or more of the microstructures disclosed herein. For example, in some embodiments, a magnetic reservoir is coupled to a size-microchannel and in other embodiments a magnetic reservoir is coupled to a capture region. In one embodiment, the samples can be moved to wells 80 and magnetically responsive particles, e.g., magnetic or paramagnetic beads or particles and binding moiety introduced and then further moved to a capture chamber region 40 with the magnetically responsive particles, e.g., magnetic or paramagnetic beads or particles, and captured by application of a magnetic field when the magnetic assembly is moved into the functional position. The on-chip MOVe pumps, e.g., 10, 20 and 30 move the beads with bound analyte, e.g., purified nucleic acids, which can be removed from one of the removal ports 90 or can be released by the local application of heat by moving the beads back into the serpentine channels of the extended region and use of the heating elements.

Once a magnetic property of an analyte has been altered, it may be used to effect an isolation or enrichment of the analyte relative to other constituents of a sample. The isolation or enrichment may include positive selection by using a magnetic field to attract the desired analytes to a magnetic field, or it may employ negative selection to attract an analyte not of interest. In either case, the population of analytes containing the desired analytes may be collected for analysis or further processing by first or sequentially concentrating the material attached to the beads or particles in the capture chamber/valve by moving the magnetic assembly into the functional position at an appropriate step of the assay procedure. The magnetic assembly can then be removed from the functional position, releasing the beads or particles. The beads or particles with associated analyte moved to a collection reservoir by operation of the pumping valves of the microfluidic device. In another embodiment, the beads or particles can be moved into a region of the microfluidic device for the addition and mixing of other reagents, and moved back into the reaction zone of the extended region for further processing or chemical reaction steps; e.g., PCR. The resulting reactants can then be collected or separated, as desired, by appropriate application of fluidic pressure from the fluidic device and/or magnetic field force from the magnetic assembly.

III. Methods of Use

The devices of the invention can be used to perform one or more reactions. The reactions can require mixing, heating, magnetic capture, or a variety of other actions. In some embodiments of the invention, a microfluidic device can be used to combine one or more samples and one or more reagents in a microfluidic channel. The samples and reagents can then be mixed using the devices and methods of the invention and then incubated at a desired temperature to perform a particular reaction, e.g., an enzymatic reaction. The reaction products are then immobilized to magnetically responsive particle, e.g., magnetic or paramagnetic beads or particles that can be separated from a surrounding solution by a magnet.

A. Mixing

The devices described herein can be used to mix one or more fluids. A fluid to be mixed can be a liquid such as an aqueous liquid and/or a solution containing solid particles such as glass beads or magnetic particles such as magnetic or paramagnetic beads. The fluids can be mixed in a channel, a microfluidic channel, a microchannel, a chambers, a valve, or in other structures.

The fluids can be mixed by convective and/or diffusive forces. For example, a valve can be used to induce turbulent conditions that allow for two fluid mixtures to become mixed. This can be accomplished by actuating the valve in a manner, e.g., closing and/or opening the valve, such that the velocity of the fluids contained within the valve to move at a rate sufficient for turbulent conditions and two fluids contained within or that are proximal to the valve to become mixed by convective forces. Diffusive mixing can be enhanced by increasing incubation time between two or more fluids or increasing the interfacial area between the two or more fluids.

Incubation times can be increased by reducing flow rate through the device or by the use of serpentine channels or other chambers.

Figure 29:
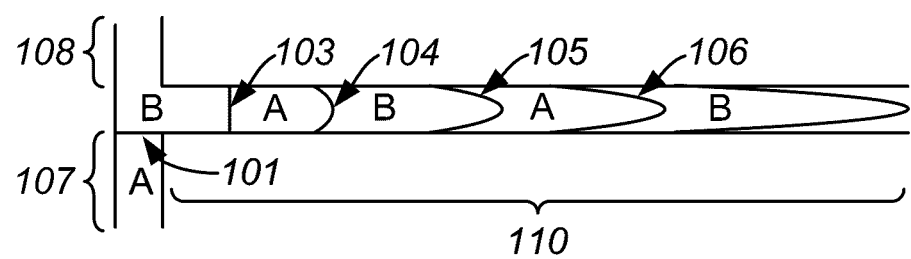
FIG. 29 shows two fluids with increasing interfacial area along a microchannel.
Figure 30:
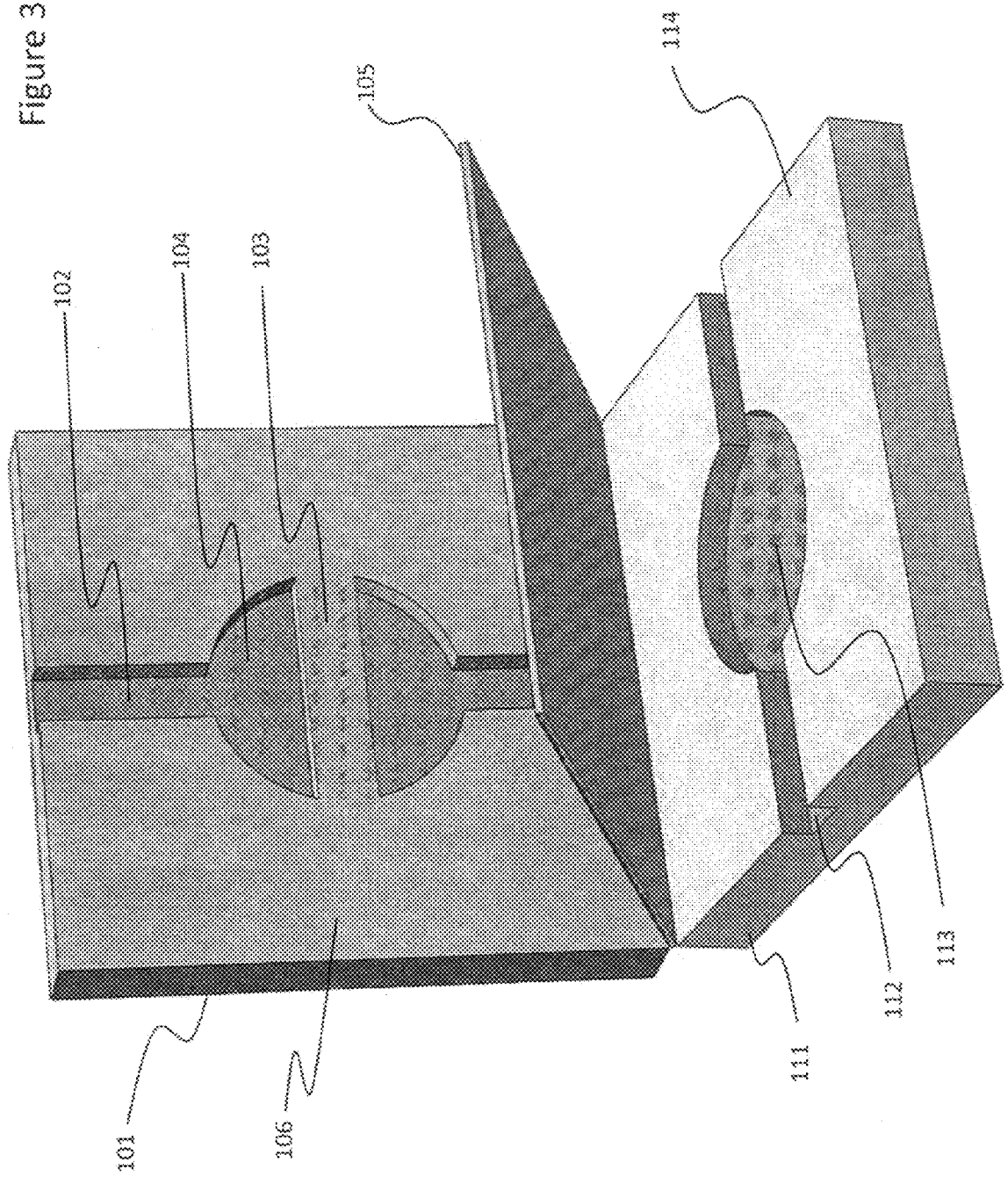
FIG. 30 shows a clamshell view of one embodiment of a diaphragm valve of this invention. A fluidics layer 101 comprises a fluid conduit comprising a fluidic channel 102 interrupted by a valve seat 103. In this embodiment, fluidic channel opens into a fluidics valve body 104. One face of the fluidics layer contacts the actuation layer (e.g., elastic layer) 105 in the assembled device. This face comprises sealing surfaces 106, to which the actuation layer can be sealed, and exposed surfaces of the functional components—fluidic conduit including the valve seat. A pneumatics layer 111, comprises a pneumatic conduit comprising a pneumatic channel 112 and a pneumatic valve body disposed opposite the valve seat. The pneumatic layer also comprises a face that contacts the actuation layer in the assembled device that has sealing surfaces and exposed surfaces of functional elements.
Figure 31:
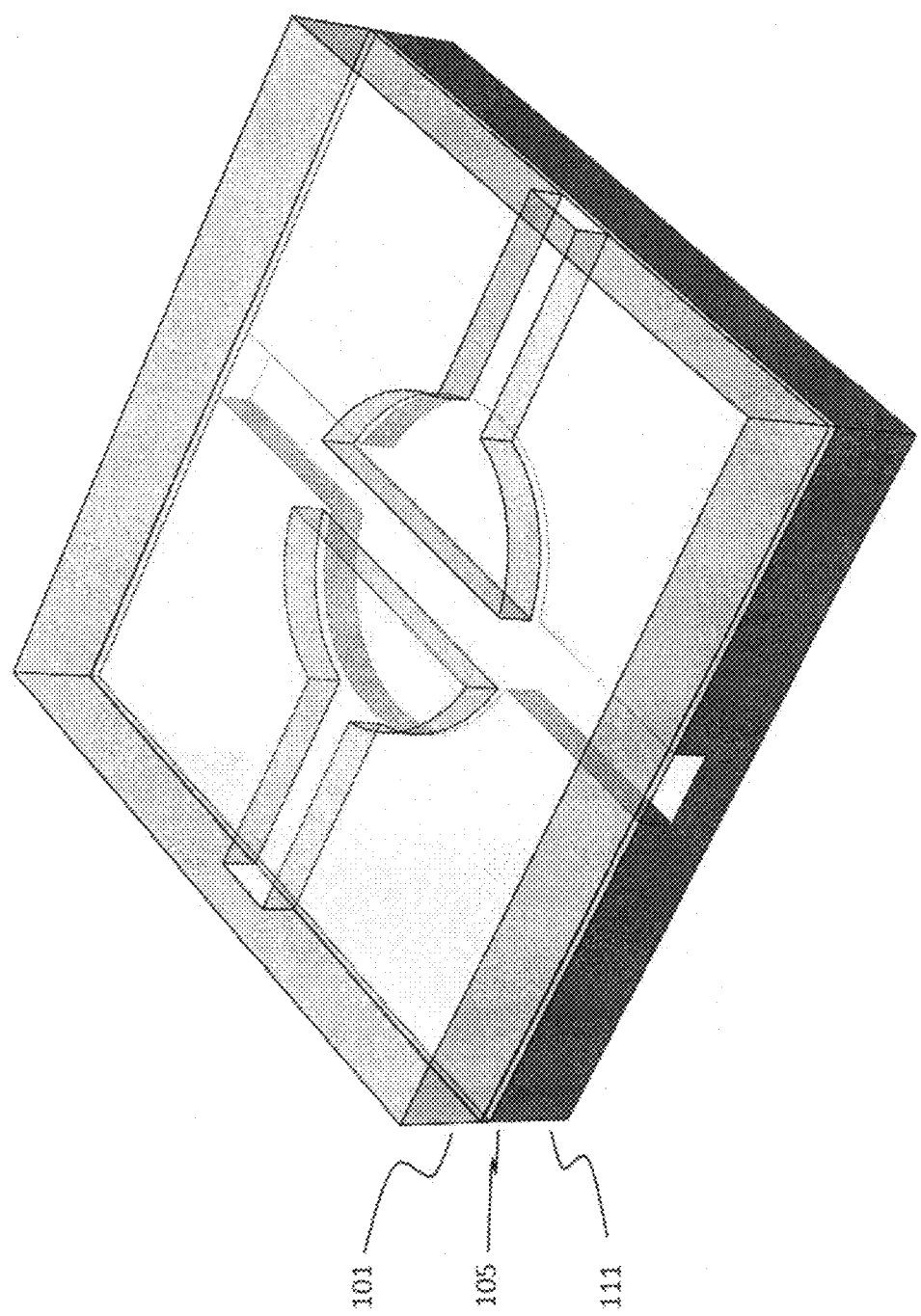
FIG. 31 shows an assembled diaphragm valve in three dimensions.
Figure 33A:
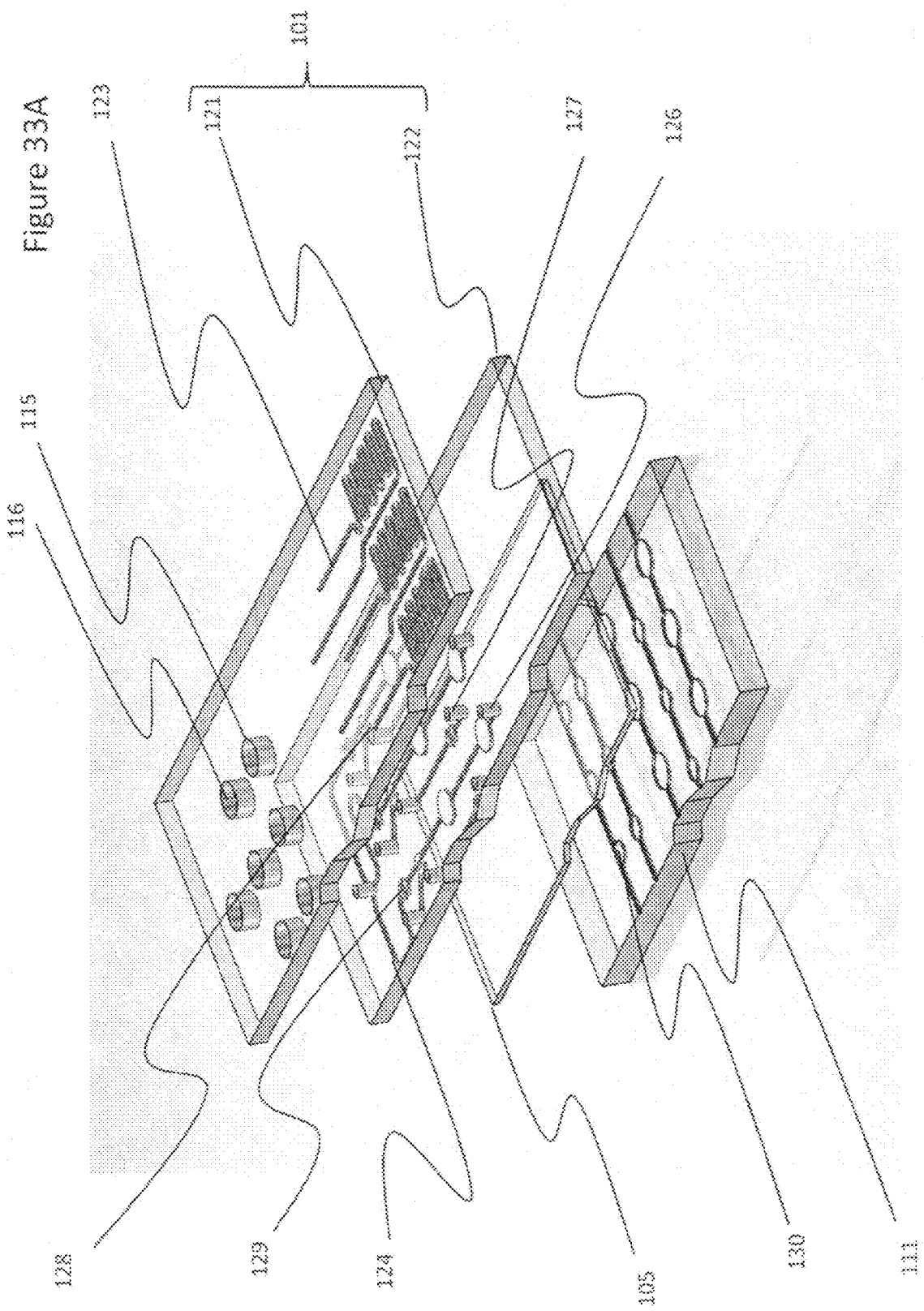
FIG. 33A and FIG. 33B show a portion of a device in which the fluidics layer comprises a plurality of sublayers, in exploded and closed views. The top sublayer 121 is referred to as the "etch" layer and bottom sublayer 122 is referred to as the "via" layer. In this example the etch layer comprises grooves (e.g., 123 and 128) on the surface that faces the via layer to form a closed fluidic channel. The via layer comprises grooves (e.g., 124) on the surface that faces the actuation layer. When the actuation layer (e.g., elastic layer) is bonded to or pressed against the via layer, it covers the channels and seals them against leakage. The via layer also includes vias (e.g., holes or bores) (e.g., 126 and 127) that traverse this sublayer and open onto the actuation layer on one side and the etch layer on the other. In this way, fluid traveling in a channel in the etch layer can flow into a conduit in the via layer that faces the actuation layer.
Figure 33B:
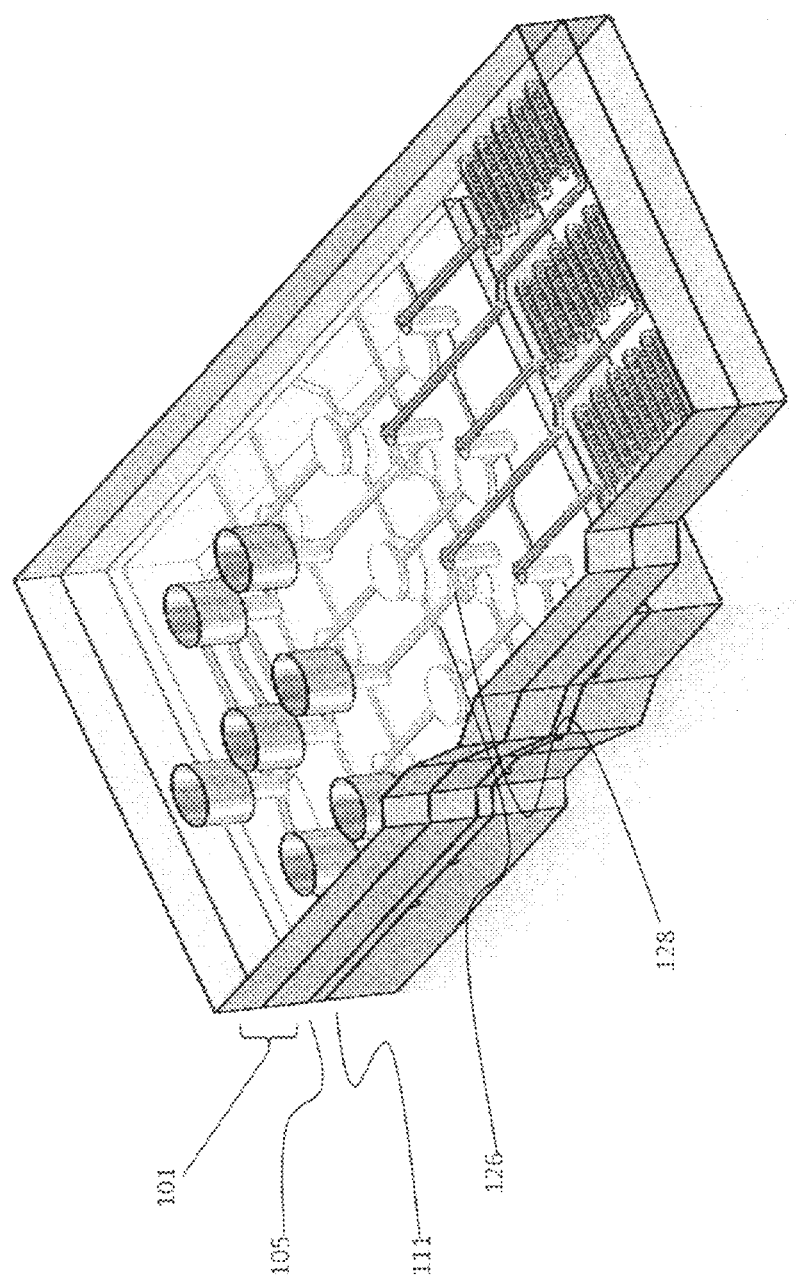

Interfacial area between two fluids can be established by alternatively injecting boluses of the two fluids into a channel. This can create an arrangement of stacked boluses as shown in FIG. 29, where A indicates a bolus of a first fluid, B indicates a bolus of a second fluid, and interfacial areas are between the regions indicated by A and B. The boluses can be boluses of one or more fluids to be mixed. The boluses can have a volume of about, up to about, less than about, or greater than about 1000, 750, 500, 400, 300, 200, 100, 50, 25, 20, 15, 10, 5, 4, 3, 2, 1, 0.5, 0.25, 0.175, 0.1, or 0.08 µL. The distance between interfacial areas of the boluses of fluid can be about, up to about, or less than about 1000, 500, 250, 200, 150, 100, 75, 50, 25, 20, 15, 10, 5, 2, 1 or 0.1 microns. The distance between interfacial areas of the boluses of fluid can be up to about or less than about 0.1, 1, 10, 100, or 1000 times the expected displacement distance of a molecule, due to diffusion, contained within the solution in 0.1, 1, 10, or 100 seconds. The boluses can be injected into a mixing channel by movement of a diaphragm valve that has a desired displacement volume, as described herein.

Movement of fluid within the microchannel can be under laminar flow conditions. Laminar flow conditions can be evaluated by determining the Reynolds number. The microchannel can have dimensions that allow for laminar flow. The diameter of the microchannel can be about, up to about, or less than about 5000, 2000, 1000, 750, 500, 400, 300, 200, 100, 75, 50, 25, 20, 15, 10, 5, 2, 1, 0.5, or 0.25 microns. The microchannel can have a cross-sectional area between approximately 10 to 20,000,000, 20 to 10,000,000, 40 to 5,000,000, 80 to 2,500,000, or 100 to 1,000,000 microns squared.

Because boluses of fluid are positioned adjacent to each other, the interfacial area between boluses of fluid can increase as the boluses move down the microchannel, as shown in FIG. 29. In FIG. 29, the interfacial areas between boluses of a first fluid A and boluses of a second fluid B are indicated as 101, 103, 104, 105, and 106, which indicate the change in amount of interfacial area as the boluses are moved in a downstream direction. Without being limited to theory, the rate of fluid flow near the walls of the microchannel may be slower than the rate of fluid flow further away from the walls of the microchannel, e.g., the center of the microchannel. The shape of the boluses can change as they travel down the microchannel and the interfacial area can increase.

Accordingly, two liquids can be mixed by stacking alternating boluses of the liquid adjacent to one another in a channel, and moving the stacked liquids through the channels. In another embodiment, the stack of boluses can be drawn into a pumping chamber, e.g., a diaphragm valve with a large valve chamber downstream of the boluses, and then pumped out of the valve. When the boluses are smaller than volume of the valve, a stack of several boluses enter the valve and are further mixed with the pump stroke.

In certain embodiments, the valves pump a volume of less than 300 nl, e.g., around 250 nl, and the channels have diameters of less than 500 nm, e.g., around 350 nm. If, for example, 1 ml of each fluid is to be mixed, they can be pumped in alternating pump strokes of diaphragm valves until the entire volume is consumed.

In comparison, two fluids can be injected simultaneously into a microchannel, such that the interfacial area between the two fluids may not change as the two fluids are moved under laminar flow conditions in a downstream direction in a microchannel.

The microchannel can have a regular or irregular shape such that the cross-sectional area of an upstream portion of the microchannel is different, increased, or decreased than that of a downstream portion of the microchannel, as described herein. The microchannel shape can facilitate mixing within the microchannel. In some embodiments, a microchannel can have an elastomeric layer as a wall such that the actuation of the elastomeric layer can allow for a variable cross-sectional area of the channel. Movement of the elastomeric wall can induce turbulence or otherwise increase the interfacial area between fluids to be mixed.

The boluses of various liquids can be placed adjacent to each other in a microfluidic channel using the devices of the invention. For example, the arrangement of channels and valves shown in FIG. 21 can be incorporated into a microfluidic chip and used to mix two fluids. Referring to FIG. 21, a first channel 107 can contain a first fluid and a first valve 507, a second channel 108 can contain a second fluid and a second valve 505, and the two fluids can be combined in a mixing channel 110 with two valves 511 and 513. Valve 511 can be a pumping valve and valve 513 can be an exit valve. Valves 507, 511, and 513 can be used to pump the first fluid into the mixing channel while valve 505 is closed and valves 505, 511, and 513 can be used to pump the second fluid into the mixing channel while valve 507 is closed.

The pumping sequence for positioning boluses of a first fluid adjacent to a second fluid in a microfluidic channel can be as follows. Initially, the valves can be closed and that the first channel can be fluidically connected to a first source containing the first fluid and the second channel can be fluidically connected to a second source containing the second fluid. The first fluid and second fluid can be different. The first fluid can be moved toward the exit valve, and/or into the mixing channel, by opening valve 507 (first valve) and then opening valve 511 (pumping valve). The displacement volume of the pumping valve can be 1, 1.5, 2, 5, 10, 20, or 50 times greater than the first, the second, or the exit valves. The first valve can then be closed simultaneously with the opening of the exit valve. Alternatively, the first valve and exit valve can be actuated at almost the same time or sequentially. The pumping valve can then be closed, moving the first liquid toward the exit valve. The exit valve can then be closed. The second fluid can be moved into the mixing channel in a manner similar to the movement of the first fluid, except the second valve is used in combination with the pumping valve and the exit valve instead of the first valve with the pumping valve and the exit valve. The second valve can be a flow-through valve. The opening and closing of the valves described herein can cause turbulent flow. The total volumetric flow of fluid using the methods and devices described herein can be between approximately 0.0001 to 1000, 0.001 to 100, or 0.01 to 10 µL/sec.

The isolated portion of the fluidics layer finds use as a heating and or cooling area in which the temperature of fluids in fluidic channels therein can be regulated. This can include thermal cycling for processes such as PCR or cycle sequencing.

The microfluidics device and the thermal regulator have utility in the preparation, processing and recovery of samples in which biochemical or chemical reactions are performed. The use of the devices of the invention permits regulation of biochemical and chemical of fluid samples where thermal control is desired. The programmable features of the thermal regulator and the ability to attach and have in thermal contact the arrays of reaction zones of the extended shelf region of the microfluidic device permits the processing of multiple samples under conditions and with volumes useful for many assays and procedures known in the art.

In some embodiments, the various chips can split input samples into the appropriate number of reactions (dependent upon the degree of multiplexing achieved) using the MOVe routers and adding reagents, such as PCR master mix containing internal standards. Samples for archiving and retesting can be aliquoted using an input MOVe router and then samples from any positive Real-Time PCR reactions can be selected and retrieved.

B. Biochemical Reactions

The systems of the invention have utility in sample preparation and analysis in a variety of fields in the art, including without limitation for many fields such as DNA sequencing, microarray sample preparation, genotyping, gene expression, biodefense, food monitoring, forensics, proteomics and cell biology.

In one embodiment, the system comprising the microfluidics chip device and the thermal regulator can be used to prepare samples for automated cycle nucleic acid sequencing and cleanup for analysis by such methods as Sanger sequencing. The microfluidics device can be configured to receive assay samples, reaction reagents, binding moieties, detection labels, and programmed to deliver measured aliquots of sample and reagents into mixing zones and then pumped into the microchannels of the isolated region, described herein, for incubation and thermal cycling. The thermal regulator can be used to thermally regulate the isolated region of the microfluidic device and, hence, the samples located in the channels therein.

In some embodiments, a fluidic sample can be reintroduced from the first region back into the isolated region after the addition or removal of reagents or analytes for initiation, incubation under various thermal conditions, including thermal cycling, or termination of successive biochemical or chemical reactions.

The thermal regulator can be programmed to pass through a predetermined temperature cycle corresponding to the denaturation, annealing and elongation steps in a polymerase-dependent reaction, such as is used in the art for amplification of DNA in PCR and cycle sequencing preparation of DNA for subsequent analysis. The thermal regulator can be used to alter the temperature of within the isolated region of the microfluidic chip device, which can allow for temperature controlled reactions within the microfluidic chip device. For example, in the thermal denaturation step, the microprocessor is programmed to signal the regulator to control the thermal regulators to raise the temperature of the device and the corresponding isolated region of the microfluidic device in contact with the temperature regulation transfer device to about 95° C. so that the double-stranded DNA is denatured into a single-stranded DNA. In the subsequent annealing step, the thermal regulators and/or the cooling fans are set to lower the temperature of the device to about 55° C. so that the primers cause the single-stranded DNA to bind to its complementary base sequence. In the DNA extension step, the thermal regulators are set to raise the internal temperatures of the respective reaction regions to about 72° C. so that using the primers as starting points of DNA synthesis, a DNA polymerase reaction is allowed to proceed to have complementary DNA extended. In use, the device of the present invention allows shortened time periods (ramp times) between the temperatures at each step, permitting rapid cycle times for the processing of samples.

In one embodiment, the microfluidics device can be programmed to introduce the samples and reagents into the isolated region and then move them into a recovery region after the reaction is complete to permit withdrawal of the sample for subsequent analysis. In another embodiment, the microfluidics device can be programmed to move the reacted sample into a reservoir or a fluid zone and add additional reaction reagents and reintroduce the sample into the isolated region for additional reaction. In other embodiments, the microfluidics device can be programmed to move the reacted sample into a reservoir or a fluid zone and add capture reagents and then move the sample into a capture region for the physical separation of analytes of interest; e.g., through the use of a magnetic field to capture magnetic or paramagnetic beads or particles coated with binding moieties. In other embodiments, the microfluidics device can be programmed to move the reacted sample into a reservoir or a fluid stream and add detection reagents or moieties and then move the sample into a recovery region to permit withdrawal of the sample for subsequent analysis. A detection device, such as laser induced fluorescence Raman, Plasmon resonance, immunocapture and DNA analysis devices known in the art, can be used to interrogate the sample in a MOVe valve or within the channel of the shelf region or other part of the microfluidic device. See, e.g., WO 2008/115626 (Jovanovich). A microfluidic device having a monolithic (i.e., single) membrane is one example of a particularly suitable device for implementing a detection system on a chip. According to various embodiments, the detection system can also include immunocapture and DNA analysis mechanisms such as polymerase chain reaction (PCR), and capillary electrophoresis (CE) mechanisms.

FIG. 6 shows an example of microfluidic device that can be used to prepare samples for cycle sequencing nucleic acid analysis. In this design, nucleic acid samples introduced into wells 80 can be moved and mixed at MOVe valve 20 with cycle sequencing reagents and enzymes introduced into well 70 and pumped by actuation of valves 10, 20, 30, and 40 into the serpentine channel 60 of the isolated region. Alternatively, valves 10, 20, 30, and 50 may be used for pumping. The mixing of the reagents and samples can be performed as described herein. Plurality of boluses of reagents and sample can be sequentially and/or alternately moved into a microfluidic channel of the microchip by alternatively using sets of pumping valves to move the reagent (valves 10, 30, and 40) and sets of pumping valves to move the sample (valves 20, 30, and 40). The reagents and samples can be combined in valve 20 and become mixed before reaching valve 40. The mixed reagents and samples can then be pumped into the serpentine channel 60 which is located on an isolated region of the microfluidic device. Because the isolated region is in thermal contact with the thermal regulator, the samples introduced into the reaction region of the shelf can be heated or cooled under controlled conditions selected by the operator. The reagents and sample can undergo thermal conditions for cycle sequencing. In one embodiment, the sample can be introduced through valves into the shelf region and the valves surrounding the chamber, e.g., 40 and 50, can be closed for thermal cycling or other thermally-controlled reaction conditions of the samples by the thermal regulator. The excellent volume-to-surface ratio and approximately 100-fold longer pathlength benefits the sample preparation biochemistry and temperature regulation by the higher volume-to-surface ratio. After cycle sequencing, the samples and/or reaction mixture can be moved to wells 80. Magnetically responsive particles, such as magnetic or paramagnetic beads or particles that may have binding moieties can be introduced to well 80 such that the sample and/or reaction mixture are mixed with the magnetically responsive particles, e.g., magnetic or paramagnetic beads or particles. In some embodiments of the invention, the magnetically responsive particles, e.g., magnetic or paramagnetic beads or particles are coated with carboxyl groups and can adsorb nucleic acids. The magnetically responsive particles, e.g., magnetic or paramagnetic beads or particles with adsorbed nucleic acid can then be further moved to a capture region 40, and be captured by application of a magnetic field. The capture of the beads by the magnetic field can be accompanied by a deformation of the capture valve. The magnetic field can be applied by actuation of the magnetic assembly described herein. The capture valve can be deformed such that the chamber size is increased. The increased size of the capture valve can reduce the flow velocity through the chamber. The magnetically responsive particles, e.g., magnetic or paramagnetic beads or particles can be washed while the beads are captured by the magnetic field. The on-chip MOVe pumps, e.g., 10, 20, 30, and 40 can move the beads, which may be washed with a buffer, with bound purified nucleic acids. The beads can be moved to one of the removal ports 90. Alternatively, nucleic acids can be released from the beads by the local application of heat or eluted with water or a buffer. The beads can be held in the chamber while the eluted product is moved to one of the removal ports 90.

In another embodiment, the device is programmed to integrate multiple steps of reactions for DNA sequencing applications. Common reagent reservoir 70 is loaded with cycle sequencing reagents which are mixed with DNA containing samples loaded into sample reservoirs 80 with the samples being in one embodiment PCR, plasmid, or other nucleic acid amplification products that are to be sequenced. The mixture containing the sample and cycle sequencing reagents can be moved by the programmable fluidics using microvalves to a reaction chamber 60 located on the extended shelf region of the device where cycle sequencing reactions are performed using thermal cycling. The cycle sequencing products can then be moved to Product reservoirs 90 for movement off the device for further processing or in a preferred embodiment the cycle sequencing products are moved to a reservoir and beads such as Agencourt SPRI beads are added to the cycle sequencing products with appropriate chemistry to have the desired cycle sequencing products bound to the beads to separate the products from the salts and unincorporated dye labeled terminators or primers. It is obvious to one skilled in the art that rather than binding the cycle sequencing products to the beads the reverse can be performed where the cycle sequencing products are left in solution and the salts and unincorporated dyes are bound to the beads. The term bead is used without restriction to include particles, paramagnetic particles, nanoparticles, monoliths, gels, gels with affinity capture property or non-specific properties.

If the bead and cycle sequencing products were contained in reservoir 80 the combined mixture is pumped through microvalves 20 and 30 to microvalve 40 which may be opened and have a fixed or movable magnet in proximity. The beads such as SPRI beads which are paramagnetic are captured as the flow slows down in the opened microvalve and the beads are captured in the magnetic field. For example, the valve can be opened and a magnet, such as comprised in magnet assembly of this invention can be moved into a functional position close to the valve so that beads passing into the chamber are captured by the magnetic force exerted by the magnet.

Fluids such as ethanol may be added to reservoirs to then process the beads and remove the undesired impurities such as salts and unincorporated dye labeled reactants. The magnet can then be removed to release the force on the beads. The beads may be then pumped to product reservoirs 90 or the cycle sequencing products can be eluted into water which is then pumped to product reservoirs 90. For cycle sequencing the eluted products are ready to be analyzed on a separate device such as a CAE or microchip with separation. It is obvious to one skilled in the art that the different reservoirs may have other configurations and a single sample can be added to reservoirs 70 and multiple reagents may be added to reservoirs 80 to perform three different reactions on a single sample.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for combining a first liquid and a second liquid in a microfluidic mixing channel comprising:
    a) providing a device with a first liquid channel and a second liquid channel each fluidically connected to the microfluidic mixing channel, wherein a first diaphragm valve is positioned within the first liquid channel, a second diaphragm valve is positioned within the second liquid channel, and a third diaphragm valve and a fourth diaphragm valve are positioned within the microfluidic mixing channel; and
    b) using the first, second, third and fourth diaphragm valves to sequentially pump the first liquid and the second liquid into the microfluidic mixing channel to form a plurality of boluses of the first liquid and the second liquid,
    wherein the first, third, and fourth diaphragm valves are used to pump the first liquid into the microfluidic mixing channel and the second, third, and fourth diaphragm valves are used to pump the second liquid into the microfluidic mixing channel, and
    wherein the first liquid and the second liquid are different.

2. A method for providing a first liquid and a second liquid to a mixing channel comprising the steps of:
    a. providing a device with a first liquid channel and a second liquid channel each fluidically connected to the mixing channel,
        wherein a first valve is positioned within the first liquid channel, a second valve is positioned within the second liquid channel, a pumping valve is positioned within the mixing channel, and an exit valve is positioned downstream of the pumping valve within the mixing channel, and
        wherein the first liquid and the second liquid are different;
    b. providing the first liquid to the first liquid channel and the second liquid to the second liquid channel;
    c. configuring the valves such that the first valve is open and the second valve, the pumping valve, and the exit valve are closed;
    d. opening the pumping valve;
    e. configuring the valves such that the pumping valve and the exit valve are open and the first valve and the second valve are closed;
    f. closing the pumping valve;
    g. configuring the valves such that the second valve is open and the first valve, the pumping valve and the exit valve are closed;
    h. opening the pumping valve;
    i. configuring the valves such that the pumping valve and the exit valve are open and the first valve and the second valve are closed; and
    j. closing the pumping valve.

3. A method of mixing fluids in a microfluidic device comprising:
    a) stacking alternating boluses of a first liquid and a second liquid in a microfluidic channel;
    b) moving the stack of boluses into a chamber of a diaphragm valve, wherein the chamber, when open, has a volume greater than the volume of at least four boluses; and
    c) closing the diaphragm valve, wherein closing pumps the liquids out of the valve, thereby mixing the liquids.

4. The method of claim 1, wherein one or more of the first, second, third and fourth diaphragm valves are pneumatically actuated.

5. The method of claim 1, further comprising moving the plurality of boluses down the microfluidic mixing channel, whereby an amount of interfacial area between adjacent boluses increases as the plurality of boluses move down the microfluidic mixing channel.

6. The method of claim 1, wherein the microfluidic mixing channel has a cross-sectional area and a length, and the cross-sectional area of the microfluidic mixing channel increases or decreases along the length of the microfluidic mixing channel.

7. The method of claim 1, wherein the second diaphragm valve is a flow-through valve.

8. The method of claim 1, wherein the first liquid and the second liquid move in the microfluidic mixing channel under laminar flow conditions.

9. The method of claim 1, wherein the plurality of boluses are mixed due to moving of the plurality of boluses down the microfluidic mixing channel.

10. The method of claim 1, wherein the first liquid channel and the second liquid channel are microfluidic channels.

11. The method of claim 2, wherein one or more of the first valve, the second valve, the pumping valve, and the exit valve are pneumatically actuated.

12. The method of claim 2, wherein step d) moves the first liquid and step h) moves the second liquid.

13. The method of claim 2, wherein steps c) through j) are repeated.

14. The method of claim 2, wherein the second valve is a flow-through valve that joins the second liquid channel to the mixing channel.

15. The method of claim 2, further comprising moving the first liquid and the second liquid within the mixing channel.

16. The method of claim 15, wherein the moving of the first liquid and the second liquid occurs under laminar flow conditions.

17. The method of claim 2, wherein the mixing channel has a cross-sectional area and a length, and the cross-sectional area of the mixing channel increases or decreases along the length of the mixing channel.

18. A method of mixing fluids in a microfluidic device comprising:
    a) stacking alternating boluses of a first liquid and a second liquid in a microfluidic channel, wherein the number of alternating boluses in the stack of boluses is at least four; and
    b) moving the stack of boluses through the channel, wherein the channel is configured so that moving the boluses increases an area of surface contact between the boluses, thereby promoting mixing of the first and second liquids, wherein the boluses are created using successive strokes of a diaphragm pump comprising three diaphragm valves in the microfluidic device.

19. The method of claim 18, wherein the stack of boluses moves through the channel under laminar flow conditions.

20. The method of claim 3, wherein the valve pumps the first liquid and the second liquid into a second microfluidic channel.

* * * * *